(12) United States Patent
Lederman et al.

(10) Patent No.: US 10,506,067 B2
(45) Date of Patent: Dec. 10, 2019

(54) DYNAMIC PERSONALIZATION OF A COMMUNICATION SESSION IN HETEROGENEOUS ENVIRONMENTS

(71) Applicant: SonicCloud, Inc., Palo Alto, CA (US)

(72) Inventors: Jonathan L. Lederman, Palo Alto, CA (US); Lawrence Mark Guterman, Studio City, CA (US)

(73) Assignee: SONITUM INC., San Francisco, CA (US)

( * ) Notice: Subject to any disclaimer, the term of this patent is extended or adjusted under 35 U.S.C. 154(b) by 1412 days.

(21) Appl. No.: 13/837,205

(22) Filed: Mar. 15, 2013

(65) Prior Publication Data
US 2014/0280991 A1    Sep. 18, 2014

(51) Int. Cl.
*H04L 29/08* (2006.01)
*H04L 29/06* (2006.01)

(52) U.S. Cl.
CPC ........ *H04L 67/306* (2013.01); *H04L 65/1006* (2013.01); *H04L 65/1069* (2013.01)

(58) Field of Classification Search
CPC ............ H04L 29/06197; H04L 65/605; H04M 7/006; H04M 3/5191
See application file for complete search history.

(56) References Cited

U.S. PATENT DOCUMENTS

| | | | |
|---|---|---|---|
| 5,195,132 A | 3/1993 | Bowker et al. | 379/410 |
| 5,388,185 A | 2/1995 | Terry et al. | 395/2.14 |
| 5,768,397 A | 6/1998 | Fazio | 381/68 |
| 5,802,164 A | 9/1998 | Clancy et al. | 379/347 |
| 5,943,413 A | 8/1999 | Ash et al. | 379/220 |
| 6,061,431 A | 5/2000 | Knappe et al. | 379/52 |
| 6,122,500 A | 9/2000 | Dent et al. | 455/414 |
| 6,144,670 A * | 11/2000 | Sponaugle et al. | 370/401 |
| 6,453,153 B1 | 9/2002 | Bowker et al. | 455/67.4 |
| 6,453,284 B1 | 9/2002 | Paschall | 704/208 |
| 6,711,258 B1 | 3/2004 | Sung | 379/390.01 |
| 6,724,862 B1 | 4/2004 | Shaffer et al. | 379/52 |
| 6,750,988 B1 | 6/2004 | Bossut et al. | |

(Continued)

FOREIGN PATENT DOCUMENTS

EP        2026550 A1    2/2009
WO    WO-03/027876 A1    4/2003

(Continued)

OTHER PUBLICATIONS

Int'l Search Report and Written Opinion of the ISA/RU in PCT/US2014/027968, 7pgs.; dated Jul. 10, 2014.
Anderson et al., "Neural Encoding of Speech and Music: Implications for Hearing Speech in Noise," *Seminars in Hearing*, vol. 32, No. 2, pp. 129-141 (2011).
Beck et al., "(Central) Auditory Processing Disorders: Overview and Amplification Issues," *News from Oticon Audiological Research Documentation*, 4 pages, Dec. 2008.

(Continued)

*Primary Examiner* — Jason D Recek
(74) *Attorney, Agent, or Firm* — Michael Best & Friedrich LLP

(57) ABSTRACT

A method and system for transparent and automatic establishment of a personalized communication session across heterogeneous networks utilizes a network node for providing personalization services. Communication sessions initiated on any number of heterogeneous networks are transparently and automatically personalized for subscribers to personalization services offered by the network node by routing media in the communication session through the personalization node.

1 Claim, 34 Drawing Sheets

(56) References Cited

U.S. PATENT DOCUMENTS

| | | | |
|---|---|---|---|
| 6,813,490 B1 | 11/2004 | Lang et al. ............... | 455/414.1 |
| 6,993,119 B1 | 1/2006 | Zhang et al. ............. | 379/88.01 |
| 7,177,417 B2 | 2/2007 | Michaelis .................... | 379/395 |
| 7,185,280 B2 | 2/2007 | Deganello et al. | |
| 7,529,545 B2 | 5/2009 | Rader et al. ............... | 455/432.2 |
| 8,392,317 B2 | 3/2013 | Dayal et al. | |
| 8,526,591 B2 | 9/2013 | Morken et al. | |
| 8,634,531 B2 | 1/2014 | Morken et al. | |
| 8,670,771 B2 | 3/2014 | Brownworth et al. | |
| 8,718,682 B2 | 5/2014 | Brownworth | |
| 8,730,920 B2 | 5/2014 | Brownworth et al. | |
| 8,732,036 B2 | 5/2014 | Arya et al. | |
| 9,031,836 B2* | 5/2015 | Michaelis ............... | G10L 21/02 381/58 |
| 2002/0041695 A1* | 4/2002 | Luo ........................ | H04R 3/005 381/313 |
| 2004/0141624 A1* | 7/2004 | Davis ..................... | A61B 5/121 381/73.1 |
| 2004/0215448 A1 | 10/2004 | Funatsu et al. | |
| 2005/0086699 A1* | 4/2005 | Hahn ................ | H04M 3/42391 725/106 |
| 2006/0079271 A1* | 4/2006 | Lee ............................ | 455/550.1 |
| 2007/0098202 A1* | 5/2007 | Viranyi ................ | H04R 1/1041 381/380 |
| 2008/0137644 A1* | 6/2008 | Reynolds ............ | H04L 65/4007 370/352 |
| 2008/0165707 A1* | 7/2008 | Baird .................... | H04L 65/607 370/260 |
| 2010/0202642 A1* | 8/2010 | LoPresti ................ | A61B 5/125 381/321 |
| 2010/0262700 A1 | 10/2010 | Whynot et al. | |
| 2012/0296752 A1 | 11/2012 | Dayal et al. | |
| 2013/0155889 A1 | 6/2013 | Brownworth et al. | |
| 2013/0198237 A1* | 8/2013 | Serban ............. | G06F 17/30557 707/792 |
| 2013/0311545 A1 | 11/2013 | Wright et al. | |
| 2013/0337802 A1 | 12/2013 | Morken et al. | |
| 2014/0011538 A1 | 1/2014 | Mulcahy et al. | |
| 2014/0031003 A1 | 1/2014 | Shugart et al. | |
| 2014/0038617 A1 | 2/2014 | Mulcahy et al. | |
| 2014/0044125 A1 | 2/2014 | Rathnam et al. | |
| 2014/0105179 A1 | 4/2014 | Kashimba et al. | |
| 2014/0105181 A1 | 4/2014 | Milam et al. | |
| 2014/0149593 A1 | 5/2014 | Brownworth et al. | |
| 2014/0180458 A1* | 6/2014 | Nayak ................ | G06F 17/3074 700/94 |

FOREIGN PATENT DOCUMENTS

| | | |
|---|---|---|
| WO | WO 2008/106036 | 9/2008 |
| WO | WO-2009/046909 A1 | 4/2009 |

OTHER PUBLICATIONS

Bröckelmann et al., "Emotion-Associated Tones Attract Enhanced Attention at Early Auditory Processing: Magnetoencephalographic Correlates," *The Journal of Neuroscience*, vol. 31, No. 21, 14 pages, May 25, 2011.

Kalinli et al., "Early Auditory Processing Inspired Features for Robust Automatic Speech Recognition," *Speech Analysis and Interpretation Laboratory (SAIL) Department of Electrical Engineering-Systems*, 5 pages (2007).

Kim, "Signal Processing for Robust Speech Recognition Motivated by Auditory Processing," 208 pages, Dec. 2010.

Kim et al., "Binaural Sound Source Separation Motivated by Auditory Processing," *Language Technologies Institute and Department of Electrical and Computer Engineering, Carnegie Mellon University*, 4 pages (2011).

King et al., "Accurate Speech Segmentation by Mimicking Human Auditory Processing," *University of Illinois Department of Electrical and Computer Engineering*, 5 pages (2012).

Kraus et al., "Auditory-Processing Malleability," *Association for Psychological Science*, vol. 16, No. 2, pp. 105-110 (2007).

Kraus et al., "Music training for the development of auditory skills," *Nature Reviews Neuroscience*, vol. 11, pp. 599-605, Aug. 2010.

Laureys et al., "Auditory processing in the vegetative state," *Oxford Journals*, vol. 123, No. 8, pp. 1589-1601 (2000).

Musiek, "Habilitation and Management of Auditory Processing Disorders: Overview of Selected Procedures," *Journal of the American Academy of Audiology*, vol. 10, 1 page (1999).

Oticon, Inc., "Pairing Guide," *Oticon*, http://www.oticonusa.com/Oticon/Consumers/Products/ConnectLine/PairingGuide.html, 1 page, Mar. 11, 2013.

PACE™, "Processing and Cognitive Enhancement," Listening Ears, http://www.listening-ears.com/pace.html, 2 pages, Mar. 21, 2013.

Parbery-Clark et al., "Context-dependent encoding in the auditory brainstem subserves enhanced speech-in-noise perception in musicians," *Neuropsychologia*, vol. 49, pp. 3338-3345 (2011).

So et al., "A New Algorithm for Explicit Adaptation of Time Delay," *IEEE Transactions on Signal, Processing*, vol. 42, No. 7, pp. 1816-1820, Jul. 1994.

Somerset, "Auditory Processing Disorders," *Somerset Medical Center*, http://www.somersetmedicalcenter.com/Main/AuditoryProcessingDisorders.aspx, 3 pages, Mar. 11, 2013.

Wikipedia, "Auditory processing disorder," *Wikipedia*, http://en.wikipedia.org/wiki/Auditory_processing_disoder, 10 pages, Mar. 21, 2013.

Bellis, "Assessment & Management of Central Auditory Processing Disorders," *Educational Setting From Science to Practice*, 2nd Edition, 4 pages (2002).

* cited by examiner

Personalization
Database
Schema
599 

User 519(1)

| User_Id INT PK 580 |
| SIP_URI VARCHAR(!000) 581 |
| DSP_Config_Logic_Id INT FK 582 |
| User_Name VARCHAR(100) 583 |
| User_E-Mail VARCHAR(50) 584 |
| User_Address VARCHAR(1000) 585 |

Device 519(2)

| Device_Id INT PK 596 |
| User_Id INT FK 580 |
| Device_Characteristics_Id INT FK 594 |
| Device_Type Int 595 |

DSP_Config_Logic 519(3)

| DSP_Config_Logic_Id INT PK 590 |
| User_Id INT FK 580 |
| Baseline_DSP_Parameters VARCHAR(10000) INT FK 589 |
| DSP_Logic VARCHAR(1000000) 593 |

Device_Characteristics 519(4)

| Device_Characteristics_Id INT PK 594 |
| Device_Id INT FK 586 |
| Device_Characteristics VARCHAR(10000) 594 |

DSP_Config_Parameters 519(5)

| DSP_Config_Id PK 597 |
| User_Id INT FK 580 |
| DSP_Parameters VARCHAR 598 |

Frequency_Response 519(6)

| Frequency_Response_Id INT PK 595 |
| User_Id INT FK 580 |
| Device_id INT FK 596 |

FIG. 5i

DYNAMIC PERSONALIZATION OF A COMMUNICATION SESSION IN HETEROGENEOUS ENVIRONMENTS

TECHNICAL FIELD

The present invention relates to communication networks and more specifically to personalization of a communication session within one or more communication networks.

BACKGROUND ART

Human expression embodies a myriad of communication media including speech, music, writing, visual art and associated media such as images, drawings, photographs, etc. With respect to each of these mediums, each person is endowed with specific abilities, limitations and associated preferences.

For example, in the case of audio media, every person possesses a unique hearing profile, which serves as a lens through which they experience the world of sound. Similarly, each person also possesses unique visual abilities. Human auditory perception varies widely between people due to differences physiological makeup, differences in listening environments.

The ability to adapt media to a person's unique preferences plays a significant role in the quality of communication as well as its enjoyment. Because in-person communication is often not possible due to geographic constraints, telecommunication networks have become the primary conduit for the exchange of multimedia information.

Modern communication networks including public packet networks such as the Internet have enabled a rich palette of multi-media real-time communication services including audio, images, video, text, etc. The ubiquitous nature of established communication networks necessitates their dominant use. Typically, users of these communication networks subscribe to one more services offered by associated network providers.

However, in general, the ability to enjoy personalized media using these networks is not possible. As far as the user is concerned, because these networks are closed systems, the associated network services are fixed insofar as user's ability to dynamically control or shape the associated media characteristics. Thus, in general it is not possible to personalize or tune media transmitted by telecommunication networks to the individual preferences or needs of individual users. Thus, a user of any given communication network is required to accept the service characteristics of media as defined by the service provider. Adapting the media to a user's preferences on a physical device is also generally not possible. For example, in the case of cellular communication services the APIs providing access to media streams delivered by the network are not available to end users. The same situation holds true for PSTN ("Public Switched Telephone Network") calls or typical VoIP ("Voice over Internet Protocol") calls.

With respect to audio media, telecommunication networks providing audio transport have evolved from circuit switched analog telephone networks to a heterogeneous array of transport, signaling and media including digital, packet-based systems such as VoIP as well as wireless communication networks using cellular technology. Although the quality of telephonic audio has improved in general with the introduction of digital VoIP systems, in other realms such as cellular communications, audio quality has degraded due to bandwidth contention on those networks. In particular, bandwidth limitations on typical cellular networks combined with the existence of ambient noise in the environment typically results in severely degraded audio on a cellular call.

Although the underlying transport media for audio communications have become highly sophisticated, the ability to personalize audio for particular users of communication systems is in general nonexistent or at best significantly constrained. For example, in the case of audio media in a telephony session such as an ordinary telephone call over the PSTN, the hearing profiles of individual users of the network and the equipment infrastructure underlying the call such as playback device, microphone and codecs significantly influence the audio quality and characteristics of the call. The audio on a call is typically affected by a host of other dynamic conditions such as time-varying network conditions, changing ambient environments, etc. However, current network infrastructure precludes the tuning the media on a call to adapt to these static and dynamic variables.

For persons with hearing impairment, the use of external local devices such a hearing aid during communications sessions such as telephone calls presents a number of drawbacks. Hearing aids are subject to feedback when using a handset or headset, which detracts significantly from call quality. Hearing aids that connect via a Bluetooth or other wireless connection require the use of multiple devices, which is cumbersome. Hearing aids that support the use of Bluetooth are prohibitively expensive and offer limited processing power and flexibility determined by the hearing aid itself. Further, most hearing aid users desire to remove their hearing aids during telephone use due to the cumbersome nature of using a handset in conjunction with a hearing aid.

Hearing aids that have specific algorithms designed to adapt to different ambient environments nevertheless perform poorly with regard to telephone communications, given great variances in the performance of end-user communications devices and the quality of audio signals generated by telephonic communications networks, including the PSTN, cellular telephone networks, computer networks supporting VoIP communications, and combinations thereof. In addition, hearing aids are typically cumbersome to use with end-user communications devices that do not support hands-free use.

Current communication networks do not provide the capability for convenient dissemination of high-quality, high-bandwidth audio that preserves the full spectrum of audio signals that human beings can perceive. For example, since most speech information resides below 4 KHz, most telephone networks utilize low-pass filtering below 8 KHz and sample at 8 KHz.

SUMMARY OF THE EMBODIMENTS

A process according to one embodiment includes the steps of automatically establishing a call between a caller and a network node by routing a first leg of the call to the network node. At the network node, a computer system may determine session information associated with the call and generate at least one audio personalization parameter. The computer system may configure an audio processor, or a set thereof, to process an audio signal in the call using a portion of the audio personalization parameter. The computer system may establish a second leg between the network node and the callee. The computer system may bridge the first leg and the second leg such that an audio signal associated with the call is routed through the audio processor.

According to another embodiment, the establishment of a personalized communication session may occur in a transparent and automatic manner. Non-subscribers to a personalization service offered by a personalization node may also establish a personalized communication session with a subscriber simply by initiating a communication session with the subscriber in a conventional manner.

According to another embodiment, the personalization provides an enhancement to improve intelligibility of the audio signal for the subscriber.

According to another embodiment, the automatic establishment of a personalized communication session may be established upon a triggering event. The triggering event may include a subscriber dialing a telephone number of a third party or a second subscriber. The triggering event also includes a third party or second subscriber dialing the telephone number of the subscriber.

According to another embodiment, the network node may automatically configure itself based upon information associated with the call as well as attributes associated with subscriber. The session information may include an automatic number identification (ANI), a session initiation protocol (SIP) identifier, an equipment identifier, and communication-device information associated with the caller or the caller.

According to another embodiment, users of network node may subscribe to one or more services offered for personalization.

According to an embodiment, the computer system may generate at least a portion of the audio personalization parameter by generating a query based on the session information. The computer system may submit the query to a database, which is configured to returns the personalization parameter. In generating the query of the session information, the computer system may transform the session information into a structured data representation. The structured data representation may provide a mapping from a session information value to a database field that is associated with or indexed for the parameters.

The session information may include in-band session information and out-of band session information. An out-of band session information may be transmitted a separate communication channel of the call. The out-of-band communication channel may include a communication channel distinct from the communication associated with the first leg of the call.

The network node may be coupled to a first network and the caller is associated with a second network. The first and second networks may use distinct signaling and media transport protocols.

According to one embodiment, the first network may include a packet-data network and the second network may include a PSTN network.

According to another preferred embodiment, the first network may include a packet-data network and the second network may include a cellular network.

According to another preferred embodiment, the first network may include a cellular network and the second network may include a PSTN network.

According to another preferred embodiment, the network node may operate in a heterogeneous networking environment.

According to another preferred embodiment, the audio processor may process a left signal path and a right signal path. The left and right signal paths may be configured based on a hearing profile for a left ear and a hearing profile for a right ear. The audio media of a call may be in monaural format. The audio processor may split the monaural audio signal for binaural processing via the left signal path and the right signal path.

According to another embodiment, the network node may adapt media information including audio, video and image media to the preferences of individual users.

According to another embodiment, the network node may perform speech recognition of the personalization and provide a transcript of the call to the subscriber.

According to another preferred embodiment, the network node provides an interface for a subscriber to select personalization presets. The interface may include settings for the subscriber to make frequency dependent gain to an audio signal.

BRIEF DESCRIPTION OF THE DRAWINGS

The foregoing features of embodiments will be more readily understood by reference to the following detailed description, taken with reference to the accompanying drawings, in which:

FIG. 5i depicts an exemplary database schema for a personalization database according to one embodiment.

DETAILED DESCRIPTION OF SPECIFIC EMBODIMENTS

Human auditory perception is highly sensitive to a myriad of static and dynamic variables. In general, audio information may be represented in either the time domain (where time is the independent variable) or in the frequency domain (where frequency is the independent variable). Transforming between time and frequency representations, which amounts to a change of variables through, for example, a Fourier transform, typically involves a tradeoff in respective resolutions in these respective domains due to the generalized uncertainty principle.

Figure 1A:
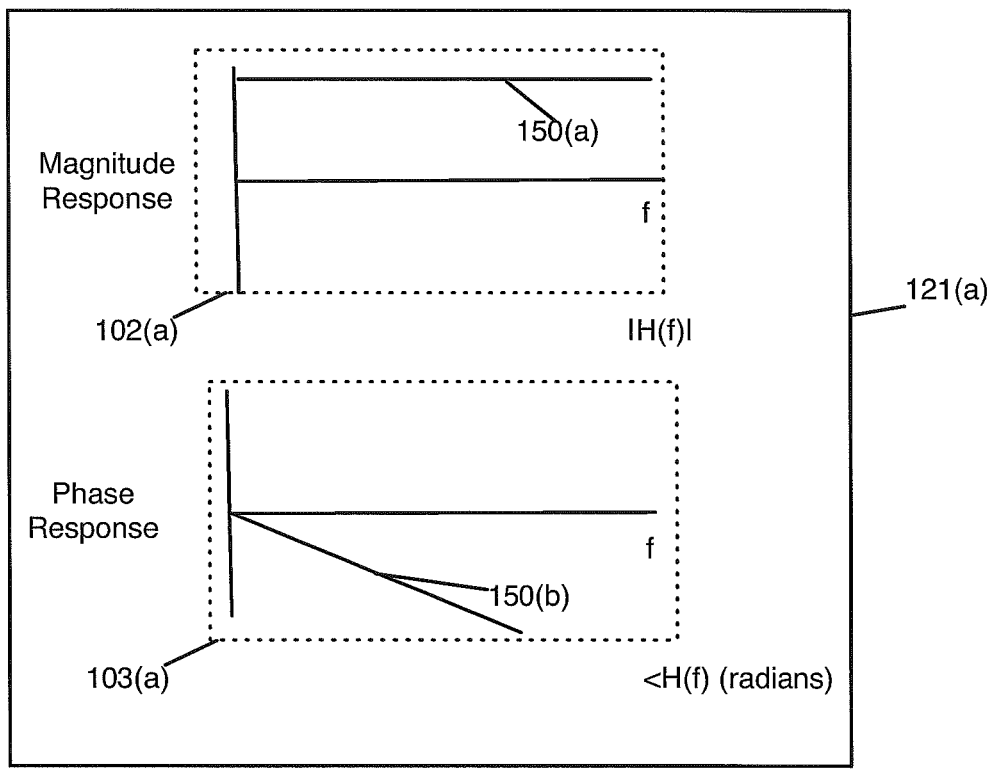
FIG. 1a depicts exemplary frequency response characteristics.
Figure 1A:
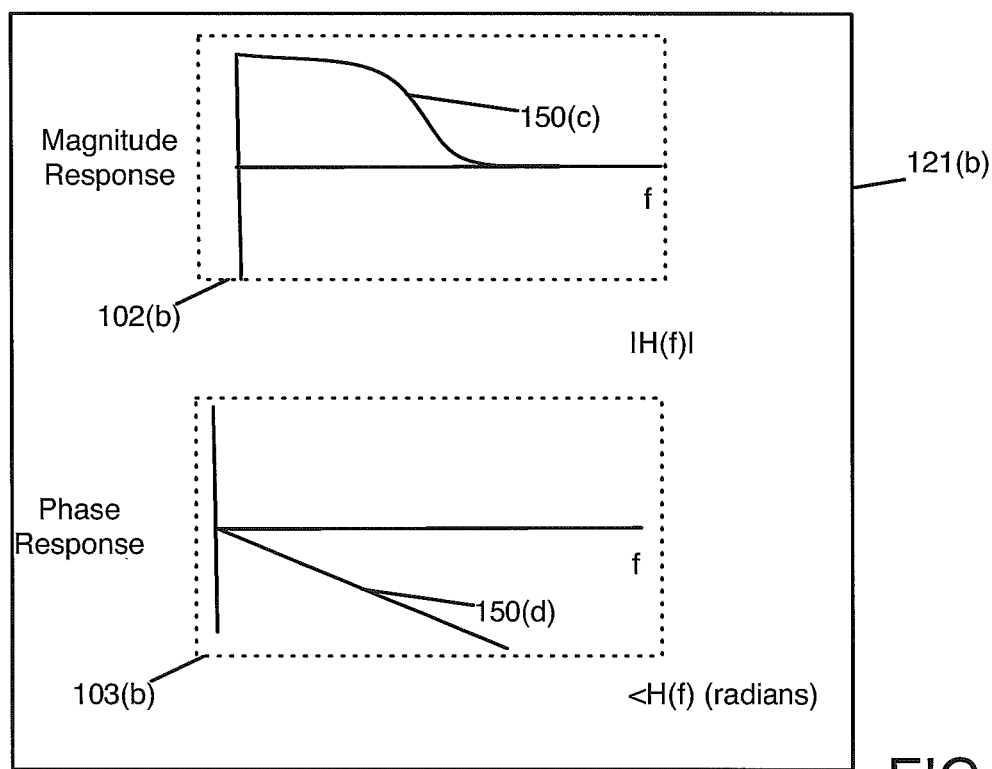

FIG. 1a depicts exemplary frequency response characteristics. Frequency response characteristics $121(a)$-$121(b)$ respectively comprise magnitude response $102(a)$ and phase response $103(a)$ and magnitude response $102(b)$ and phase response $103(b)$. As described below with respect to FIG. 1b, frequency response characteristics $121(a)$-$121(b)$ may characterize an element in an audio signal path. For example, magnitude frequency response characteristics $102(a)$ and $102(b)$ (see FIG. 1a) may pertain to the human ear. Or, magnitude frequency response characteristics $102(a)$ and $102(b)$ may pertain to a device in an audio signal path such as a playback device including headphones, speakers, microphones, codecs, etc.

Magnitude response $102(a)$ corresponding to frequency response characteristic $121(a)$ exhibits a flat or ideal magnitude characteristic $150(a)$ in which the magnitude of frequency components is passed unaltered. Magnitude response $102(b)$ corresponding to frequency response characteristic $121(b)$, on the other hand, shows high-pass attenuation represented by magnitude response characteristic $150(c)$. In particular, $150(c)$ depicts an attenuation characteristic as a function of frequency. Note that in $150(c)$ the attenuation is not constant as a function of frequency. Instead, lower frequencies are passed unaltered in magnitude while higher frequencies are attenuated in magnitude.

Phase response information plays a significant role in human auditory perception and manifests as group delay and dispersion. In this example, phase response $103(a)$ corresponding to frequency response characteristic $121(a)$ exhibits a linear characteristic as depicted by phase characteristic $150(b)$ resulting in a simple delay in the time domain. However, the phase response characteristics of an audio element may exhibit a more complex characteristic. Phase response $103(b)$ corresponding to frequency response characteristic $121(b)$ also exhibits a linear phase characteristic $150(d)$.

Figure 1B:
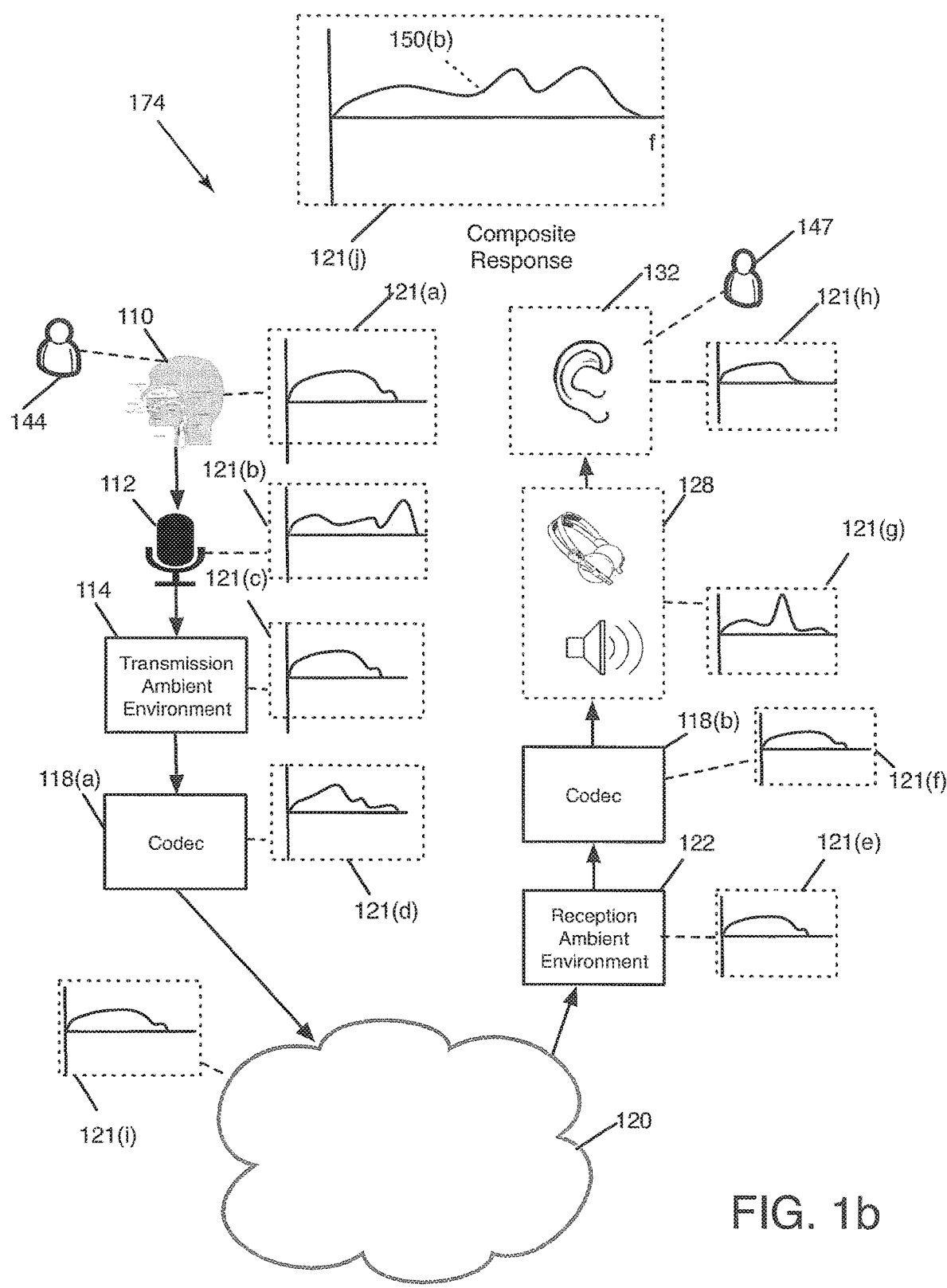
FIG. 1b depicts a signal path for the transmission of audio information over a network according to one embodiment.

FIG. 1b depicts a signal path for the transmission of audio information over a network according to one embodiment. As depicted in FIG. 1b, speaker 144 speaks to listener 147 over network 120 via signal path 174 comprising, for example, speaker voice 110, microphone 112, transmission ambient environment 114, codec $118(a)$, codec $118(b)$, network 120, reception ambient environment 122, playback device 128 and listener ear 132. Each element 110, 112, 114, $118(a)$-$118(b)$, 122, 128 and 132) exhibits a unique respective frequency response characteristic $121(a)$-$121(i)$. For simplicity, frequency response characteristics depicted in FIG. 1b only shown magnitude response characteristics. However, it is understood that frequency response characteristics $121(a)$-$121(i)$ also comprise phase response characteristics.

FIG. 1b also shows composite frequency response characteristic $121(a)$ exhibiting magnitude response characteristic $150(b)$ (composite phase response characteristic is not shown in FIG. 1b). Composite frequency response characteristic $121(j)$ represents the combined frequency response characteristic for elements 110, 112, 114, $118(a)$, 122, $118(b)$, 128 and 132. Although not depicted in FIG. 1b, a composite phase response characteristic will also affect audio quality over the network. The composite phase response will comprise the additive sum of respective phase characteristics (not shown in FIG. 1b) for each element in the signal path.

Thus, listener's ability to discriminate and perceive audio information including speech over network 120 via signal path 174 is encumbered by composite response $121(j)$. In general, composite response $121(j)$ will vary significantly depending upon each and every element in signal path 174. Furthermore, composite response $121(j)$ will vary dynamically over time depending upon time varying frequency response characteristics of individual elements.

Transparent Establishment of a Personalized Communication Session

Figure 2A:
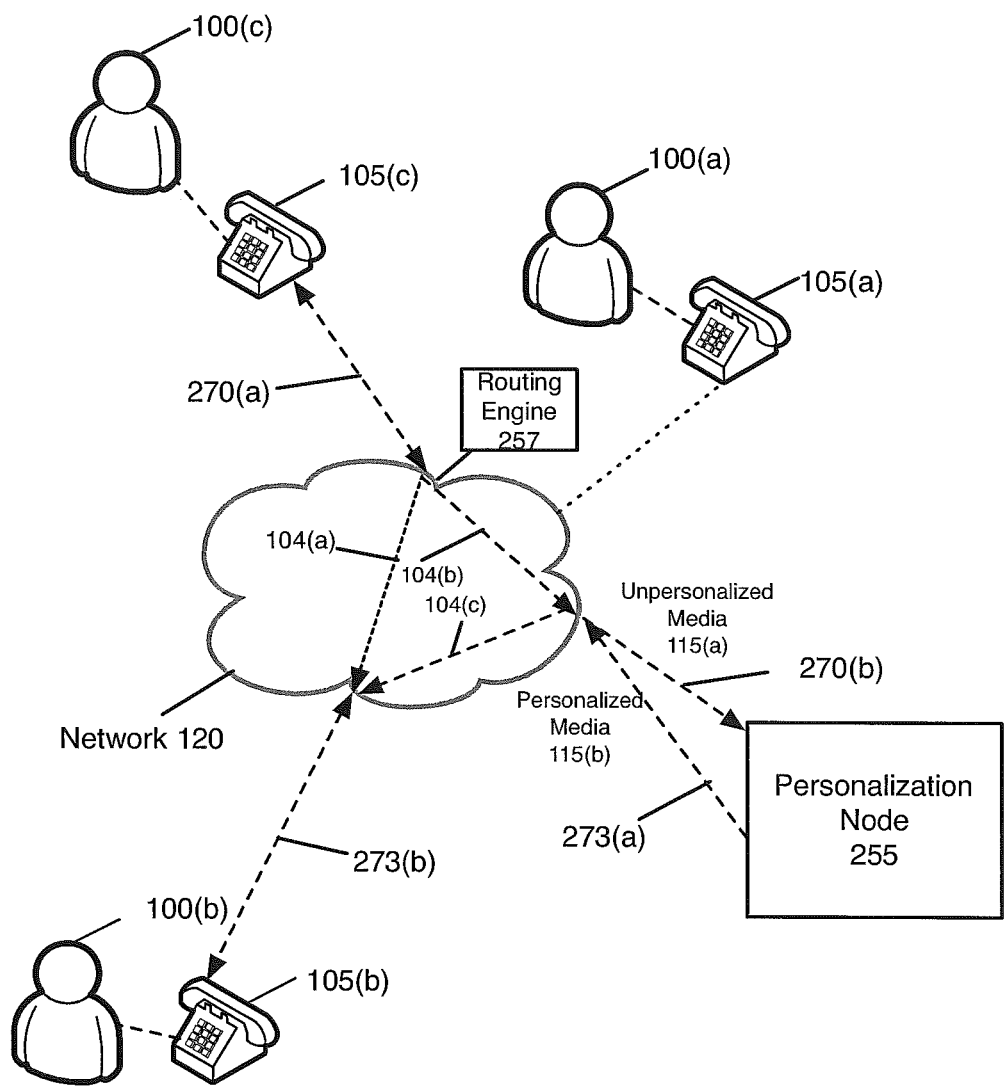
FIG. 2a depicts an operation of a personalization node within a network environment according to one embodiment.

FIG. 2a depicts an operation of a personalization node within a network environment according to one embodiment. According to one embodiment, personalization node 255 is introduced to interoperate with any number of heterogeneous communication networks in order to facilitate personalized communications between communication network users (e.g., 100(a)-100(c)). Personalization node 255 provides services for dynamic personalization of media transmitted over heterogeneous communication networks including but not limited to audio, images, video, text, etc. Personalization as described in more detail below may comprise tailoring particular media to the preferences of individual subscribers. For example, in the case of audio media, personalization node 255 may process audio transmitted over communication network 120 to be adapted to the individual preferences or needs of individual subscribers. The structure and operation of an exemplary personalization node 255 will be described in detail below.

According to one embodiment, the establishment of a personalized communication session may occur in a transparent and automatic manner. That is, subscribers to a personalization service offered by a personalization node (described in detail below) may interact with their respective communication device in a conventional manner and are not required to administer any special protocol or setup for establishing a personalized communication session. Conversely, non-subscribers to a personalization service offered by a personalization node may also establish a personalized communication session with a subscriber simply by initiating a communication session with the subscriber in a conventional manner.

Users 100(a)-100(c) are associated with respective communication devices 105(a)-105(c) through which they access communication network 120. Communication network 120 may comprise any type of packet or circuit switched network including the Plain Old Telephone Service ("POTS"), the Public Switched Telephone Network ("PSTN"), cellular and wireless networks, any packet or data network including the Internet, a wide area network ("WAN") any private or public VoIP network, internal private networks such as local area networks ("LAN"), etc. Communication network 120 typically will utilize separate protocols for the transmission of media and signaling. Where network 120 is the PSTN, it would typically utilize the Signaling System No. 7 ("SS7") protocol and in particular ISUP ("ISDN User Part") for signaling. In the case where communication network is a packet data network such as the public Internet, network 120 may use the Session Initiation Protocol ("SIP") or H.323. Furthermore, signaling may be in band or out of band. For example, the PSTN utilizes the SS7 signaling protocol, which is an out of band protocol. Communication network 120 may support the transmission of a variety of media types including audio, images, video, text, etc. via communication devices 105(a)-105(c).

Communication devices 105(a)-105(c) may be any type of communication device that may send and receive media over communication network 120. For example, in the case where communication network 120 is the PSTN, communication devices 105(a)-105(c) may be standard telephones. Where communication network 120 is a wireless cellular network, communication devices 105(a)-105(c) may be cellular telephones. Where communication network 120 is a packet or VoIP data network, communication devices may be any type of digital device including wireless devices that may access a data channel, smart phones or any type of computer. Communication devices 105(a)-105(c) are coupled to communication network 120.

In the absence of personalization node 255 (described below), users 100(a)-100(c) may communicate with one another via media types supported by communication network 120 and respective communication devices 105(a)-105(c), but have little ability to control or personalize the media characteristics and quality to their individual preferences. In particular, as shown in FIG. 2a, if user 100(c) initiates a communication session with user 100(b) using communication device 105(c), a communication session is established via inbound link 270(a), communication network 120 (via network path 104(a)) and outbound link 273(b) to communication device 105(b) associated with user 100(b). However, the general principles in the forthcoming high level description may apply equally to an exemplary case where user 100(b) initiates a communications session with user 100(c).

A high level description of the operation of personalization node 255 as it may interoperate with network 120 will now be provided. One or more of users 100(a)-100(c) may be subscribers to personalization services provided by personalization node 255. For the purposes of this example, it is assumed that at least user 100(b) is a subscriber to one or more personalization services provided by personalization node 255. It is further assumed that user 100(c) desires to initiate a communication session with user 100(b).

In this instance, user 100(c) utilizes communication device 105(c) to initiate a communication session with user 100(b) in a standard manner. It will become evident as the operation of personalization node 255 is further described that network users 100(a)-100(c) may interact with network 120 in a usual manner and nonetheless, personalization services offered by personalization node 255 are invoked transparently. In order to achieve this transparency, routing engine 257 is configured to automatically cause the routing of a communication session through personalization node 255. The structure and operation of routing engine 257 will become evident as described below. For the present discussion it should be understood that routing engine 257 may comprise any combination of hardware and software elements, may utilize infrastructure associated with network 120 or may be located locally upon communication devices 105(a)-105(c). According to one embodiment, routing engine 257 may interoperate with a signaling protocol or signaling infrastructure associated with communication network 120 in order to effect the routing or redirection to personalization node 255.

According to the present example, upon user 100(c) initiating a communication session with subscriber 100(b), routing engine 257 effects a routing of signaling and media information associated with the communication session over network path 104(b) to personalization node 255 rather than network path 104(a), which would otherwise be used. Personalization node 255 may utilize signaling information received to query a personalization database (not shown in FIG. 2a) using session information (described below) associated with the communication session. Based upon a response to this query and determining that user 100(c) has initiated a communication session with user 100(b), personalization node 255 recognizes that user 100(b) is a subscriber to one or more personalization services offered by personalization node 255. Accordingly, personalization node 255 automatically configures itself based upon information associated with the communication session as well as attributes associated with subscriber 100(*b*) and user 100(*c*), which may also be retrieved from a database query to provide a personalization service for media on the communication session.

Upon configuration, personalization node 255 may establish an outbound communication path to communication device 105(*b*) associated with user 100(*b*) via outbound links 273(*a*), communication network 120 (via network path 104(*c*)) and outbound link 273(*b*). Upon the establishment of the outbound communication path, unpersonalized media 115(*a*) flows from user 100(*b*) via communication device 105(*c*) over inbound link 270(*a*) through network path 104(*b*) to personalization node 255 via inbound link 270(*b*). At personalization node 255, unprocessed media 115(*a*) is personalized according to the previously created configuration of personalization node 255 and thereby transformed to personalized media 115(*b*). Personalized media 115(*b*) is then transmitted by personalization node 255 over the outbound communication path including outbound link 273(*a*), network path 104(*c*) and outbound link 273(*b*) to communication device 105(*b*) associated with 100(*b*). In this manner, subscriber 100(*b*) may enjoy personalized media in a transparent and seamless manner.

Assuming user 100(*c*) is not a subscriber to personalization services offered by personalization node 255, media generated by user 100(*c*) would propagate through personalization node 255, although it would not be personalized for user 100(*c*). In an alternative scenario, user 100(*c*) in the previous example may also have been a subscriber to personalization services offered by personalization node 255. In such case, media generated by user 100(*b*) would also be transmitted through personalization node 255 through a reverse path, personalized at personalization node 255 and transmitted to user 100(*c*). In this instance, both subscribers 100(*b*) and 100(*c*) would enjoy media personalized via personalization node 255.

Figure 2B:
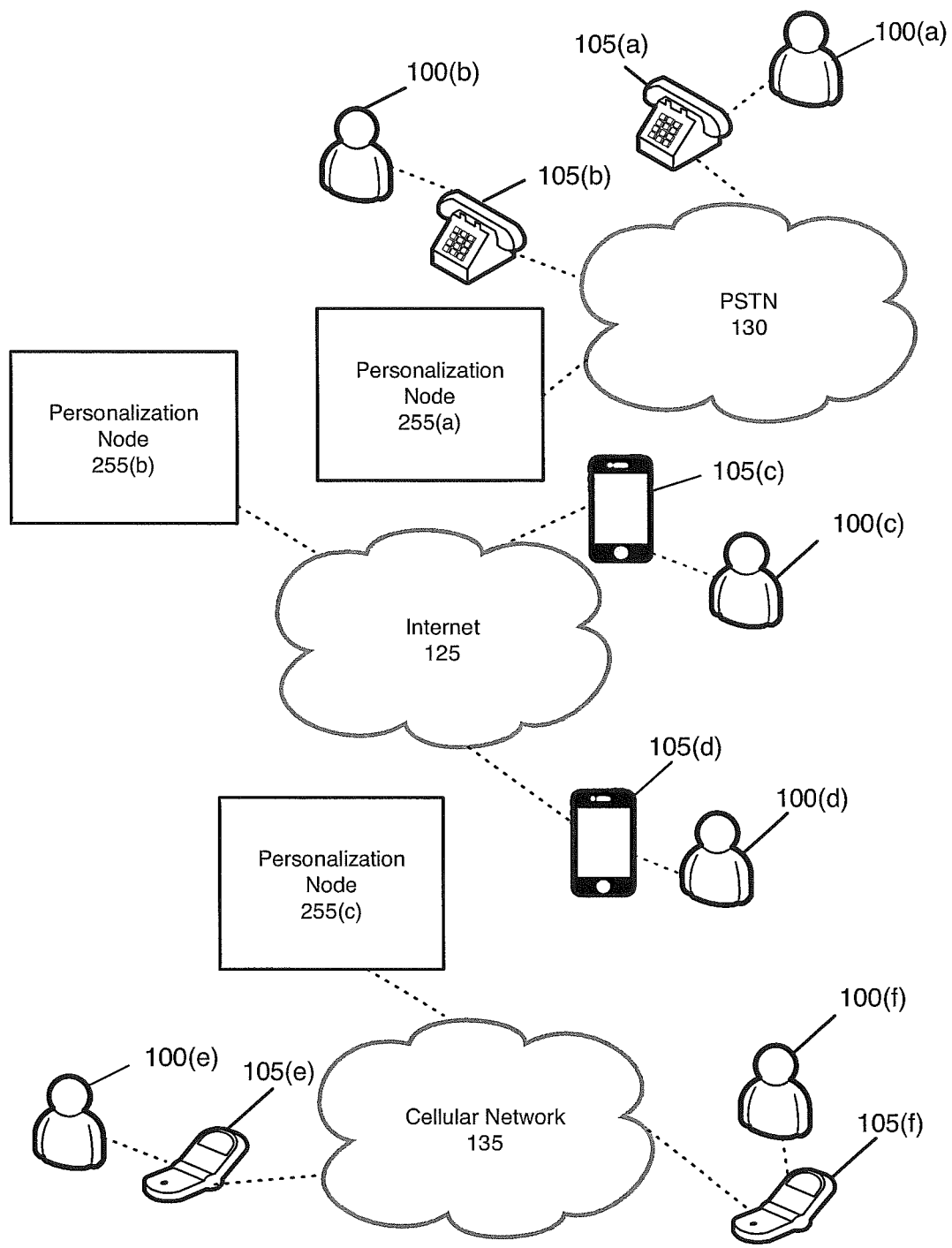
FIG. 2b illustrates one exemplary topology for deployment of personalization services in across heterogeneous networks.

FIG. 2*b* illustrates one exemplary topology for deployment of personalization services in and across heterogeneous networks. In particular, as shown in FIG. 2*b* users 100(*a*) and 100(*b*) utilize PSTN for communications, users 100(*c*) and 100(*d*) utilize Internet 125 for communications while users 100(*e*) and 100(*f*) utilize cellular network 135 for communications. PSTN 130, Internet 125 and cellular network 135 are each associated with personalization node 255(*a*), personalization node 255(*b*) and personalization node 255(*c*) respectively. Thus, users 100(*a*) and 100(*b*) may invoke personalization services offered by personalization node 255(*a*) over PSTN 130 via respective communication devices 105(*a*) and 105(*b*). In this instance, access devices 105(*a*) and 105(*b*) may be standard telephones. On the other hand, users 100(*c*) and 100(*d*) may invoke personalization services offered by personalization node 255(*b*) over Internet 125 via respective communication devices 105(*c*) and 105(*d*). Communication devices 105(*c*) and 105(*d*) may be smartphones, cellular telephones with data network access, personal computers or any computing device with network access. Finally, users 100(*e*) and 100(*f*) may invoke personalization services offered by personalization node 255(*c*) over cellular network 135 via respective communication devices 105(*e*) and 105(*f*). Communication devices 105(*e*) and 105(*f*) may be, for example, cellular telephones.

Figure 2C:
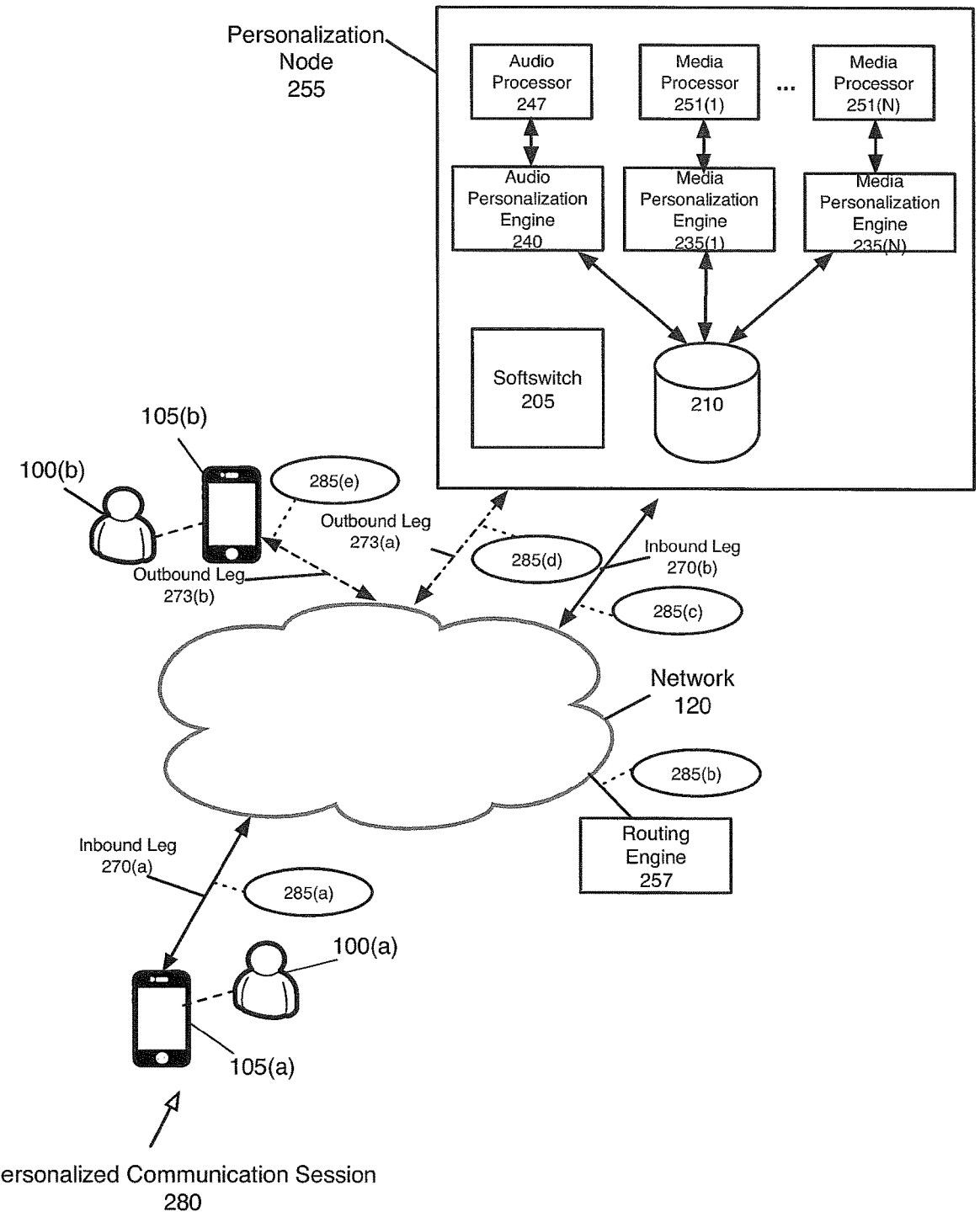
FIG. 2c depicts a network topology for automatically establishing a personalized communication session between users of a communication network.

FIG. 2*c* depicts a network topology for automatically establishing a personalized communication session between users of a communication network. A personalized communication session 280 is described in greater detail below, but may be understood to mean in general any adaptation of a communication session and its associated media to the preferences of one or more parties involved in the communication session over communication network 120. Communication network 120 may comprise any type of packet or circuit switched network including the Plain Old Telephone Service ("POTS"), the Public Switched Telephone Network ("PSTN"), cellular and wireless networks, any packet or data network including the Internet, a wide area network ("WAN") any private or public VoIP network, internal private networks such as local area networks ("LAN"), etc.

Further, network 120 may utilize any corresponding protocols for signaling and media transport including SS7, SIP, H.323, UMTS, GSM, etc. Furthermore, as depicted with reference to FIG. 2*c* below, personalization node 255 may operate in a heterogeneous networking environment in which a personalized communication session may be established via internetworking between one more heterogeneous networks.

Communications devices 105(*a*) and 105(*b*) may be any type of communication devices capable of interfacing with network 120. For example, in the case where network 120 is the PSTN, communication telephone devices may be landline telephones. In the case where network 120 is a wireless network, communication devices 105(*a*) and 105(*b*) may be cellular telephones. Similarly, in the case where network 120 is a data network such as the Internet, communication devices 105(*a*) and 105(*b*) may be VoIP devices using the SIP protocol, in which case communication devices 105(*a*) and 105(*b*) would act as user agents ("UA"). Communications devices 105(*a*), 105(*b*) and personalization node 255 may be associated with addresses. In the case where network 120 is the PSTN, addresses may be a telephone numbers on the PSTN. In the case where network 120 is a data network such as the Internet, network addresses may be IP ("Internet Protocol") addresses. In a VoIP context, network addresses for communication devices 105(*a*)-105(*b*) may be SIP addresses.

In the absence of personalization node 255, users (e.g., 100(*a*) and 100(*b*)) of communication network 120 would typically initiate communication sessions between one another over network 120 by utilizing a standard protocol associated with network 120 and their respective communication devices 105(*a*)-105(*b*). For example, in the case where communication network 120 is the PSTN, a user 100(*a*) (acting as the caller) desiring to initiate a communication session with user 100(*b*) (callee) would typically do so simply by dialing a telephone number of user 100(*b*). In other scenarios, however, such as where communication network 120 is a packet network supporting VoIP communications, a caller might be required, for example, to launch an application on a smart phone and selecting an intended recipient from a menu or other means. In this scenario, typically communication devices 105(*a*) and 105(*b*) might be running the SIP protocol or H.323.

A communication session may comprise any exchange of media information between one or more users of communication network 120. For example, a communication session may comprise a standard telephone call in the case where communication network 120 is the PSTN, a cellular call in the case where communication network 120 is a cellular network, a VoIP call in the case where communication network 120 is a packet network such as the Internet or private packet network, etc. Media information may comprise audio, image, video, text or other media or multimedia information supported by communication network 120.

According to one embodiment, users of communication network 120 may subscribe to one or more services offered by personalization node 255. Subscribers to a service provided by personalization node 255 may interact with communication network 120 in a usual manner and without being required to perform any special operations. That is, subscribers may initiate communication sessions with non-subscribers or other subscribers or receive requests for communication sessions with non-subscribers or other subscribers and by virtue of their subscriber status with respect to personalization node 255, personalized communication session 280 is automatically established. Conversely, whereupon a non-subscriber initiates a communication session to a subscriber using network 120 in a usual manner, personalized communication session 280 between the non-subscriber and subscriber may be automatically established via personalization node 255. Thus, the establishment of personalized communication session 280 between a subscriber to a service offered by personalization node 255 and any other party may be established transparently and without any special operations on behalf of a party initiating the communication session (subscriber or non-subscriber). That is, the party initiating a communication session may do so according to standard protocol associated with network 120 and the establishment of personalized communication session 280 is accomplished transparently and automatically.

According to one embodiment, an automatic establishment of a personalized communication session 280 may be established upon a triggering event. The triggering event may comprise, for example, a subscriber initiating a communication session using only conventional methods offered by communication network 120 or it may comprise the subscriber receiving a request for a communication session by a third party or other subscriber, wherein the third party or other subscriber initiating the communication session may do so using conventional methods offered by communication network 120. For example, in the case wherein communication network 120 is the PSTN a triggering event may be a subscriber dialing a telephone number of third party or second subscriber. Conversely the triggering event may be a third party or second subscriber dialing the telephone number of the subscriber.

According to one embodiment, personalized communication session 280 may comprise any adapting, processing, transformation, etc. of any type of media information to conform to the personalization preferences of a subscriber. Further, a personalized communication session may involve more than two parties. Personalization node 255 may provide personalized communication services based upon the preferences of individual subscribers. According to one embodiment, personalized communication services may include adapting media information including, but not limited to, audio, video and image media to the preferences of individual users. Personalization node 255 may also provide enhanced communication services such as real-time voice recognition and provide an associated real-time data feed of transcribed speech simultaneous with personalized media.

For example, in the case of personalized audio, personalization node 255 may adapt audio media on a call based upon any number of static or dynamic variables. According to one embodiment these variables may include the hearing profiles of subscribers, hardware and software components active on a communication session such as microphones, playback devices and codecs being used, time-varying network condition, time varying ambient environments in which users may be located such as noisy environments, voice characteristics of at least one user etc.

An automatic establishment of a personalized communication session 280 between users 100(a) and 100(b) will now be described. Referring again to FIG. 2c, for purposes of this example, it is assumed that user 100(a) desires to initiate personalized communication session 280 with user 100(b). Although only two users of communication network 120 are shown (100(a) and 100(b)), it is understood that the functionality of personalization node 255 would operate similarly with respect to additional users. It is further assumed that user 100(b) is a subscriber to personalized communication services provided by personalization node 255. For purposes of this example, user 100(b) will also be referred to as a subscriber since that user is assumed to have subscribed to one or more personalization services offered by personalization node 255. In this example, user 100(a) may or may not be a subscriber to personalized communication services proved by personalization node 255. For purposes of this example, user 100(b) will also be referred to as a subscriber since that user is assumed to have subscribed to one or more personalization services offered by personalization node 255.

According to the example depicted in FIG. 2c, since user 100(b) is a subscriber to one or more services provided by personalization node 255, personalization node 255 is adapted to automatically provide personalized communications specifically adapted to user 100(b) when subscriber 100(b) participates in a communication session with any other user of communication network 120. As will become evident as the functionality of personalization node 255 is further described, the personalization service may also be automatically adapted not only with respect to the particular characteristics of subscriber 100(b) but also to the personal characteristics of other parties participating in personalized communication session 280 (i.e., in this example user 100(a)). As described above, the personalization process may be based upon any arbitrary number of static or dynamic variables associated with subscriber 100(b), user 100(a), network 120, equipment used on the call including respective communication devices 105(a) and 105(b) or other equipment implicated in a communication session between user 100(a) and 100(b) such as microphones, playback devices, codecs, cameras, etc.

According to one embodiment, personalization node 255 may include softswitch 205, personalization database 210, audio personalization engine 240 and optionally an arbitrary number of media personalization engines 235(1)-235(N). Personalization node 255 may further include audio processor 247 and optionally any arbitrary number of media processors 251(1)-251(N). Audio personalization engine 240 is associated with audio processor 247. Optional media personalization engines 235(1)-235(N) may be respectively associated with media processors 251(1)-251(N).

Softswitch 205 may perform one or more of switching, routing, bridging, encoding, decoding, PBX ("Private Branch Exchange"), call logic, IVR ("Interactive Voice Response"), muxing and demuxing of multimedia information operations at personalization node 255. As described in detail below, softswitch 205 may receive session information from network 120 and control transmission of session information to audio personalization engine 240 and media personalization engines 235(1)-235(N). The nature of session information will be evident as the functionality of personalization node 255 is further described, but for purposes of the current explanation session information may relate to any information associated with a communication session including identities of users 100(a) and 100(b), equipment utilized for the communication session, time-varying conditions during the communication session and may be utilized for configuring personalization node 255 to perform personalization services specifically for users 100(a)-100(b) and other attributes associated with the communication session. Softswitch 205 may also control the execution of various software routines running on audio personalization engine 240, media personalization engines 235(1)-235(N), audio processor 240 and/or media processors 251(1)-251(N) based upon static or dynamic call logic.

Personalization database 210 may comprise a relational database, which may be addressed using SQL ("Structured Query Language") such as a MySQL database. Alternatively, personalization database may comprise a non-relational character such as BigTable or other non-normalized structure. In this instance, for example, personalization database may be implemented using HBase or Cassandra. Alternatively, personalization database 210 may utilize a key-value store arrangement such as Memcahced.

Audio personalization engine 240 may provide real-time dynamic personalization of a communication session between users (e.g., 100(a) and 100(b)). Audio personalization engine 240, which is described in detail below, may include, for example, signal processing functionality (either digital or analog) to process one or more audio streams exchanged between a subscriber (e.g., 105(b)) and a third party whether that party is a subscriber or non-subscriber (e.g., 105(a)) during personalized communications session 280. Media personalization engines 235(1)-235(N), may function similarly with respect to their associated media types. For example, in the case where media personalization engine 235(1) is a video personalization engine, associated media processor 251(1) may be a Digital Signal Processor ("DSP") specifically adapted to performing video processing and may process video media information during personalized communication session 280 in accordance with the preferences of subscriber 100(b).

A media personalization engine (i.e., 235(1)-235(N)) may also be speech recognition personalization engine in which case an associated media processor (e.g., 251(1)-251(N)) may be a speech recognition processor. In this context, a live text feed of transcribed speech may be provided solely or in conjunction with other personalized media during personalized communication session 280. A speech recognition personalization engine may interact with an associated speech recognition processor in order to dynamically configure and control the format of recognized speech and its integration with other media provided during personalized communication session 280. Although media personalization engines 235(1)-235(N) are depicted as separate functional elements, they may in fact be combined with respective media processors 251(1)-251(N) in a common functional element. Similarly, audio personalization engine 240 may be combined with audio processor 247 in a common functional element. Similarly, softswitch 205, audio personalization engine 240 and/or media personalization engines 235(1)-235(N) may be combined into a single functional element.

According to one embodiment, personalization database 210 may store personalization information for subscribers to one or more services provided by personalization node 255 (in this example user 100(a)). Personalization information may include any type of information or data that may be utilized for adapting, transforming, characterizing or analyzing media information in a communication session. In the case of audio personalization, for example, personalization database 210 may store processing information, which may comprise signal processing parameters personalized for each subscriber (e.g., 100(b)). Personalization database 210 may also store preference information regarding subscriber personalization preferences, including, for example, certain personalization presets. As described below, audio personalization engine may retrieve audio signal processing parameters from personalization database 210 in order to configure audio processor 247 during initiation of a personalized communication session 280. Further, audio personalization engine may dynamically adjust audio signal processing parameters during the evolution of personalized communication session 280. Similarly, media personalization engines 235(1)-235(N) may retrieve relevant media personalization parameters from personalization database 210 during initiation and evolution of personalized communication session 280 and respectively configure associated media processors 251(1)-251(N).

Personalization database 210 may also store associated subscriber preferences regarding media processing such as presets to be utilized dynamically in association with particular communication session configurations.

In the case of audio personalization, audio signal processing parameters stored in personalization database 210 may comprise parameters for configuring specific signal processing blocks in a signal processing topology. In addition, audio signal processing parameters may be information describing particular signal processing topologies such as a layout of DSP functional blocks. Exemplary representation of audio DSP layout information is described below with respect to FIG. 8b.

In addition or in conjunction with signal processing parameters, personalization database 210 may also store raw hearing profile information such as audiograms, pain-threshold (comfort) levels as well as information regarding dynamic hearing abilities of each subscriber such as time-domain information regarding hearing abilities. In addition, personalization database 210 may also store equipment information that particular subscribers may employ in a communication session such as information relating to frequency response or other audio characteristics for particular headsets, microphones, codecs, etc. For example, personalization database 210 may store information regarding audio characteristics of communication device 105(b) typically used by subscriber 100(b) as well as other equipment associated with subscriber 100(b) including microphones, headsets, codecs, etc. In addition, personalization database 210 may also store voice profile information of contacts associated with subscriber 100(b).

Personalization database 210 may store information regarding non-subscribers with whom subscriber 100(b) may frequently interact. For example, as described in detail below, audio processing may be adapted based upon the nature of a speaker's voice profile. In this case, personalization database 210 may store specific audio DSP parameters to be utilized by audio processor 247 when such speaker is involved in a personalized communication session 280 with subscriber 100(b). Or, in this context, personalization database 210 may store information regarding the actual voice profile characteristics of particular speakers. Information regarding non-subscribers may further include, for example, equipment and codecs typically used in a communication session, parameters representing voice characteristics of non-subscribers, etc. This information may be referenced, for example, based upon a simple contact list for a given subscriber.

In addition, as described below, personalization database 210 may store or reference personalization logic that is executed during initiation and evolution of personalized communication session 280 to dynamically determine optimum personalization settings for a personalized communication session 280. Personalization logic may comprise any information in a computer readable form representing instructions or logic to be performed by a general purpose or special purpose computing device. For example, personalization logic may comprise a computer scripting language such as BASH, Perl or Python. It may also comprise a markup language such as XML. Exemplary personalization logic is described below with respect to FIG. 5h. An exemplary schema for personalization database 210 is described in detail below with respect to FIG. 5i.

Alternatively, as described below with respect to FIG. 2g, personalization information for subscribers and/or non-subscribers may also be obtained dynamically during initiation and evolution of personalized communication session 280 directly from subscribers and non-subscribers rather than by retrieving it from personalization database 210. This information may be retrieved directly via respective communication devices (e.g., 105(*a*) and 105(*b*)) over network 120 or may be transmitted as out of band information via an auxiliary network.

Audio processor 247 performs signal processing on audio signals and may operate in the analog or digital domain. Further, in the case of digital signal processing ("DSP"), audio processor 247 may comprise either a special purpose dedicated DSP or general purpose computing resource. According to one embodiment, audio processor 247 is dynamically addressable and may be configured to perform DSP in accordance with specific DSP topological layouts and parameters. In particular, as shown in FIG. 2g, audio personalization engine 240 may communicate with audio processor 247 to configure audio processor 247 for specific audio processing based upon information retrieved by audio personalization engine 240 from personalization database 210.

Similarly, media processors 251(1)-251(N) may perform signal processing on other respective media types, e.g., images, video, text, etc., may operate in the digital or analog domains, may be dynamically addressable and configurable and may either be special purpose DSPs or general purpose compute resources. Similar to audio processor 247, as shown in FIG. 2g, media personalization engines 235(1)-235(N) may communicate with respective media processors 251(1)-251(N) to configure the media processor for specific processing based upon information retrieved by the media personalization engine from personalization database 210.

During initiation of personalized communication session 280, audio personalization engine 240 may dynamically configure audio processor 247 based upon any combination of personalization information including preferences and personalization logic retrieved from personalization database 210 (e.g., pertaining to users 100(*a*) and/or 100(*b*)). Audio personalization engine 240 may also utilize personalization information retrieved directly from either or both users 100(*a*)-100(*b*) as described below.

Furthermore, during the evolution of personalized communication session 280, audio personalization engine 240 may further dynamically configure audio processor 247 based upon real-time control messages provided during personalized communication session 280 by one or more of its participants whether they be subscribers or non-subscribers to services offered by personalization node 255 (e.g., 100(*a*) and/or 100(*b*)). For example, audio personalization engine 240 may retrieve either or both information relating to DSP parameters as well as personalization logic from personalization database 210 in order to configure audio processor 247 for providing personalized audio. Similarly, during initiation of a communication session media personalization engines 235(1)-235(N) may perform similar functions with respect to their associated media types utilizing respective media processors 251(1)-251(N). An exemplary operation of audio personalization engine 240 in configuring audio processor 247 is described in detail below.

During initiation of personalized communication session 280, media personalization engines 235(1)-235(N) may dynamically configure respective media processor 251(1)-251(N) utilizing any combination of personalization preferences and personalization logic retrieved from personalization database 210 (e.g., pertaining to users 100(*a*) and/or 100(*b*)) and/or personalization information retrieved from users 100(*a*)-100(*b*). Furthermore, during the evolution of personalized communication session 280, media personalization engines 235(1)-235(N) may further dynamically configure respective media processors 251(1)-251(N) based upon real-time control messages provided during personalized communication session 280 by one or more of its participants whether they be subscribers or non-subscribers to services offered by personalization node 255 (e.g., 100(*a*) and/or 100(*b*)).

Audio personalization engine 240 and/or media personalization engines 235(1)-235(N) may be co-located on personalization node 255 or alternatively, although not specifically depicted in FIG. 2a, it may be co-located on a device such as 105(*a*) or 105(*b*). In the case where audio personalization engine 240 or media personalization engines 235(1)-235(N) are co-located with device 105(*a*) or 105(*b*), they respectively interact with personalization node 255 via network 120 to retrieve information from personalization database 210 in order to configure either audio processor 247 or respective media processor 251(1)-251(N). Alternatively or in combination audio processor 240 and media processors 251(1)-251(N) may be co-located with device 105(*a*) or 105(*b*).

FIG. 2c also shows routing engine 257, which may automatically perform routing and/or redirection of a communication session initiated by user 100(*a*) to subscriber 100(*b*) to personalization node 255. Routing engine 257 may comprise virtual or physical switching logic and/or signaling infrastructure internal or external to network 120 to effect a routing or redirection of a communication session directed to subscriber 100(*b*) to personalization node 255. Routing engine 257 may operate in-band or out-of-band with respect to media transported on communication network 120.

With respect to the operations of routing engine 257, several possibilities arise in which 1) the only party initiating the communication session is a subscriber, 2) only the party receiving a request for a communication session is a subscriber, or 3) both parties are subscribers. The operation of routing engine 257 will also depend upon the particular nature of communication network 120 (packet data), circuit switched (e.g., PSTN) as well as the underlying signaling and media transport protocols associated with communication network.

In the case where network 120 is a packet data network such as the Internet, routing engine 257 may be implemented utilizing a signaling protocol associated with the transport of media over the network (e.g., SIP or H.323). In particular, if communication network 120 utilizes SIP, routing engine 257 may be a Back-to-back User Agent ("B2BUA") or a 2 g proxy server. An exemplary routing engine 257 implemented on a packet data network is described below with reference to FIGS. 2d-e.

In the case where communication devices 105(a)-105(b) are smartphones are otherwise programmatically addressable, routing engine 257 may also be implemented directly on communications device 105(a) such that communications device 105(a) re-addresses packets destined to a network address associated with communications device 105(b) to a network address associated with personalization node 255. Redirection engine 257 may also be effected in the context of SIP using a redirection server. An exemplary embodiment is referenced below with respect to FIG. 2g.

In the case where communication network 120 is the PSTN, several embodiments arise depending upon whether the party initiating the communication session is a subscriber, the party receiving a request for a communication session is a subscriber or both parties are subscribers. According to one embodiment, in the case where communication network 120 is the PSTN, routing engine 257 may comprise out of band or in band signaling elements associated with communication network 120 (i.e., PSTN) to automatically forward calls placed to subscriber 100(b) to personalization node 255. According to one embodiment, as described with reference to FIG. 2d, such signaling infrastructure may comprise a combination of a service switching point ("SSP"), service control point ("SCP") and a service transport point ("STP"). However, other arrangements are possible to effect such redirection.

In the case where communication network 120 is a cellular or wireless network, redirection engine 257 may also comprise associated signaling infrastructure preconfigured to forward calls placed to subscriber 100(b) to personalization node 255.

FIG. 2c also shows inbound legs 270(a)-270(b) and outbound legs 273(a)-273(b). The various legs may comprise physical or virtual resources with respect to the nature of communication network 120. For example, in the case where communication network 120 is a circuit switched network, inbound legs 270(a)-270(b) and outbound legs 273(a)-273(b) may be dedicated communication links. Alternatively they may be virtual communication links, for example resources allocated from a logical resource pool. In addition, inbound legs 270(a)-270(b) and 273(a)-273(b) may simply represent the traversal of a packet based network, for example, there may be routing between servers on the public Internet or a private packet data network.

A transparent and automatic establishment of personalized communication session 280 between user 100(a) and subscriber 100(b) will now be described. As shown in FIG. 2c, according to one embodiment, personalized communication session 280 is effected by automatically interjecting personalization node 255 into a network path between a subscriber (i.e., 100(b)) and one or more other parties involved in the communication session. During personalized communication session 280, personalization node 255 processes and adapts media to the preferences of subscribers (e.g., 100(b)) and also provides a media bridging function between inbound leg 270(b) and outbound leg 273(a).

After personalized communication session 280 is established, unprocessed media 115a generated by user 100(a) (shown in FIG. 2a) and received on communication device 105(a) traverses inbound leg 270(a), communication network 120, and inbound leg 270(b).

Personalized communication session 280 between user 100(a) and user 100(b) is established via routing engine 257 and personalization node 255. For purposes of illustration and explanation, it is assumed that communication network 120 is a generic communication network and user 100(a) (caller) initiates a communication session with user 100(b) (callee) over communication network 120. Specific embodiments relating to particular network types (e.g., packet data (Internet or private data network), PSTN, cellular) are described in detail below with respect to FIGS. 2d to 3d. Further, according to one embodiment routing engine 257 may be collocated with personalization node 255.

As described previously, user 100(a) (caller) may interact with communication network 120 in a standard manner as any user would typically engage when initiating any communication session over communication network 120. Typically user 100(a) will utilize communication device 105(a) to initiate a communication session with subscriber 100(b). The establishment of personalized communication session 280 may occur in two stages, a setup phase in which signaling information is transmitted from user 100(a) ultimately to personalization node 255 where it is analyzed and processed to configure or reserve media resources for personalized communication session 280.

According to this example, user 100(a) initiates a communication session with subscriber 100(b) in a normal manner associated with communication network 120 (e.g., dialing a telephone number or other identifier such as a SIP identifier) on communication device 105(a). In 285(a) (referring still to FIG. 2c), signaling information associated with the intended communication session is transmitted over inbound leg 270(a) to communication network 120. In 285(b), signaling information is provided to routing engine 257. Routing engine 257 may then perform analysis of the communication session by analyzing the transmitted signaling information and/or other associated information such as the identity of the callee (subscriber 100(b)) using the dialed-telephone number (ANI in the case of PSTN), SIP ID, etc. Routing engine 257 may also initiate communication with external signaling infrastructure associated with network 120 (not shown in FIG. 2c). Upon routing engine 257 ascertaining that the callee is user 100(b) (a subscriber to services offered by personalization node 255), in 285(c), routing engine 257 causes signaling information for the communication session be routed to personalization node 255 via inbound leg 270(b).

As noted previously, routing engine 257 may, according to one embodiment, be collocated with personalization node 255. In that instance, the signaling topology may diverge from that shown specifically in FIG. 2c. Namely, upon caller (100(a)) initiating a communication session, inbound legs 270(a) and 270(b) are directly established and routing engine 257 does itself perform routing to personalization node 255 as it is collocated with that node. However, in this instance routing engine 257 does perform operations to route an outbound link to callee (subscriber 100(b)).

Upon routing to personalization node 255, signaling information associated with the communication session is received by softswitch 205, which may extract in-band session information for the call (not shown in FIG. 2c). In-band session information as described in detail below may include any information transmitted as part of the may include, for example, caller ID information, ANI information, equipment information associated with communication device 105(a), callee information including the number of subscriber 105(b) (callee). As described in detail below with respect to FIG. 4a, out-of-band session information (not shown in FIG. 2c) may also be transmitted to personalization node as well.

Softswitch 205 may then transmit both in-band and out-of-band session information to audio personalization engine 240 and/or media personalization engines 235(1)-235(N). Audio personalization engine 240 and/or media personalization engines 235(1)-235(N) may then use in-band and out-of-band session information to construct queries to personalization database 210. The construction of such database queries may be hardcoded or may utilize dynamic logic.

In response to such queries, personalization database 210 may return personalization information to either audio personalization engine 240 or media personalization engines 235(1)-235(N). As will be described in detail below with respect to FIG. 5i, personalization information may comprise any information for either direct or indirect configuration of audio processor 247 or media processors 251(1)-251(N). Based upon personalization information retrieved from personalization database 210, audio personalization engine 240 and/or media personalization engines 235(1)-235(N) may respectively generate audio personalization parameters and/or respective media personalization parameters (not shown in FIG. 2c).

In order to transform personalization information retrieved from personalization database 210 into either audio personalization parameters (for audio personalization engine 240) or respective media personalization parameters (for media personalization engines 235(1)-235(N)), the respective personalization engines may utilize either pre-configured algorithms or dynamic algorithms or logic including personalization logic retrieved from personalization database 210.

Thus, for example, audio personalization engine 240 may utilize personalization information retrieved from personalization database 210 (including personalization logic) in conjunction with in-band and out-of-band session information to generate audio personalization parameters, which it may then use to configure audio processor 247. In particular, because audio processor 247 is addressable via an API, audio personalization engine 240 may use the generated audio personalization parameters to transmit messages via the associated API to configure audio processor 247. According to one embodiment, audio personalization parameters may include DSP parameters and audio DSP topological information, which may be used to configure audio processor 247. Audio DSP topological information may include a particular set of DSP modules to be utilized by audio processor 247 as well as an associated interconnect for those DSP modules. Audio topological information is described below with respect to FIG. 8a.

Similarly, softswitch 205 may also transmit both in-band and out-of-band session information to one or more media personalization engines 235(1)-235(N), which may respectively use the in-band and out-of-band session information in conjunction with personalization information retrieved from personalization database 210 to generate respective media personalization parameters, which are used configure respective media processors 251(1)-251(N).

Upon configuration of audio processor 247 and/or media processors 251(1)-251(N), softswitch 205 may perform a number of operations to establish an outbound link for the personalized communication session to subscriber 100(b) as well as internal routing of media information for the call via audio processor 247 and/or media processors 251(1)-251(N). In particular, upon configuration of audio processor 240 and/or media processors 251(1)-251(N) via audio personalization engine 240 and respective media personalization engines 235(1)-235(N), softswitch 205 may then establish routing of the media on the call to audio processor 247 and/or media processors 251(1)-251(N). In this fashion, softswitch performs demultiplexing of media on the call and routing of the media to the respective audio processor 247 or appropriate media processor (235(1)-235(N). According to one embodiment, this routing may be accomplished using a callback function.

Thus, softswitch 205 may establish the appropriate routing of media to audio processor 247 and/or media processors 251(1)-251(N). In 285(d), softswitch 205 using session information and in particular the number of callee (100(b)) establishes a connection to subscriber 100(b) by initiating outbound leg 273(a) to communication network 120 ultimately resulting in creation of an outbound communication link through communication network 120 and establishment of outbound leg 273(b) to user 100(b) in 285(e).

Softswitch 205 may then perform a bridging operation, effectively coupling inbound media for the call arriving over inbound legs 270(a) and 270(b) and outbound media for the call being transmitted over outbound legs 273(a) and 273(b). As described above, inbound media for the call is processed by audio processor 247 and/or media processors 251(1)-251(N) via routing and switching operations performed by softswitch 205.

Softswitch 205 may also perform other functions including call routing and handling within personalization node 255. In particular, softswitch may execute logic to perform call routing, bridging, call logic and handling, IVR functionality, etc.

Softswitch 205 utilizes call information obtained from the call by user 100(a) to user 100(b) arriving on inbound leg 270(b) to perform a database lookup via audio personalization database 210 to configure audio personalization engine 240 for the call. According to on embodiment, personalization engine 240 is configured by setting any number of DSP parameters. Functionality of personalization node 255 is described in detail below with respect to FIG. 5a. Personalization blocks 235(1)-235(N) may also be personalized based upon call information.

Personalization node 255 then establishes a connection to user 100(b) via outbound leg 273(a), network 120, outbound leg 273(b) and communications device 105(b). According to one embodiment, personalization node 255 causes the establishment of outbound legs 273(a)-273(b). Effectively, personalization node 255 provides bridging between inbound legs 270(a)-270(b) and outbound legs 273(a)-273(b) via audio personalization engine 240 and possibly personalization blocks 235(1)-235(N). The cumulative behavior of personalization node 255 results in establishment of personalized communications link 280.

Figure 2D:
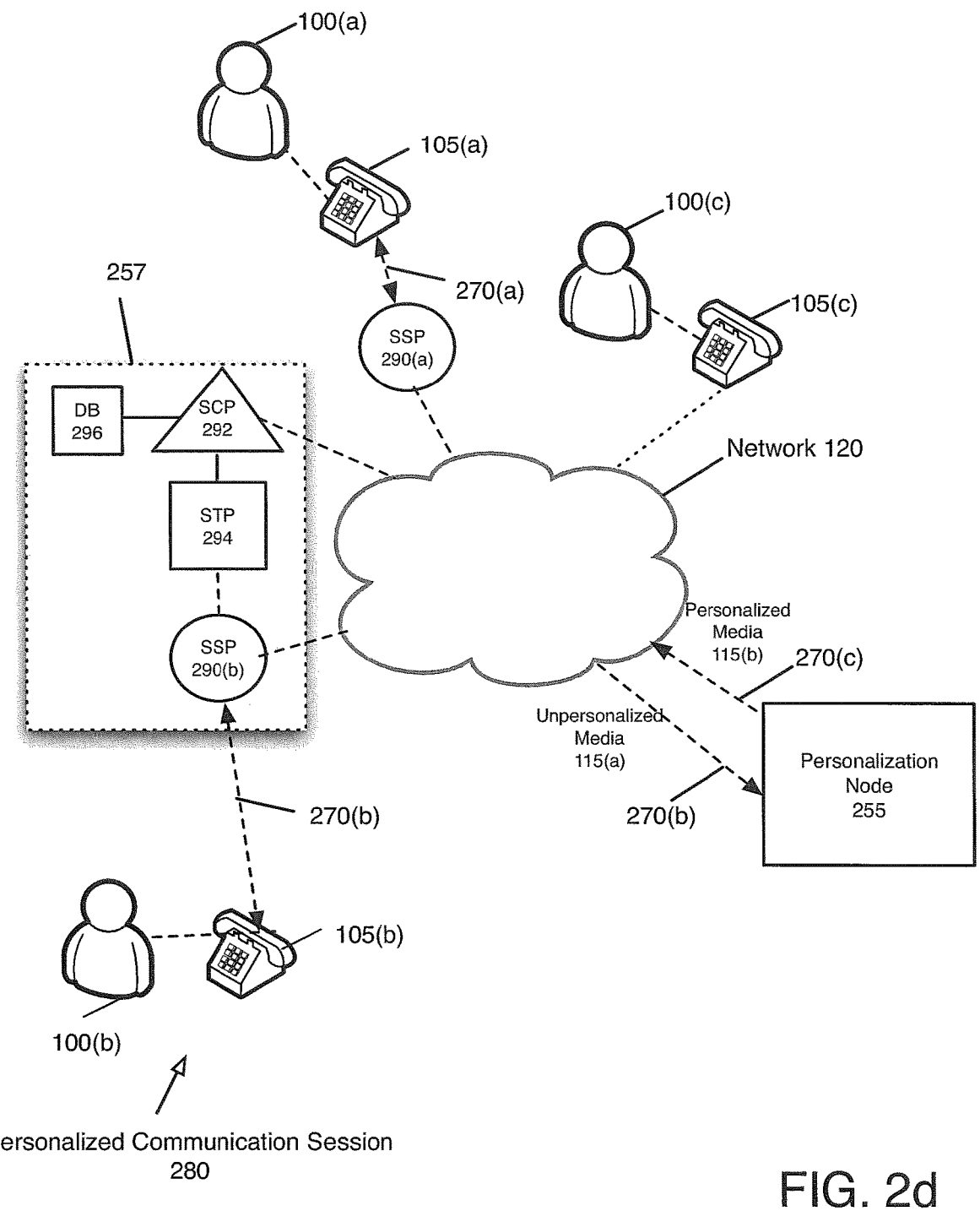
FIG. 2d illustrates an operation of a routing engine in the context of providing personalized communication services on a PSTN network according to one embodiment.

FIG. 2d illustrates an operation of a routing engine in the context of providing personalized communication services on a PSTN network according to one embodiment.

It is assumed for purposes of this example that network 120 is the PSTN. Furthermore, it is assumed that user 100(b) is a subscriber to at least one personalization service offered by personalization node 255. As shown in FIG. 2d, routing engine 257 may comprise SSP 290(b), STP 294, SCP 292 and DB 296. According to one embodiment, SSP 290(b) is a programmable switch that recognizes various triggers, which may be, for example, a specific digit string (i.e., telephone number). It is assumed since user 100(b) is a subscriber that SSP 290(b) has been pre-configured to recognize subscriber 100(b)'s telephone number as a trigger. Further, it is assumed that DB 296 associated with SCP 292 has been pre-configured to store the telephone number of subscriber 100(b) in such a way that it is associated with a telephone number of personalization node 255 on network 120.

User 100(a) (who may or may not be a subscriber to any services offered by personalization node 255) initiates a communication session with subscriber 100(*b*) by dialing the telephone number associated with subscriber 100(*b*). Upon user 100(*a*) initiating a communication session with subscriber 100(*b*), during signaling operations the digit string (telephone number) dialed by user 100(*a*) will be transmitted to SSP 290(*b*) via signaling infrastructure associated with communication network 120 (in this case the PSTN). Receipt of the digit string (user 100(*b*)'s telephone number) at SSP 290(*b*) will execute the associated trigger and in response SSP 290(*b*) will transmit the digit string to SCP 292 via STP 294 along with a request for a forward-to telephone number. SCP 292 upon receiving the request submits a query to DB 296 comprising subscriber 100(*b*)'s telephone number and receives in response the telephone number associated with personalization node 255. SCP 292 then transmits the telephone number associated with personalization node 255 to SSP 290(*b*). In turn, SSP 290(*b*) connects the previously initiated communication session by user 100(*a*) to personalization node 255 via network 120.

According to an alternative embodiment, each subscriber to one or more services offered by personalization node 255 may be assigned a PSTN telephone number.

Figure 2E:
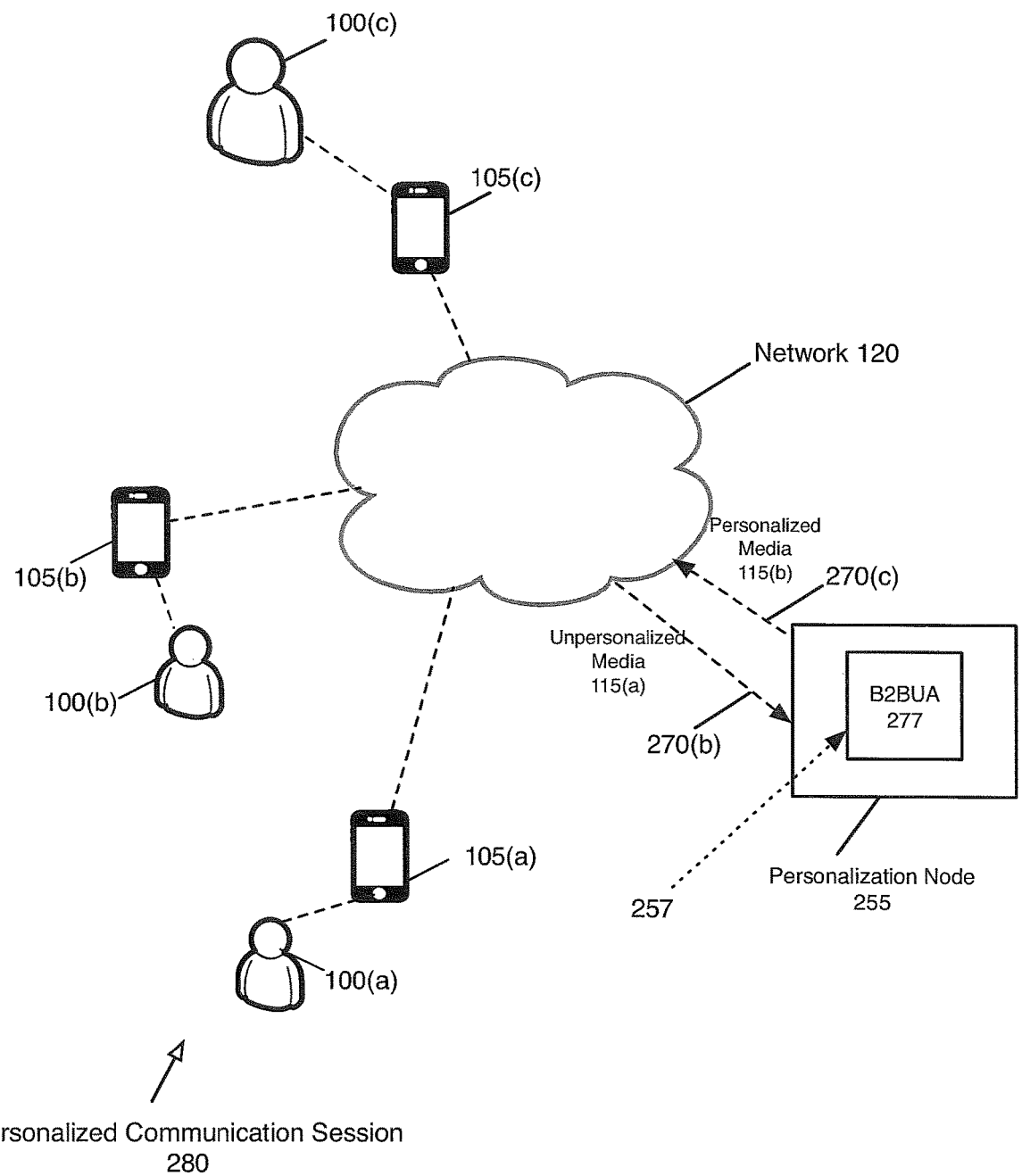
FIG. 2e illustrates an operation of a routing engine in the context of providing personalized communication services on a packet data network according to one embodiment.

FIG. 2*e* illustrates an operation of a routing engine in the context of providing personalized communication services on a packet data network according to one embodiment. It is assumed for purposes of this example that communication network 120 is a data network such as the public Internet. Communication network 120 may also be a private data network such as a LAN, WAN, etc. For purposes of this example, it is assumed that the operative signaling protocol is SIP. However, other alternatives are possible including H.323. The underlying media transport protocol may be RTP ("Real Time Transport Protocol") or some other media transport protocol, which may utilize TCP ("Transport Control Protocol") or UDP ("User Datagram Protocol"). Furthermore, it is assumed that user 100(*b*) is a subscriber to at least one personalization service offered by personalization node 255. Users 100(*a*) and 100(*c*) may optionally be subscribers to one or more personalization services offered by personalization node 255. Communication devices 105(*a*)-105(*c*) are respectively associated with users 100(*a*)-100(*c*) and may comprise any network enabled device with computing capabilities such as a smart phone, SIP phone, desktop computer, etc. It is assumed that communication devices 105(*a*)-105(*c*) run a suitable client software compatible with the signaling and media protocols utilized for a communication session over communication network 120. According to one illustrative example, communication devices 105(*a*)-105(*c*) each run a SIP client.

Figure 2F:
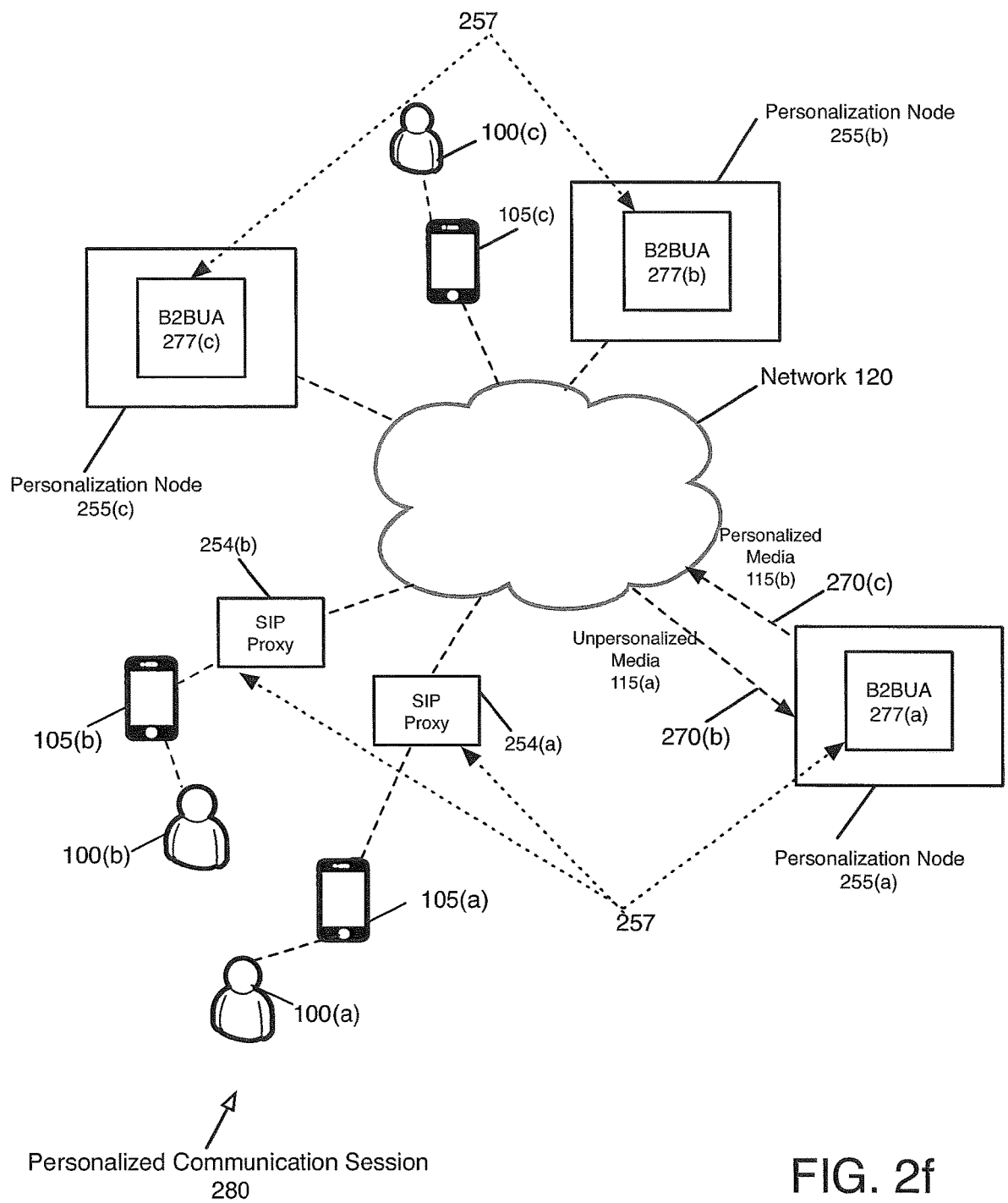
FIG. 2f illustrates an operation of a routing engine in the context of providing personalized communication services on a packet data network along with latency and load balancing optimization according to one embodiment.

An operation of routing engine 257 on a packet data network (e.g., 120 of FIG. 2*e*) will now be described. As shown in FIG. 2*e*, routing engine 257 may be back-to-back-user-agent ("B2BUA") 277. B2BUA 277 may be integrated with softswitch 210 (not shown in FIG. 2*e*). Note that FIG. 2*f* shows only a single personalization node 255. In order to reduce network latency and for load-balancing purposes, multiple personalization nodes 255 each including a respective B2BUA may be deployed on network 120. An embodiment illustrating the use of multiple personalization nodes 255 is described below with reference to FIG. 2*e*.

B2BUA 277 running on personalization node 255 may perform an operation to receive a first SIP request from a user initiating a communication session, reformulate the request into a transformed request and then transmit the transformed request. The transformation step performed by B2BUA 277 may include changing or modifying SIP headers or messages including 'From', 'Via', 'Contact', 'Call-ID', SDP media information.

According to one embodiment, users 100(*a*)-100(*c*) respectively using communication devices 105(*a*)-105(*c*) register with personalization node 255 running B2BUA 277. This may be accomplished by users 100(*a*)-100(*c*) providing a network address (such as an IP address) or a domain name associated with personalization node 255 on, for example, respective SIP clients running on communication devices 105(*a*)-105(*b*). Each user 100(*a*)-100(*c*) interacting with personalization node 255 via B2BUA 277 may be assigned a specific identifier, which may be different from a SIP identifier. If a domain name is provided, in a separate step not shown, a DNS ("Domain Name Service") lookup may be performed to resolve the domain name to an IP address associated with personalization node 255.

According to this example, it is assumed that user 100(*a*) desires to initiate a communication session with user 100(*b*). In this instance, user 100(*a*) may do so by dialing the specific identifier associated with user 100(*b*) (or the SIP identifier of user 100(*b*)) on communication device 105(*a*). This cause SIP signaling information to be transmitted to personalization node 255 and specifically B2BUA 277 on personalization node 255. B2BUA 277 may then recognize that user 100(*a*) has initiated a communication session with user 100(*b*) by performing a resolution of a current IP address associated with user 100(*b*) via normal SIP mechanisms. Upon this resolution, B2BUA 277 may then open an outbound SIP session with communication device 105(*b*) associated with user 100(*b*) thereby establishing a SIP session with user 100(*b*). Based upon the identities of users 100(*a*)-100(*b*) to be involved in a personalized communication session, B2BUA 277 may also initiate the execution of functions to configure personalization node 255 to perform personalization services for either or both users (depending upon whether one or both are subscribers). As described above, this configuration may comprise configuring an audio processor or other media processor.

At this point, personalization node 255 is in communication with both user 100(*a*) and user 100(*b*) via respective inbound and outbound legs. B2BUA 277 may then cause the execution of functions on personalization node, for example cause softswitch 205 to bridge media between the inbound and outbound legs. As part of this bridging operation media may be personalized or processed in accordance with personalization preferences of either user 100(*a*) or 100(*b*) depending on whether one or both are subscribers to a personalization service on personalization node 255. Media may then be transferred between users 100(*a*)-100(*b*) using a suitable protocol such as RTP.

FIG. 2*f* illustrates an operation of a routing engine in the context of providing personalized communication services on a packet data network along with latency and load balancing optimization according to one embodiment. In order to reduce network latency and for load-balancing purposes, multiple personalization nodes (e.g., 255(*a*)-255(*c*)) each associated with a respective B2BUA (277(*a*)-277(*c*)) may be deployed on network 120. According to one embodiment, the purpose of providing multiple personalization nodes 255(*a*)-255(*c*) is to allow dynamic selection of a particular personalization node during establishment of a personalized communication session. For example, based upon geographic routing attributes of a particular communication session, it may advantageous to choose a personalization node 255 located close to all participants in the communication session in order to reduce network latency.

Also, in order to load balance work across multiple personalization nodes 255, a suitable load balancing scheme such as round robin may be employed.

As shown in FIG. 2f, routing engine 257 may comprise a collective operation of one or more B2BUAs 277(a)-277(c) each associated with a respective personalization node 255(a)-255(c) and optionally one or more SIP proxies 254(a)-254(b).

SIP proxies 254(a)-254(b) are configured respectively to receive a SIP request from a SIP user agent ("UA") running on a communication device (e.g., 105(b)-105(c) respectively) and forward the request to a determined personalization node 255. As shown in FIG. 2f, where multiple personalization nodes 255 are deployed on network 120, SIP proxies 254(a)-254(b) may perform a calculation to determine an optimum personalization node 255 for routing. Accordingly, SIP proxies 254(a)-254(b) may store in a database information about personalization nodes 255(a)-255(c) on network 120, geographic and distance routing information and load information. This information may be updated in dynamically, for example, by polling personalization nodes periodically regarding their current load and/or receiving information regarding dynamically changing network routing. Alternatively, personalization nodes 255(a)-255(c) may be programmed to periodically report their load state and other dynamic information.

Returning to the present example, the SIP request initiated by user 100(a) is received at SIP proxy 254(a), upon which SIP proxy 254(a) determines an optimum personalization node 255 for routing based upon header information in the SIP request. An optimum personalization node may be determined based upon the geographical relationship between user 100(a) and 100(b), load balancing factors and a host of other possibilities. In addition, SIP proxy 254(a) may perform routing operations on the invitation provided by user 100(a). Upon a determination that personalization node 255 is a suitable choice, SIP proxy 254(a) forwards the SIP request to personalization node 255 which is running B2BUA 277. B2BUA 277 upon receiving the forwarded SIP request then inspects header information of the forwarded request.

According to one embodiment, communication devices 105(a)-105(b) are configured to communicate with respective SIP proxies 254(a)-254(b). In addition, while FIG. 2f shows a corresponding SIP proxy (254(a)-254(b)) for each communication device 105(a)-105(b), communication devices 105(a)-105(b) may communicate with a single SIP proxy. Alternatively, one communication device (e.g., 105(a)) may communicate with SIP proxy 254(a), while a second communication device (e.g., 105(b)) may communicate directly with personalization node 255. In yet another embodiment, communication devices 105(a)-105(b) may communicate directly with personalization node 255 and personalization services intermediated by a B2BUA running on personalization node 255.

B2BUA 277 running on personalization node 255 may perform an operation to receive a first SIP request, reformulate the request into a transformed request and then transmit the transformed request. The transformation step performed by B2BUA 277 may include changing or modifying SIP headers or messages including 'From', 'Via', 'Contact', "Call-ID", SDP media information.

Upon receiving a SIP request, SIP proxies 254(a)-254(b) may determine an optimal personalization node 255 on network 120 (which runs B2BUA 277) to which to route a SIP request. For the purpose of the present example, it is assumed that user 100(b) is a subscriber to a personalization service offered by personalization node 255. It is further assumed that user 100(a) (who may or may not be a subscriber) initiates a communication session with user 100(b) over communication network 120. However, the operation of routing engine 257 and establishment of a personalized communication session is symmetric and operates identically irrespective of the user initiating the communication session.

Figure 2G:
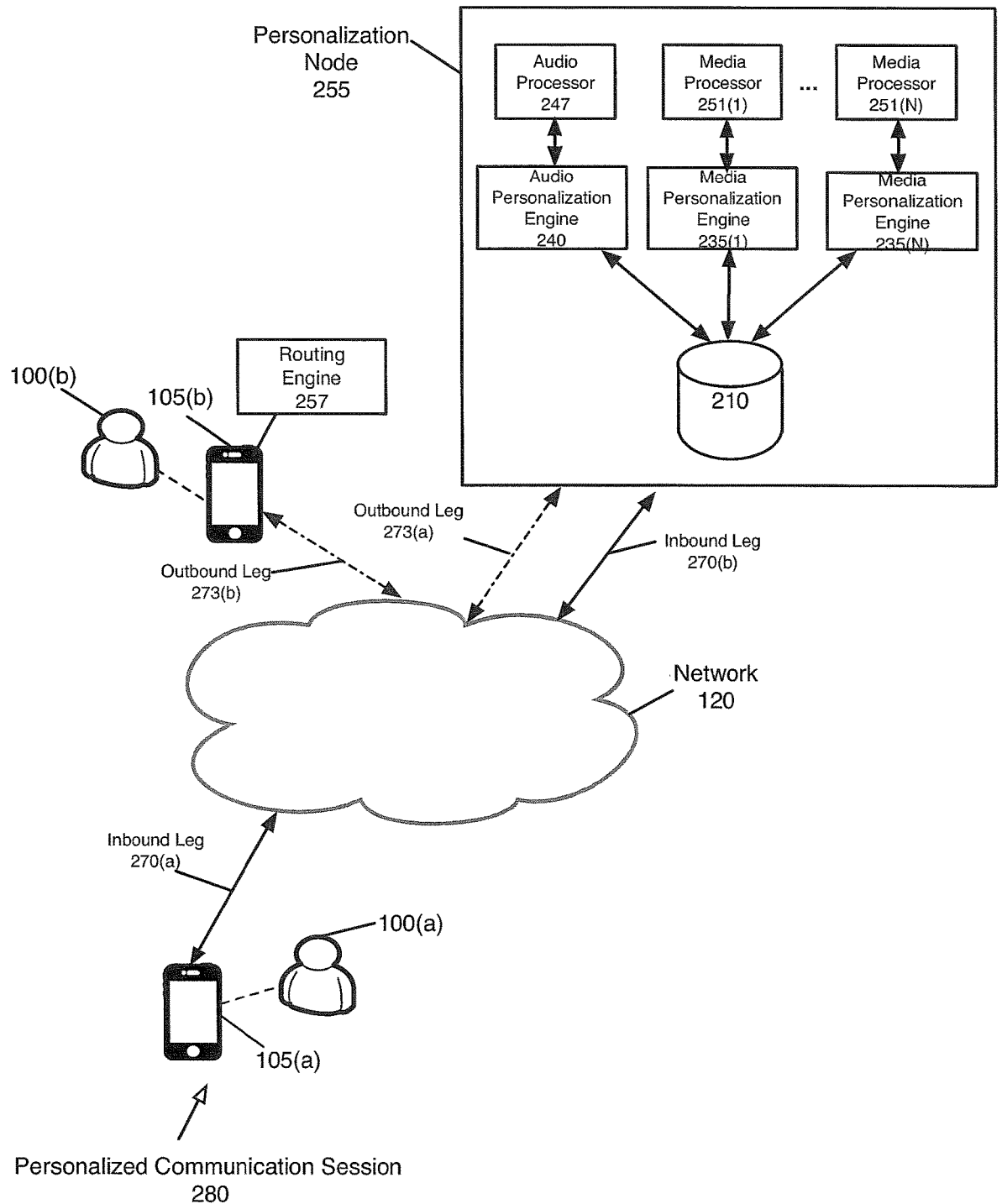
FIG. 2g depicts an alternative configuration of a routing engine for transparent establishment of a personalized communication according to one embodiment.

FIG. 2g depicts an alternative configuration of a routing engine for transparent establishment of a personalized communication according to one embodiment. In particular, as shown in FIG. 2g routing engine 257 may be collocated with communication device 105(b) and/or communication device 105(b) may be configured to communicated with routing engine 257 during initiating of a communication session with a third party.

Internetworking

Figure 3A:
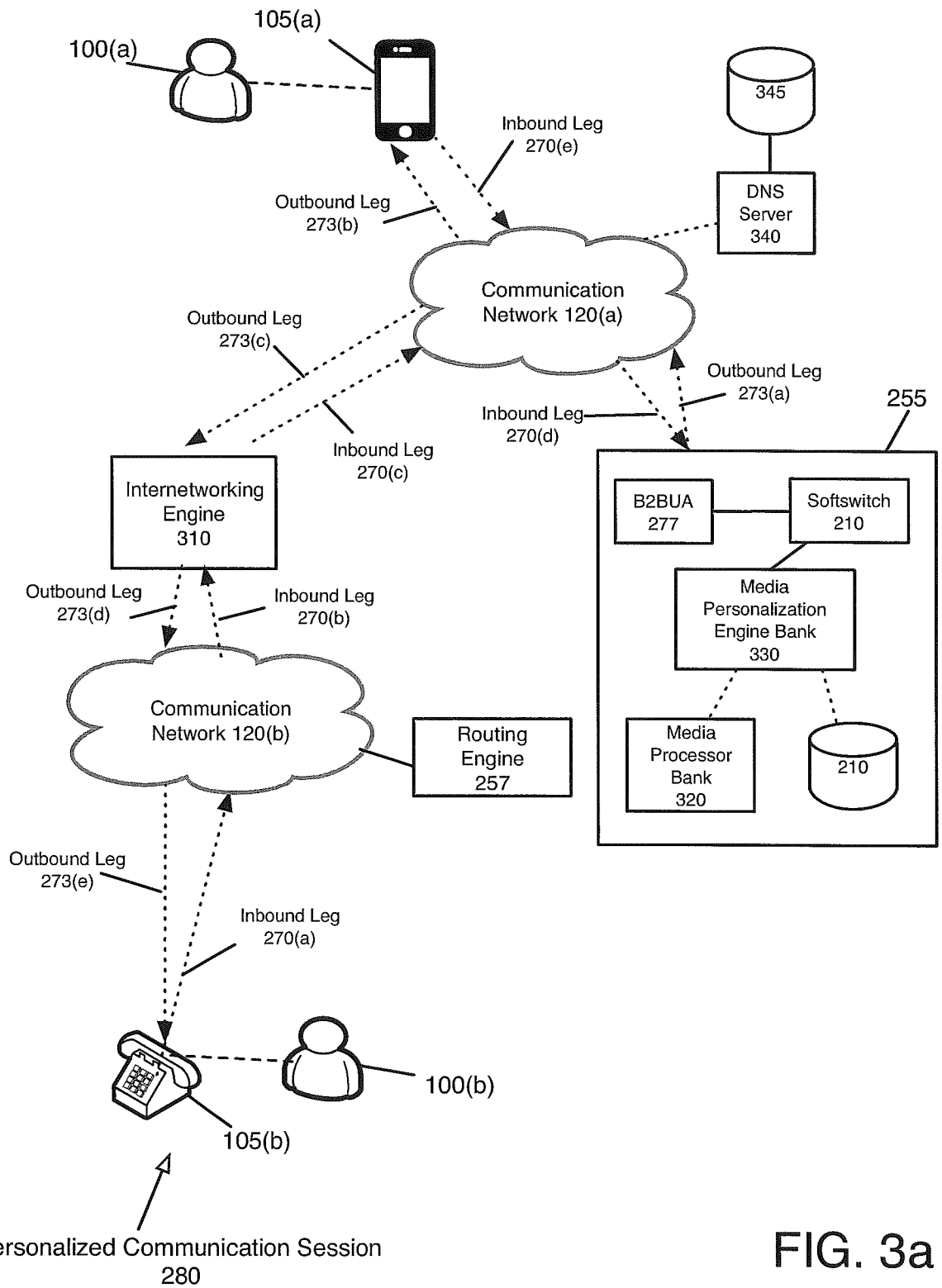
FIG. 3a depicts an operation of a personalization node in a heterogeneous networking environment according to one embodiment.

FIG. 3a depicts an operation of a personalization node in a heterogeneous networking environment according to one embodiment. According to one embodiment, personalization node 255 may operate with heterogeneous networks, utilizing disparate media and signaling protocols and infrastructure. In this context, an internetworking of protocols between the heterogeneous networks is established. User 100(a) utilizes communication device 105(a), which is coupled to communication network 120(a). User 100(b) utilizes communication device 105(b), which is coupled to communication network 120(b). Communication networks 120(a)-120(b) heterogeneous networks, which may utilize wholly different network infrastructure, provide transport and signaling. Communication network 120(b) may be, for example, a circuit switched network such as the PSTN while communication network 120(a) may be a packet data network such as the public Internet. Additional details regarding SIP to PSTN internetworking may be found in Session Initiation Protocol (SIP) Public Switched Telephone Network (PSTN) Call Flows, Network Work Group, RFC 3666, Session Initiation Protocol PSTN Call Flows, SIPPING Working Group Internet Draft, draft-ietf-sipping-pstn-call-flows-02.txt, 2003.

Personalization node 255 is coupled to communication network 120(a) and provides services previously described. Internetworking engine 310 negotiates media and signaling between communication networks 120(a)-120(b). According to one embodiment, internetworking engine 310 may be a SIP gateway, in which case communication network 120 (a) may be the public Internet or other packet network. According to this particular example, internetworking engine 310 as a SIP gateway terminates both signaling and media paths associated with communication networks 120(a)-120(b). Continuing this example, internetworking engine 310 may translate SIP to PSTN signaling protocols such as ISDN, ISUP or other circuit associated signaling (CAS). Acting as a SIP gateway, internetworking engine 310 may also translate an RTP media stream from packet network 120(a) into a standard telephony trunk or line and vice versa. The structure and function of a SIP gateway is described below with respect to FIG. 3c.

Figure 3B:
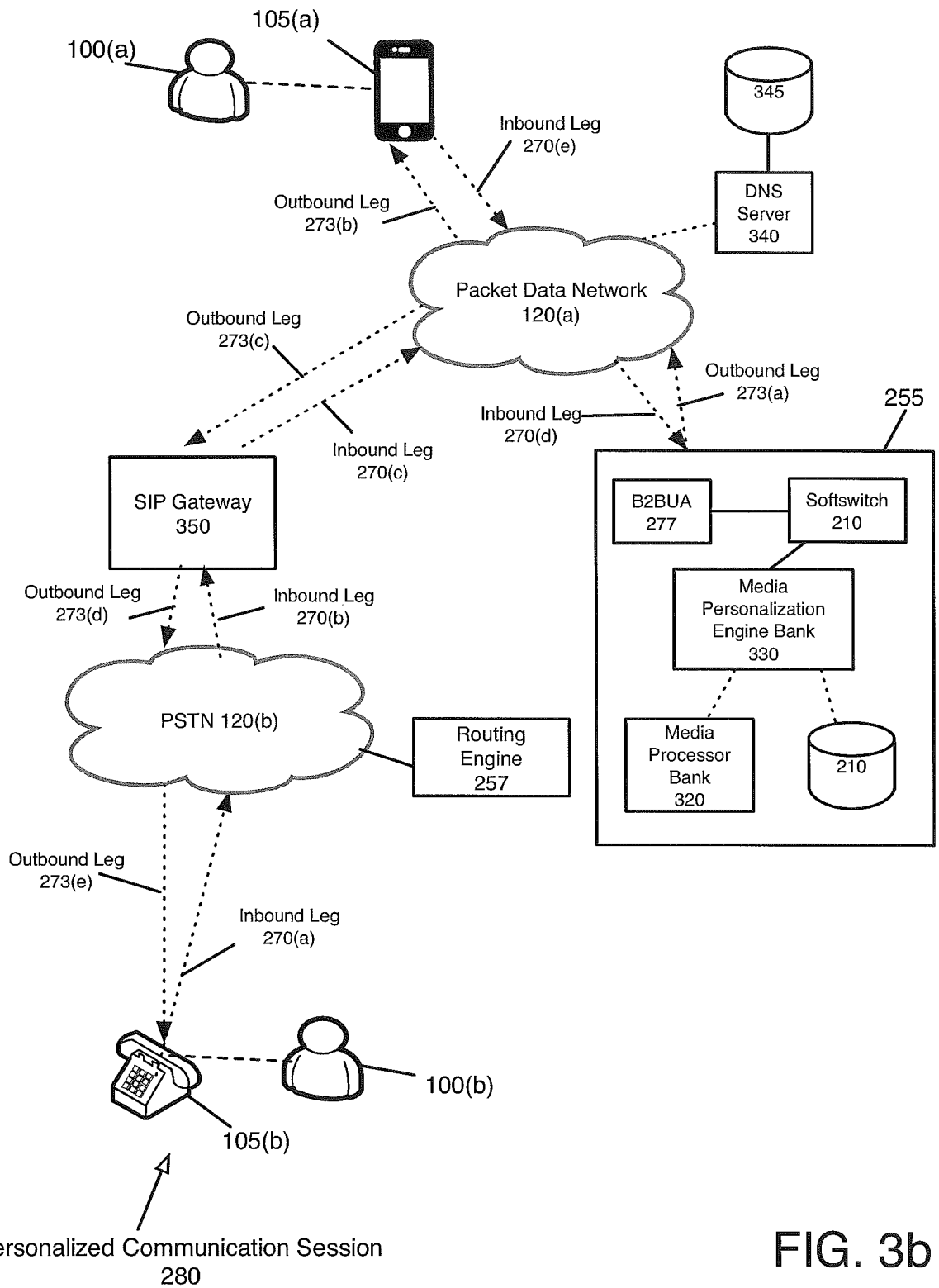
FIG. 3b depicts the operation of SIP gateway in establishing a personalized communication session with a personalization node according to one embodiment.

FIG. 3b shows the operation of SIP gateway in establishing a personalized communication session with a personalization node according to one embodiment. For purposes of this example, it is assumed that user 100(a) desires to initiate a personalized communication session with user 100(b). It is further assumed that user 100(b) is a subscriber to at least one service offered by personalization node 255. As previously described, in order to achieve this transparency, because user 100(b) is a subscriber, routing engine 257 is configured to upon the initiation of a communication session with user 100(*b*), automatically route the communication session, to personalization node 255. For example, as previously described, routing engine 257 may comprise signaling infrastructure associated with the PSTN such as a SSP, STP SCP and DB (not shown in FIG. 3*a*). Accordingly, routing engine may be a programmable switch that recognizes various triggers, which may be, for example, a specific digit string (i.e., telephone number). It is assumed since user 100(*b*) is a subscriber to at least personalization service offered by personalization node 255, that routing engine 257 has been pre-configured to recognize subscriber 100(*b*)'s telephone number as a trigger and forward any calls to user 100(*b*).

User 100(*a*) (who may or may not be a subscriber to any services offered by personalization node 255) initiates a communication session with subscriber 100(*b*) by dialing the telephone number associated with subscriber 100(*b*). Upon user 100(*a*) initiating a communication session with subscriber 100(*b*), during signaling operations the digit string (telephone number) dialed by user 100(*a*) will be transmitted to SSP 290(*b*) (see FIG. 2*d*—for routing in PSTN) via signaling infrastructure associated with communication network 120 (in this case the PSTN). Receipt of the digit string (user 100(*b*)'s telephone number) at SSP 290(*b*) will execute the associated trigger and in response SSP 290(*b*) will transmit the digit string to SCP 292 via STP 294 along with a request for a forward-to telephone number. SCP 292 upon receiving the request submits a query to DB 296 comprising subscriber 100(*b*)'s telephone number and receives in response the telephone number associated with personalization node 255. SCP 292 then transmits the telephone number associated with personalization node 255 to SSP 290(*b*). In turn, SSP 290(*b*) connects the previously initiated communication session by user 100(*a*) to personalization node 255 via PSTN 120.

Figure 3C:
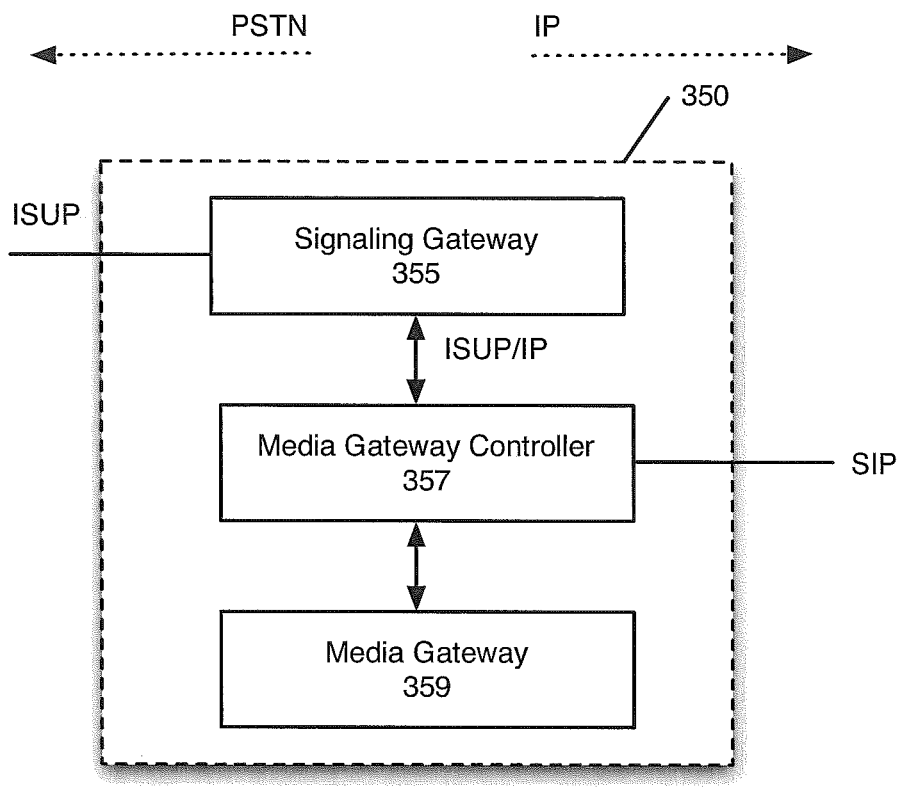
FIG. 3c depicts a structure of a SIP to PSTN gateway according to one embodiment, herein referred to as a SIP gateway.

FIG. 3*c* depicts a structure of a SIP to PSTN gateway according to one embodiment, herein referred to as a SIP gateway. As previously described with respect to FIG. 3*a*, internetworking engine 310 may be a SIP 350. SIP gateway 350 may comprise signaling gateway 355, media gateway controller 357 and media gateway 359. According to one embodiment, SIP gateway terminates signaling and media paths for the PSTN negotiates between media and signaling protocols between the PSTN and a packet networking using SIP for signaling. For example, according to one embodiment, the PSTN network utilizes SS7 ISUP for signaling while a packet data network uses SIP for signaling. Media gateway 359 transcodes media in the PSTN domain (e.g., PCM voice) into media in the IP domain (e.g., media transported over RTP such as SILK encoded voice) and vice versa.

Signaling gateway 355 receives and routes ISUP messages. In particular, signaling gateway 355 may replace the lower layers of SS7 (MTP) by IP. Upper layers of SS7 (ISUP) may be encapsulated into TCP/IP headers. Media gateway controller 357 provides control of signaling gateway 355 and media gateway 359.

Figure 3D:
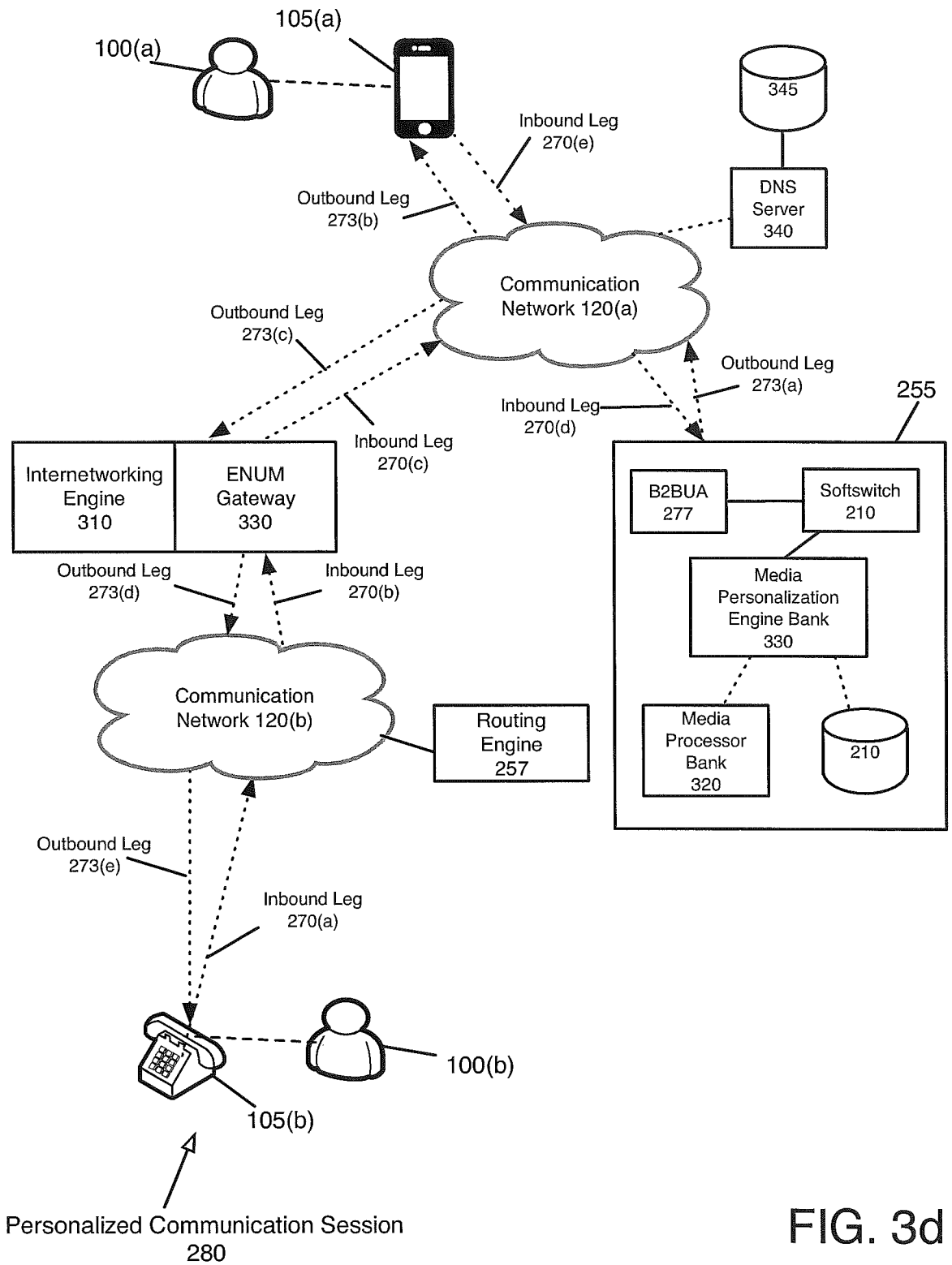
FIG. 3d depicts an operation of an ENUM gateway and internetworking engine in the context of establishing a personalized communication session via a personalization node according to one embodiment.

FIG. 3*d* depicts an operation of an ENUM gateway and internetworking engine in the context of establishing a personalized communication session via a personalization node according to one embodiment.

In-Band and Out-of-Band Session Information

Figure 4A:
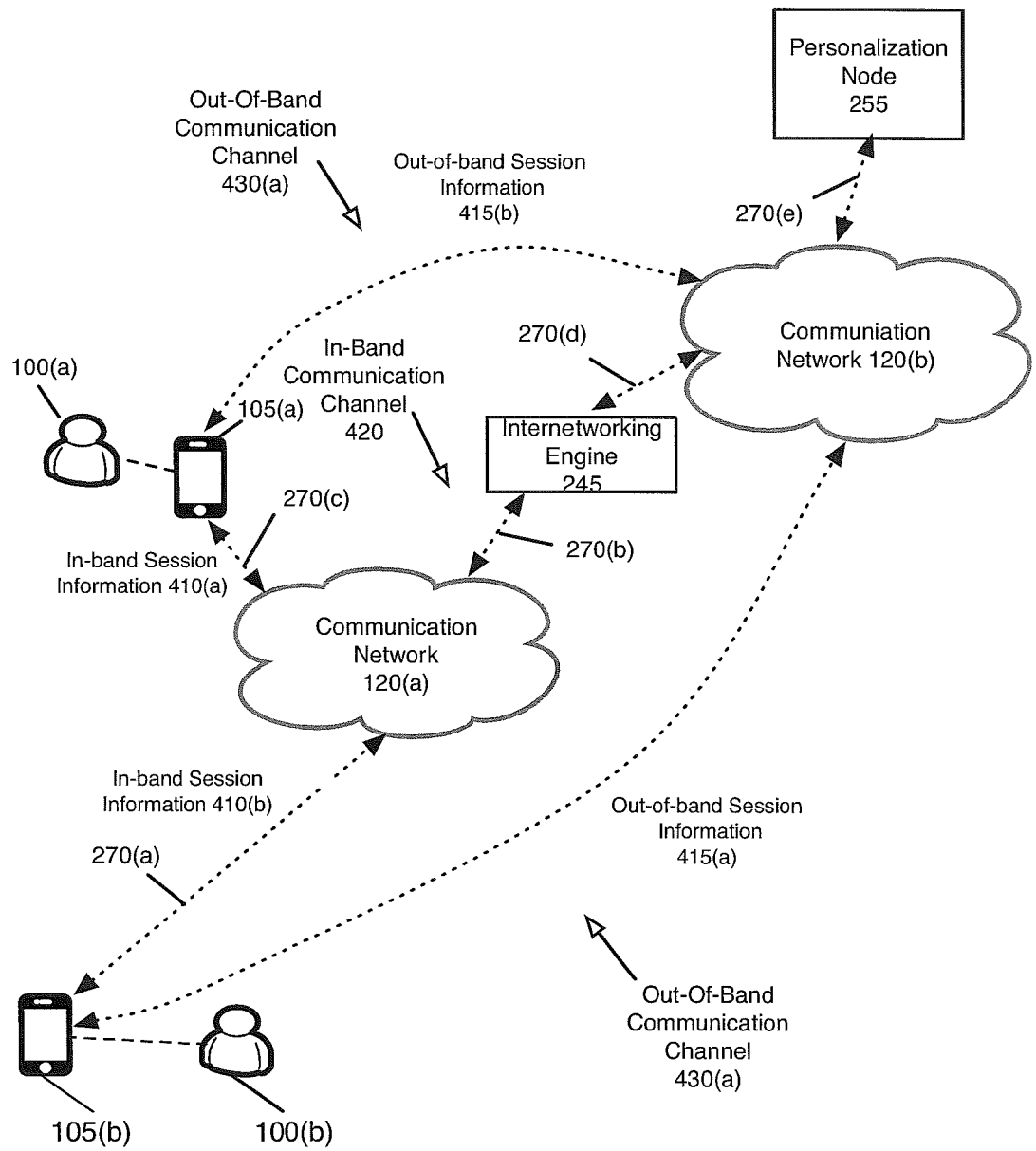
FIG. 4a depicts the transmission of both in-band and out-of-band session information for use in establishing a personalized communication session.

FIG. 4*a* depicts the transmission of both in-band and out-of-band session information for use in establishing a personalized communication session. Session information is utilized by personalization node 255 during establishment of personalization communication session 280. Session information may include any type of information, meta-information or attribute associated with a communication session. It may include, for example, identifiers of the parties participating in the communication session (i.e., users 100(*a*)-100(*b*)), equipment utilized on the communication session including the communication devices used (i.e., communication devices 105(*a*)-105(*b*)), media equipment (not shown in FIG. 4*a*, but with respect to audio, microphones, playback devices such as speakers and headsets), media codec information (e.g., speech codecs, music codecs, video codecs), date and time of day information, geographic information, special preferences selected by users (i.e., 100(*a*)-100(*b*)), etc. Session information may be transmitted during establishment of personalized communication session 280, for example during a signaling stage. It may also be transmitted continuously after media resources have been allocated.

Referring again to FIG. 4*a*, user 100(*a*) utilizes communication device 105(*a*), which is coupled to communication network 120(*a*). Similarly, user 100(*b*) utilizes communication device 105(*b*), which is also coupled to communication network 120(*a*). Personalization node 255 is coupled to communication network 120(*b*).

In-band communication channel 420 comprises the identical communication channel utilized by a communication device by which signaling and media information is transported to personalization node 255. Since user 100(*a*) utilizes communication device 105(*a*) coupled to communication network 120(*a*), in-band communication channel 420 for communication device 105(*a*) comprises inbound links 270(*b*)-270(*e*) along with internetworking engine 245. Similarly, with respect to communication device 105(*b*), in-band communication channel 420 comprises inbound links 270(*a*), 270(*b*), 270(*d*) and 270(*e*) along with internetworking engine 245.

In-band session information, e.g., 410(*a*)-410(*b*) comprises any session information transmitted over an in-band communication channel (e.g., 420). Correspondingly, out-of-band session information, e.g., 415, comprises any session information transmitted over out-of-band communication channel (e.g., 430). In-band media session information may be transmitted automatically by a communication device (e.g., 105(*a*)-105(*b*)) during signaling or media transport phases of a communication session. For example, if communication network 120(*a*) were the PSTN, in-band session information might comprise among other elements, an ANI. On the other hand, if communication network 120(*a*) were a packet data network and communication devices 105(*a*)-105(*b*) utilized SIP, in-band session information might comprise information transmitted via the session description protocol ("SDP").

Out-of-band communication channels 430(*a*)-430(*b*) comprise any communication path for transmission of session information distinct from an in-band communication channel (e.g., 420). Out-of-band session information 415(*a*)-415(*b*) may be transmitted utilizing an auxiliary communication application or function running on respective communication devices 105(*a*)-105(*b*) for establishment of a communication session. Out-of-band session information (e.g., 415(*a*)-415(*b*)) may comprise any session information that is not transported over an in-band communication channel. Thus, any session information that may not be transported as part of signaling and media transport by communication devices 105(*a*)-105(*b*) during a communication session, may be transmitted over respective out-of-band communication channels 430(*a*)-430(*b*) via communication network 120(*b*). For example, typically equipment information such as media equipment or configuration utilized in a communication session is not transmitted as in-band session information. This information could be transmitted as out-of-band session information.

For example, assuming communication network 120(a) were a wireless or cellular network and communication network 120(b) were the public Internet, in-band session information might comprise an ANI transmitted as part of normal signaling operations when either user 100(a) or 100(b) initiates a communication session. However, further assuming that communication devices 105(a)-105(b) were also coupled to communication network 120(b) (the public Internet for this example) out-of-band communication channels 430(a)-430(b) might comprise respective data channels utilized by communication devices 105(a)-105(b) for communication over a packet network such as communication network 120(b). In this context, communication devices 105(a)-105(b) might transmit out-of-band session information 415(a)-415(b) over respective out-of-band communication channels 430(a)-430(b) via communication network 120(b) to personalization node.

Figure 4B:
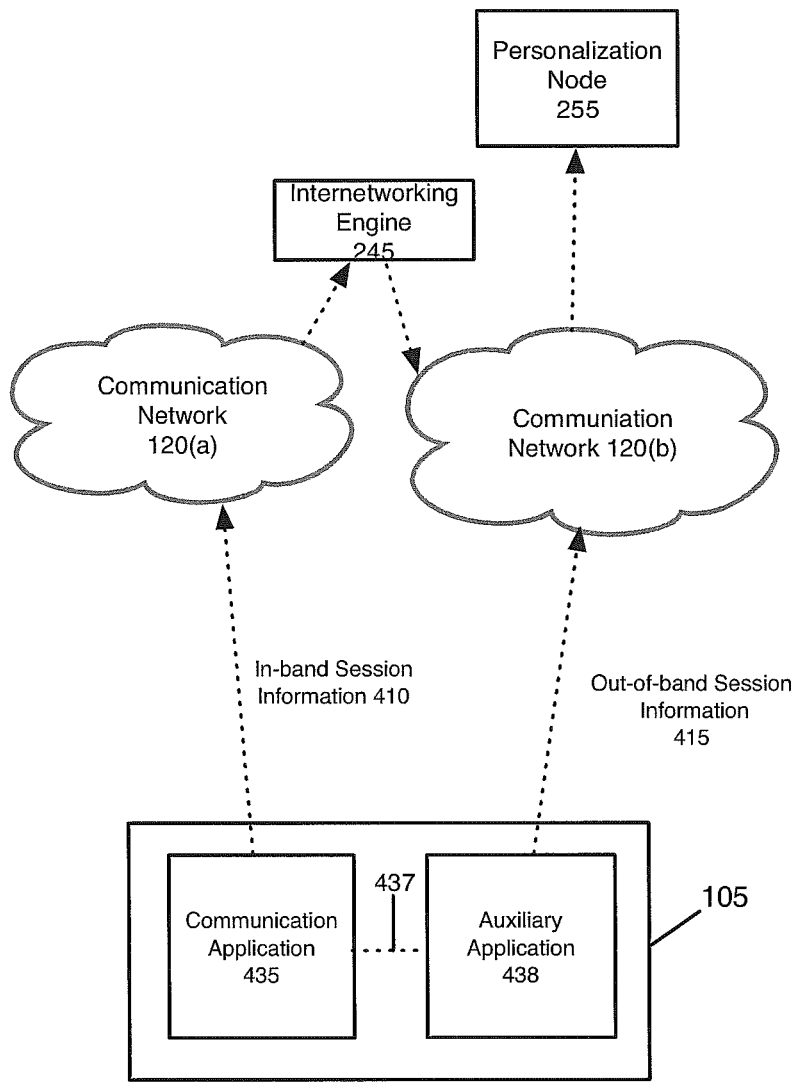
FIG. 4b illustrates the use of an auxiliary application for transmission of out-of-band session information according to one embodiment.

FIG. 4b illustrates the use of an auxiliary application for transmission of out-of-band session information according to one embodiment. Communication device 105 may include a programmable processor and memory (not shown in FIG. 4b). Communication device may run both communication application 435 and auxiliary application 438. Communication application 435 may be a standard telephony application. For example, in the case where communication device is a smart phone and communication network 120(a) is a cellular network, communication application 435 may be an application that enables cellular communications over communication network 120(a). As part of a standard protocol, communication application 435 may transmit session information (for example an ANI) over the communication channel associated with the cellular call itself comprising in-band session information 410.

Auxiliary application 438 may be a separate application that runs on communication device 105 that transmits session information over a separate communication network 120(b) that is not transmitted by communication application 435 and otherwise is not in-band session information 410. Accordingly, auxiliary application 438 transmits out-of-band session information 415 over communication network 120(b). Auxiliary application may aggregate information from communication device 105 automatically, which it the transmits as out-of-band session information 415 to personalization node 255. Or, it may request user input regarding information, which it may also transmit as out-of-band session information 415 to personalization node 255.

Configuration of Personalization Services

Figure 5A:
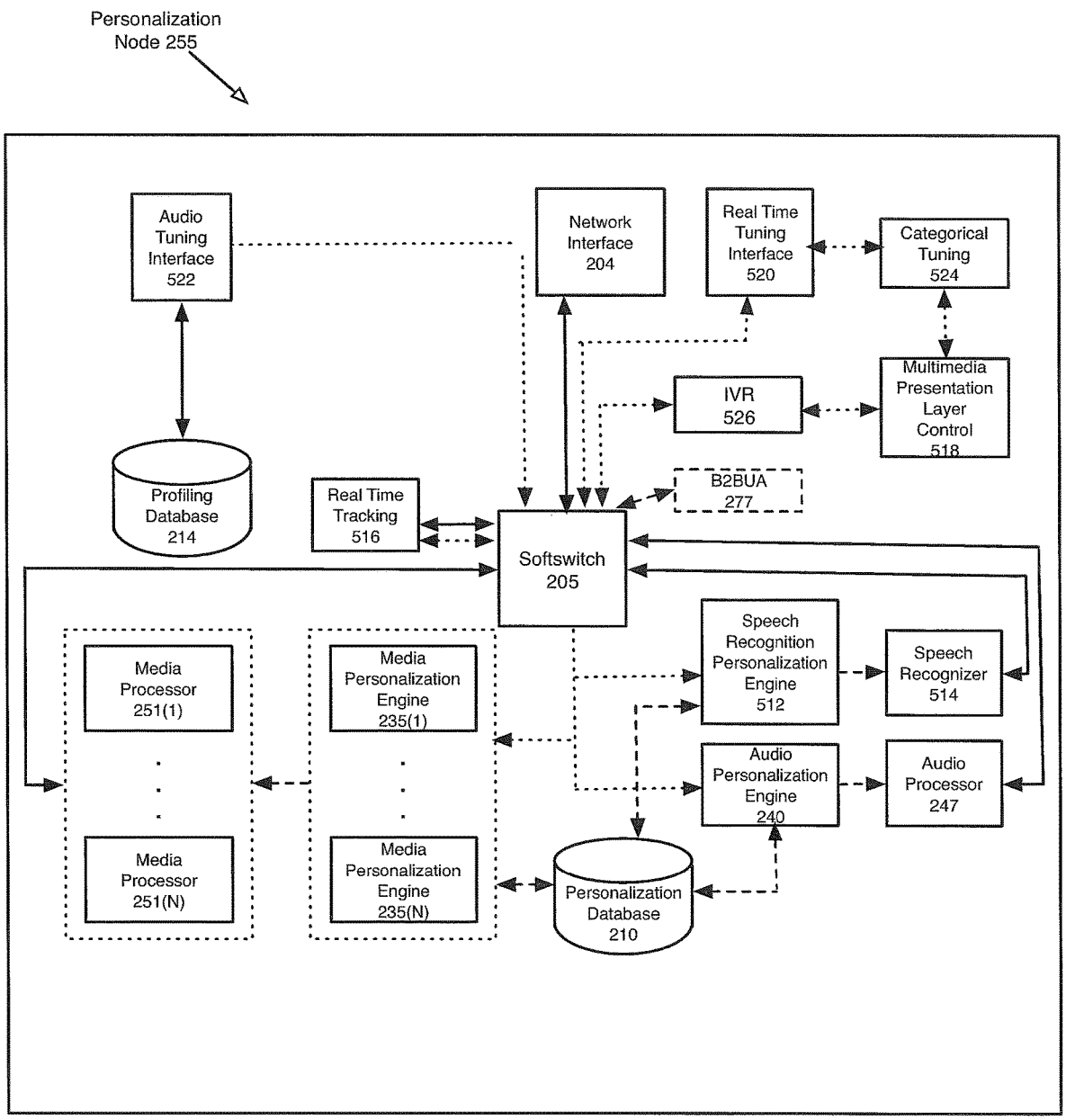
FIG. 5a is a detailed block diagram of a personalization node according to one embodiment.

FIG. 5a is a detailed block diagram of a personalization node according to one embodiment. As shown in FIG. 5a, data (including media and signaling data) may be received by personalization node 255 via network interface 204. Data received via network interface 204 is transmitted to softswitch 205, which performs a myriad of functions including control logic, routing, media bridging, etc. A structure and function of an exemplary softswitch is described below with respect to FIG. 5b.

Softswitch 205 may perform control and signaling with respect to a number of functional blocks including audio tuning interface 522, real time tuning interface 520, IVR 526, B2BUA 277, real-time tracking block 516, speech recognition personalization engine 512, audio personalization engine 240, and media personalization engines 235(1)-235(N).

Audio tuning interface 522 provides an interface for establishing and tuning audio preferences and parameters, which may be stored in personalization database 210 for individual users. An interaction between audio tuning interface and personalization database 210 is accomplished via softswitch 205 and audio personalization engine 240. Audio tuning interface 522 may also utilize information from profiling database 214, which may store information about users (whether they are subscribers or non-subscribers), including their hearing profile and preferred signal processing settings/profiles. Profiling database 214 may be utilized to generate statistical information about the users and in order to predict optimal signal processing settings for subscribers via a variety of mechanisms including machine learning. Information from profiling database 214 may be used for statistical and machine learning purposes in order to assist in tuning an audio profile.

Real-time tuning interface 520 provides functionality and control for real-time tuning of audio processor 247, media processors 251(1)-251(N) and/or speech recognizer 514 during a personalized communication session. Real time tuning interface 520 may receive tuning messages via network interface 204 and softswitch 205, which are generated in real time from communication devices (not shown in FIG. 5a) and transmitted over a communication network to which personalization node 255 is coupled. Based upon received tuning messages, real-time tuning interface 520 may provide control messages to audio personalization engine 240, media personalization engines 235(1)-235(N) and/or speech recognition personalization engine 512 in order to re-configure the processing of media respectively on audio processor 247, media processors 251(1)-251(N) and/or speech recognition personalization engine 512.

Categorical tuning block 524, described in detail below, provides functionality for interactive tuning of either audio or other media via an interactive question and response session with individual subscribers to personalization node 255. Categorical tuning block 524 may be invoked in order to rapidly establish a baseline tuning for media processed by personalization node 255. As shown in FIG. 5a, categorical tuning block 524 may interact with real-time tuning interface 520 in order to receive tuning messages transmitted from communication devices associated with individual subscribers over a network associated with personalization node 255. In addition, categorical tuning block 524 may interact with multimedia presentation layer control 518 in order to control a presentation of interactive media on individual communication devices, which are in communication with personalization node 255.

IVR 526 provides interactive voice response functionality for subscribers that may be in communication with personalization node 255. IVR 526 is coupled to and may interact with a number of functional elements via softswitch 205 in order to elicit information from subscribers including real-time tuning interface 520, categorical tuning block 524, multimedia presentation layer control 518 and audio tuning interface 522.

Real-time tracking block 516 provides functionality for real-time tracking of user interaction with personalization node 255. It may receive media and/or signaling information via softswitch 205 in order to determine, for example, an active conference participant or speaker. Real-time tracking block 516 may then in turn provide control messages to media personalization engines 235(1)-235(N), speech recognition personalization engine 512 and/or audio personalization engine 240 in order to reconfigure respective media processors 251(1)-251(N), audio processor 247 and speech recognizer 514 based upon a determined active participant or speaker.

Softswitch 205 may perform routing of media information to media processors 251(1)-251(N), audio processor 247, and speech recognizer 514. Softswitch 205 may also interact with media personalization engines 235(1)-235(N), audio personalization engine 240 and speech recognition personalization engine 512 by providing signaling and control messages to facilitate the respective configuration of media processors 250(1)-250(N), audio processor 247 and speech recognizer 514. Softswitch 205 may interact with B2BUA, which provides back-to-back user agent functionality for communication devices coupled to personalization node 255 utilizing the SIP protocol.

Media personalization engines 235(1)-235(N), audio personalization engine 240 and speech recognition personalization engine 512 may individual interact and submit queries to personalization database 210 in order to retrieve personalization information (for example based upon a query formulation based on session information) in order to generate parameters for configuration of media processors 251(1)-251(N), audio processor 247 and speech recognizer 514 respectively. An exemplary structure and operation of media personalization engines 235(1)-235(N), audio personalization engine 240, speech recognition engine 240 and personalization database 210 is described in detail below.

Figure 5B:
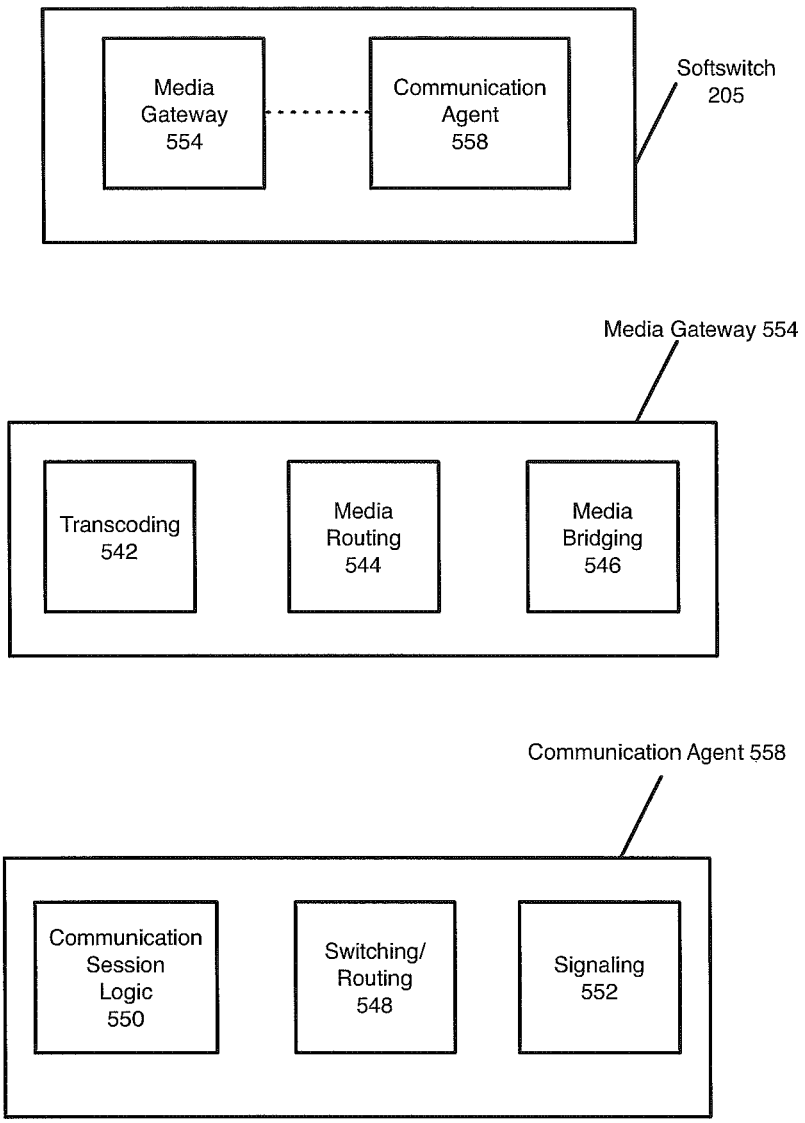
FIG. 5b is a block diagram of a softswitch according to one embodiment.

FIG. 5b is a block diagram of a softswitch according to one embodiment. Softswitch 205 may comprise media gateway 554 and communication agent 558. As shown in FIG. 5b, communication agent 558 may communicate with media gateway 554. Media gateway 554 may perform functions to couple disparate media streams together through bridging, routing and media negotiation such as transcoding. Communication agent 558 may perform functional logic with respect to communication session setup, signaling and routing.

As depicted in FIG. 5b, media gateway 554 may comprise transcoding block 542, media routing block 544 and media bridging block 546. Transcoding block 542 performs transcoding and negotiation of media streams from one encoded format to another. For example, transcoding block 542 may transform a SILK encoded audio stream into a G.711 encoded audio stream or vice versa. Transcoding block 542 may also transcode between different formats both using the same codec, for example transcoding between sampling rates and bit resolution. Thus, transcoding block 542 may further comprise upsampling and downsampling functionality as well as functional elements to operate on individual bits within a computer word.

Media bridging block 546 may perform operations for bridging media between two or more communication legs in a personalized communication session mediated by personalization node 255.

Media routing block 544 may perform functions to route media from softswitch 205 to external processing elements, for example audio processor 247, media processors 251(1)-251(N) and/or speech recognizer 514. Media routing block 544 may also receive media after being processed by external processing elements.

Communication agent 558 may comprise communication session logic block 550, switching/routing block 548 and signaling block 552. Communication session logic block 550 may execute logic for establishing and maintaining a personalized communication session on personalization node 255. Signaling block 552 may perform operations relating to signaling information received by personalized communication node 255. Signaling information may comprise, for example, SS7 ISUP signaling information, SIP signaling information etc. As previously noted, personalization node 255 may receive both in-band and out-of-band session information, which may be transmitted as signaling information during establishment of a communication session. Signaling information, which comprises session information, received at signaling block 552 may be transmitted to other blocks such as media personalization engines 235(1)-235(N), audio personalization engine 240 (see FIG. 5a) and/or speech recognition personalization engine 512.

Switching/routing block 548 may perform operations for routing and PBX functionality.

Figure 5C:
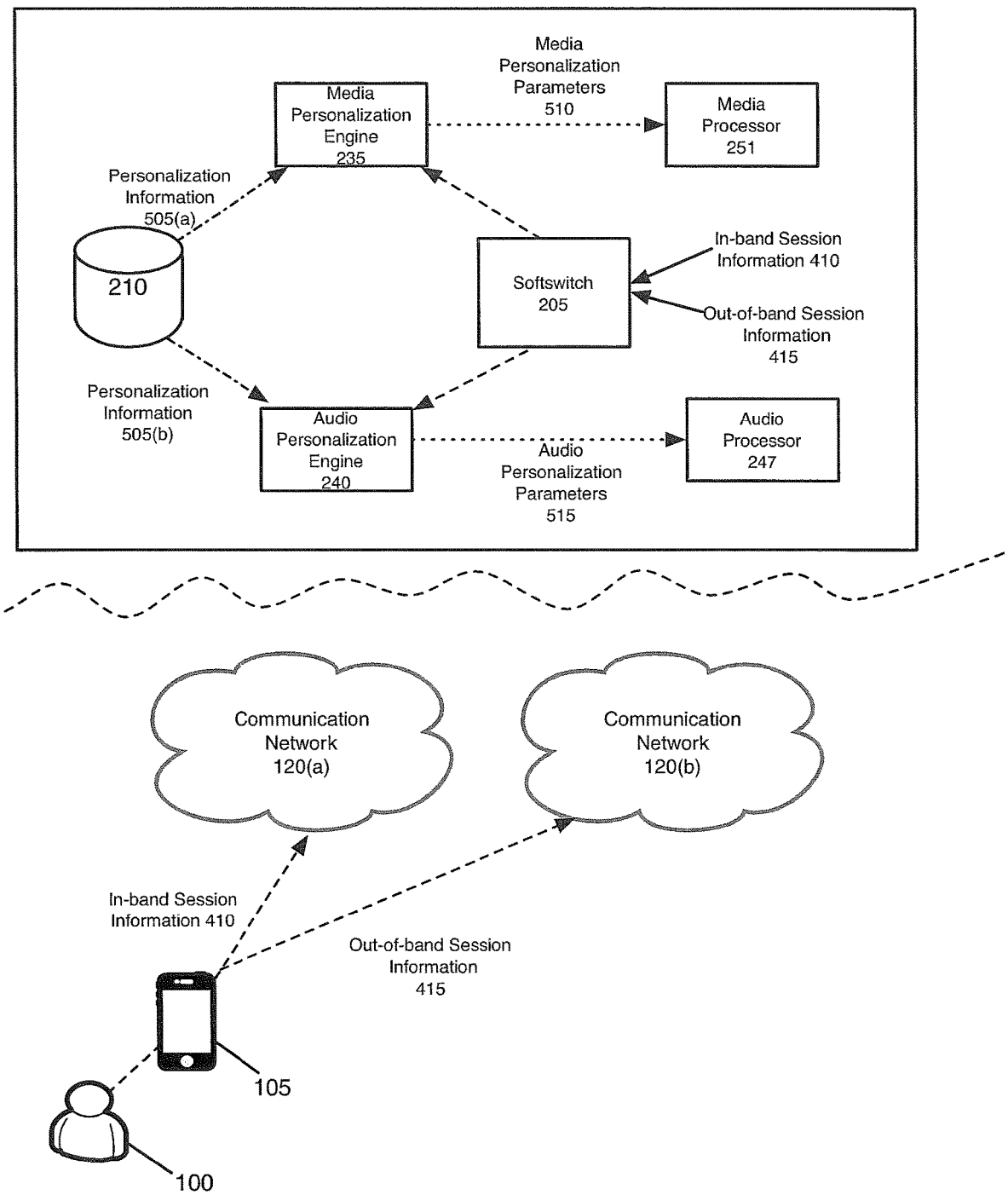
FIG. 5c illustrates an automatic configuration of a personalization node to provide a personalized communication session according to one embodiment.

FIG. 5c illustrates an automatic configuration of a personalization node to provide a personalized communication session according to one embodiment. The configuration operation depicted in FIG. 5c is performed upon initiation of a personalized communication session 280 according to one embodiment. Upon receiving signaling information that a personalized communication session has been requested at personalization node 255, session information (both in-band and out-of-band) associated with the communication session are extracted and processed. As described previously, session information may include an ANI, SIP ID and/or other identifying information associated with a communication session such as the equipment being used (e.g., telephony or media equipment) as well as codecs. As previously noted, session information may also comprise geographic and date and time information.

Upon initiation of a communication session, personalization node 255 automatically configures either audio processor 247, one or more media processors 251 and/or speech recognizer to provide a personalized communication session. According to one embodiment, personalization node 255 performs the configuration based upon session information (both in-band and out-of-band) received during setup of a personalized communication session. FIG. 5c illustrates one embodiment of such a process. As described below, received session information may be transformed into one or more parameters for configuration of one or more media processors 235(1)-235(N), audio processor 247 and/or speech recognizer 514 on personalization node 255. FIG. 5c depicts only a single media personalization engine 235 and audio personalization engine 240. Although not depicted in FIG. 5c, softswitch 205 may also transmit session information to speech recognition personalization engine 512 for configuration of speech recognizer 514.

As shown in FIG. 5c, both in-band session information 410 and out-of-band session information 415 are received at personalization node by softswitch 205. In particular, as described above, signaling information may be received by signaling block 552 in communication agent 558 of softswitch 205. Signaling block 552 or another functional component on softswitch 205 205 may perform initial analysis, transformation or processing both in-band session information 410 and out-of-band session information 415. In particular, signaling block 552 or other functional component may transform session information into a structured data format. Exemplary structured data formats may include XML ("Extensible Markup Language").

Softswitch 205 may then transmit the in-band session information 410 and out-of-band session information in structured form to audio personalization engine 240 and/or media personalization engine 235. Softswitch 205 may be configured to transmit different subsets of personalization information to audio personalization engine 240, media personalization engines 235(1)-235(N) and/or speech recognition personalization engine 512. The structure of media personalization engine 235 and audio personalization engine 240 are described in detail below.

Upon receiving session information (both in-band and out-of band) from softswitch 205, audio personalization engine 240 and media personalization engine 235 may generate one or more queries for querying personalization database 210. An exemplary schema of a personalization database 210 is described below. In particular, audio personalization engine 240 and media personalization engine 235 may execute any number of algorithms to transform received session information into queries for querying personalization database 210. As described above, the received session information may be in a structured format such as XML. Thus, audio personalization engine 240 and media personalization engine 235 may readily perform transformations on such structured data to generate appropriate queries for personalization database 210. Media personalization engine 235 and audio personalization engine 240 may be pre-programmed to perform specific transformations on received session information to generate queries for personalization database 210. Alternatively, media personalization engine 235 and audio personalization engine 240 may execute dynamically configurable algorithms for such transformations.

Upon formulating database queries, media personalization engine 235 and audio personalization engine 240 may respectively utilize such queries to retrieve personalization information 505(a) and 505(b) from personalization database 210. Thereupon, media personalization engine 235 and audio personalization engine 240 may perform further transformations on retrieved personalization information 505(a) and 505(b) to generate media personalization parameters 510 and audio personalization parameters 515 respectively. According to one embodiment, personalization information may comprise, among other things, digital signal processing configuration logic representing programmatic instructions for transforming personalization information 505(a) and 505(b) into media personalization parameters 510 and audio personalization parameters 515. Personalization information 505(a) and 505(b) may be represented in a structured data format such as XML. Thus, the transformation of personalization information 505(a) and 505(b) to media personalization parameters 510 and audio personalization parameters 515 may be performed using any appropriate transformation such as XSLT.

Figure 5D:
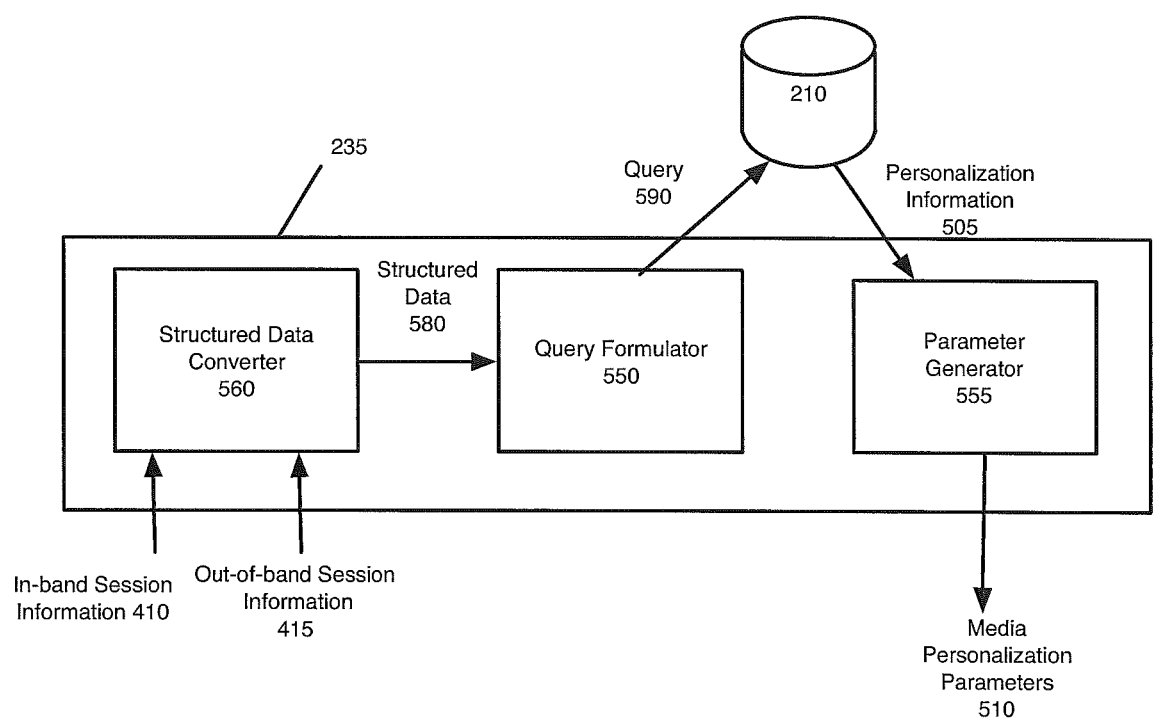
FIG. 5d further illustrates an exemplary structure of a media personalization engine and an associated process for transformation of session information to media processor parameters according to one embodiment.

FIG. 5d further illustrates an exemplary structure of a media personalization engine and an associated process for transformation of session information to media processor parameters according to one embodiment. As shown in FIG. 5d, media processing engine 235 may comprise structured data converter 560, query formulator 550 and parameter generator block 555. Audio personalization engine 240 and speech recognition personalization engine 512 (not shown in FIG. 5d) may also exhibit similar structure. According to one embodiment, structured data converter 560, query formulation block 550 and parameter generator block 512 may comprise any code capable of being executed on a general purpose computer.

As shown in FIG. 5d, in-band session information 410 and out-of-band session information 415 is provided to structured data conversion block 560. Structured data conversion block 560 may transform in-band-session information 410 and out-of-band session information 415 into structured data 580 such as XML. Upon receipt by query formulator 550 of structured data 580, query formulator 550 generates query and queries personalization database 210.

Upon receiving query 590, personalization database 210 returns personalization information 505, which is provided to parameter generator block 555. Parameter generator block 555 utilizes personalization information 505 to generate media personalization parameters 510. The structure and function of exemplary structured data converter block 560, query formulator 550 and parameter generator block 555 are described in detail below.

Figure 5E:
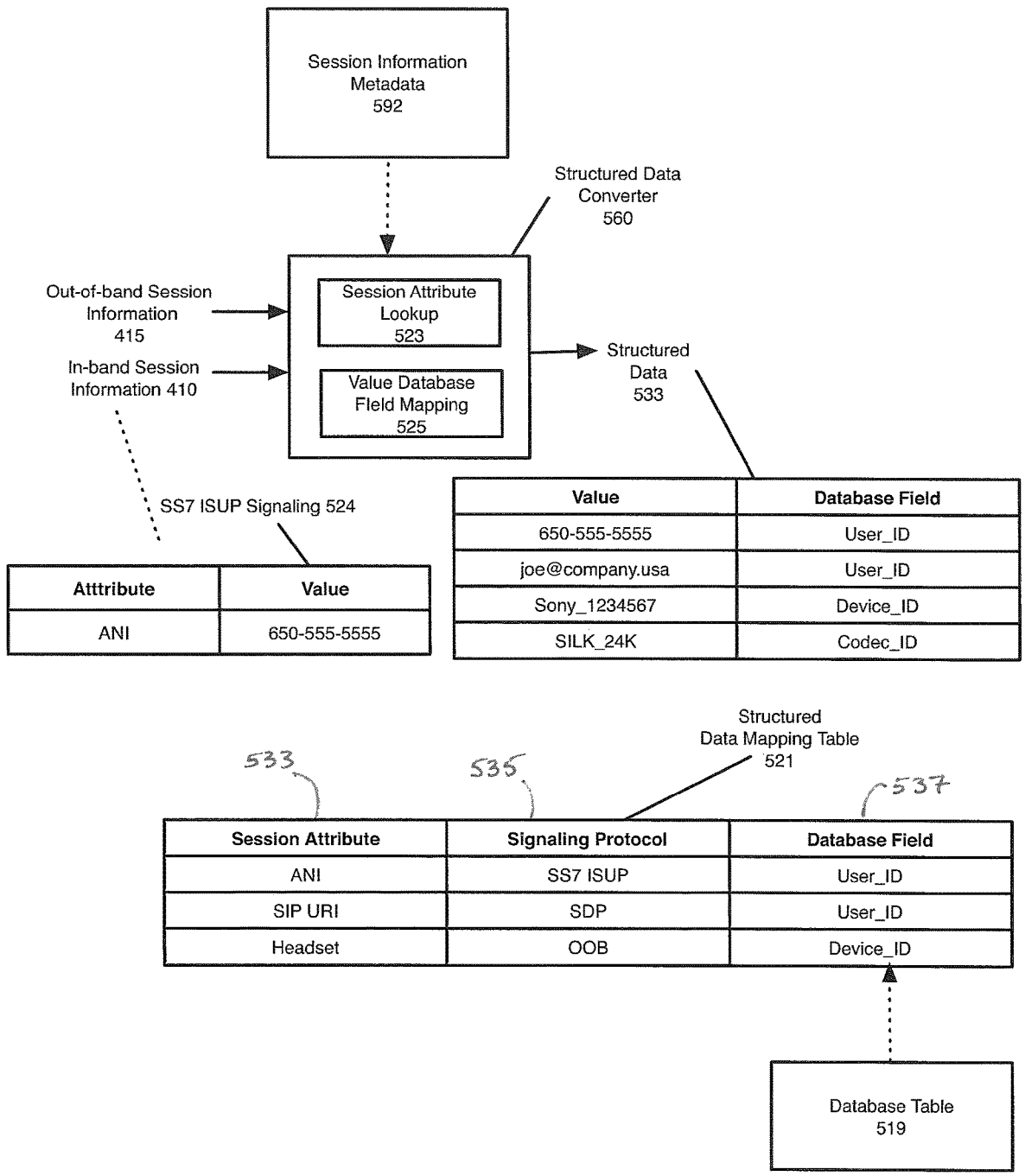
FIG. 5e depicts an operation of a structured data converter according to one embodiment.

FIG. 5e depicts an operation of a structured data converter according to one embodiment. As shown in FIG. 5e, structured data converter 560 may comprise session attribute lookup block 523 and value mapping block 525. Structured data converter 560 receives in-band session information 410 and out-of-band session information 415. Structured data converter 560 also receives session information metadata 592. Session information metadata 592 provides a mapping between session data attributes and fields in personalization database 210 (not shown in FIG. 5e). An exemplary schema for a personalization database 210 is described below with respect to FIG. 5i.

Structured data mapping table 521 shown in FIG. 5e represents one exemplary embodiment of session information metadata 592. As shown in FIG. 5e, structured data mapping table 521 includes session attribute column 533, signal protocol column 535 and database field column 537. Session attribute column 533 may store a particular attribute provided via either in-band session information or out-of-band session information 415 such as an ANI. Signaling protocol column 535 indicates a particular signaling protocol associated with a session attribute. For example, an ANI is typically associated with SS7 ISUP. Database field column 537 stores an identifier of a field name within a column in personalization database 210 to which a particular session attribute is to be mapped. Structured data mapping table 521 in FIG. 5e also shows various exemplary entries. In particular, structured data mapping table 521 shows ANI, which is part of SS7 ISUP is mapped to User_ID field in personalization database 210. SIP URI, which is part of SDP is mapped to User_ID field in personalization database 210. Finally, headset attribute, which is transmitted as out-of-band session information ("OOB") is mapped to Device_ID field in personalization database 210.

Figure 5F:
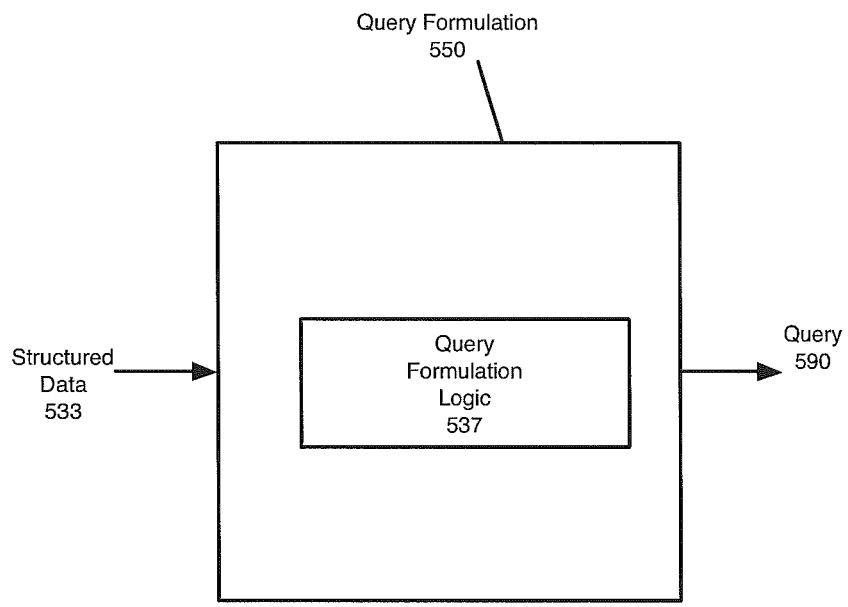
FIG. 5f is a block diagram of a query formulator according to one embodiment.

Upon receiving in-band session information 410 or out-of-band session information 415, session attribute lookup block 523 parses in-band session information 410 and out-of-band session information 415 by consulting structured data mapping table 521. In particular, recognizing that SS7 ISUP signaling information has been received session attribute lookup block 523 may scan structured data mapping table 521 to determine all attributes associated with SS7 ISUP and then parse the received SS7 ISUP signaling data for each attribute and its associated value. Upon finding a particular attribute in the received session information, the value for the attribute is FIG. 5f is a block diagram of a query formulator according to one embodiment. Structured data 533 is received by query formulator and passed to query formulation logic block 537. Query formulation logic block 537 may utilize any type of algorithm to generate queries from structured data 533. For example, according to one embodiment, structured data 533 comprises a value to database mapping as shown in FIG. 5e. In this instance, query formulation logic block may simply construct queries based upon individual values mapped to database fields. Alternatively, query formulation logic block 537 may be configured to perform more complex joins. However, the point is that because structured data 533 provides a mapping from fields to values, query formulation logic block 537 may operate on this data in the context of the underlying structure of personalization database 210.

Figure 5G:
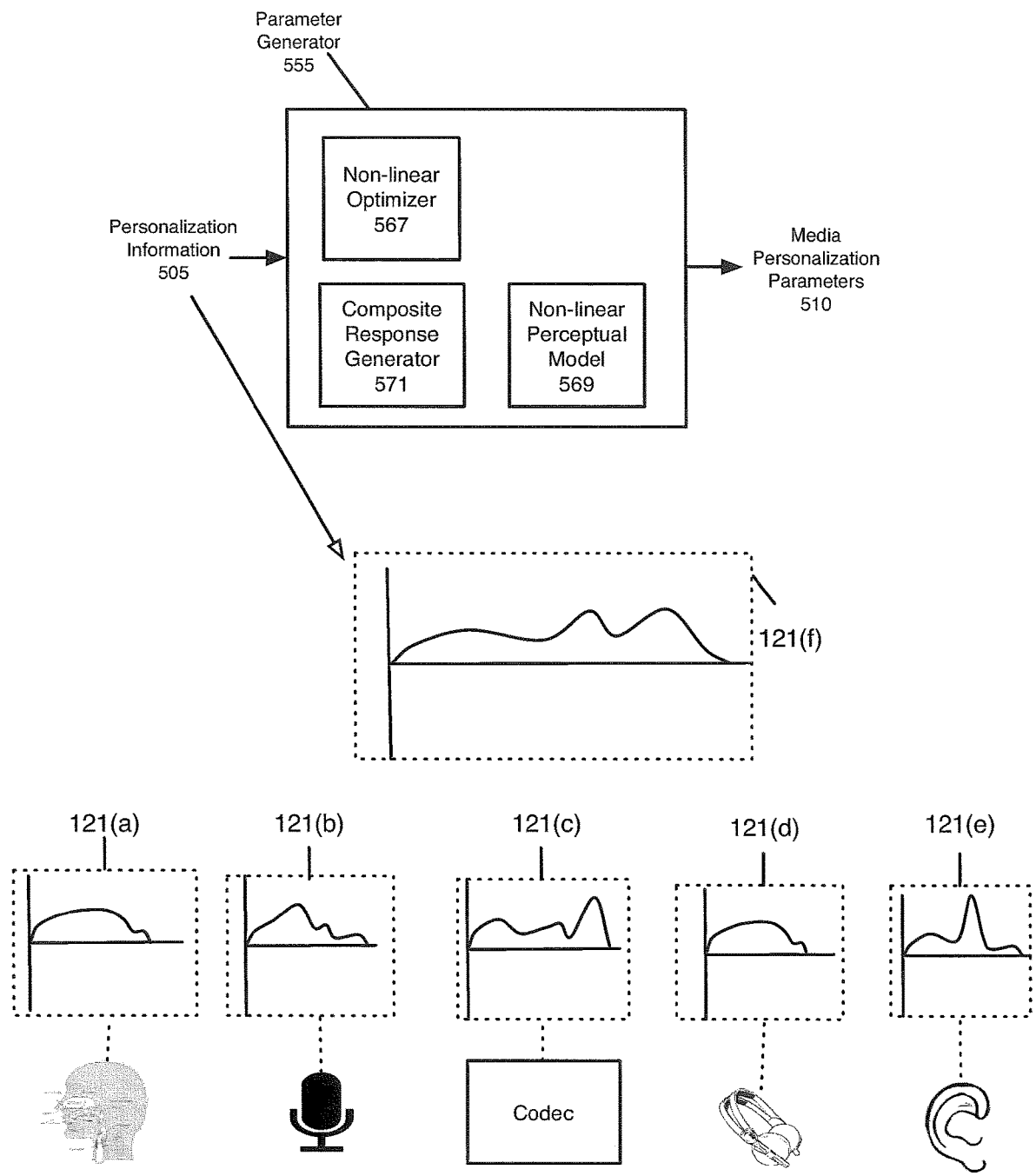
FIG. 5g is a block diagram of a media personalization parameter generator according to one embodiment.

FIG. 5g is a block diagram of a media personalization parameter generator 555 according to one embodiment. Media personalization parameter generator 555 receives personalization information 505 (retrieved from personalization database 210) and generates media personalization parameters 510. Media personalization parameters 510 are particular parameters required to configure signal processor such as audio processor 247 (referring back to FIG. 5c). Media personalization parameters 510 may also comprise information indicating a topological layout of processing blocks within a media processor 251 or audio processor 247. For example, in the case of audio processor 247, audio personalization parameters 515 may indicate particular signal processing blocks to be utilized in a layout (such as compressors or equalizers) as well as their topological connection and layout.

According to one simple embodiment, personalization information 505 retrieved from personalization database 210 comprises media personalization parameters 510 or audio personalization parameters 515 themselves. That is, it is possible to store media personalization parameters 510 or audio personalization parameters 515 in personalization database 210 directly and retrieve them based upon queries formulated by query formulator 550. In this instance, retrieved media personalization parameters 515 or audio personalization parameters 510 are simply transmitted to the appropriate media processors.

According to an alternative embodiment shown in FIG. 5g, parameter generator 555 includes non-linear optimizer 567, composite response generator 571 and non-linear perceptual model block 569. According to this embodiment, it is assumed that personalization information 505 retrieved from personalization database 210 comprises a set of frequency response characteristics 121(a)-121(e) associated with various aspects of a personalized communication session. As will be described in detail below, personalization database 210 may return frequency response characteristics information 121(a)-121(e) for a number elements associated with a personalized communication session 280. For example, 121(a) is a frequency characteristic of a speaker, 121(b) is a frequency characteristic of a microphone, 121(c) is a frequency response characteristic of a codec, 121(d) is a frequency response characteristic of a playback device such as a headset and 121(e) is a frequency response characteristic of the listener's ear.

According to the embodiment depicted in FIG. 5g, frequency characteristics 121(a)-121(e) are provided to composite response generate 571 on parameter generator 555, which generates composite frequency characteristic 121(f). Composite response 121(f) is provided to non-linear optimizer 567 and non-linear perceptual model to generate media personalization parameters 510.

Figure 5H:
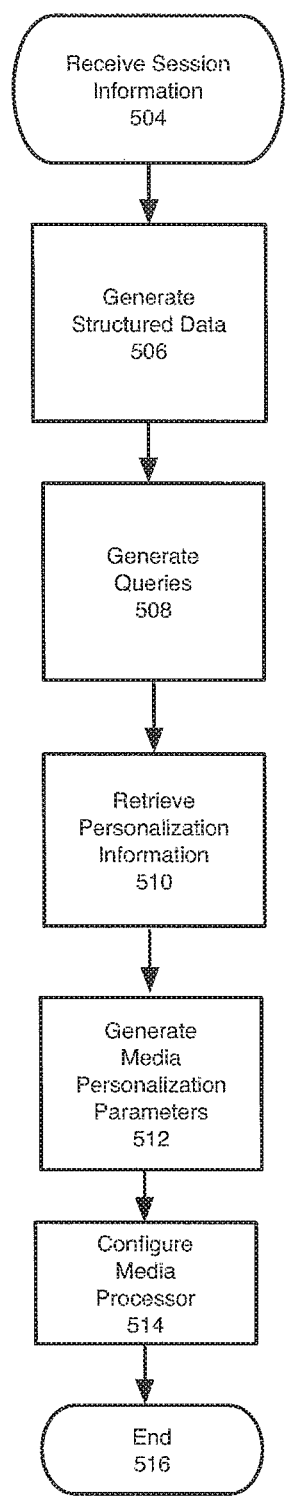
FIG. 5h is a flowchart depicting a personalization operation performed by a personalization node according to one embodiment.

FIG. 5h is a flowchart depicting a personalization operation performed by a personalization node according to one embodiment. The process is initiated in 504 whereby both in-band session information 410 and out-of-band session information is received at personalization node 255. In 506, structured data 533 is generated from in-band session information and out-of-band session information 415. In 508, queries are generated from structured data determined in 506. In 510, personalization database 210 is queried using the queries from 508 to retrieve personalization information 505. In 512, media personalization parameters 510 and/or audio personalization parameters 515 are generated from personalization information 505. In 514, audio processor 247 and/or media processors 251(1)-251(N) are configured using audio personalization parameters 515 and media personalization parameters 510. The process ends in 516.

FIG. 5i depicts an exemplary database schema for a personalization database according to one embodiment. As previously described, personalization database 210 stores personalization information 505, which may be retrieved using queries based on session information both in-band (410) and out-of-band (415) received during initialization of personalized communication session 280. The schema shown in FIG. 5i is merely exemplary and many other types and arrangements of personalization information 505 may be stored.

Referring to FIG. 5i, personalization database schema 599 may comprise user table 519(1), Device table 519(2), DSP_Configuration_Logic table 519(3), Device_Characteristics table 519(4), DSP_Config_Parameters table 519(5) and Frequency_Response table 519(6). User table 519(1) may store information relating to subscribers to personalization node 255. Device table 519(2) stores information regarding devices. DSP_Config_Logic table 519(3) may store pre-configured configuration logic for generating configuration parameters from personalization information. Device_Characteristics table 519(5) stores information regarding device characteristics. Frequency_Response table stores information regarding frequency response characteristics.

As shown in FIG. 5i, each table 519(1)-519(6) may store one or more fields or columns.

Categorical Personalization

Subscribers to one or more services offered by personalization node 255 may utilize a tuning interface such as audio tuning interface 522 shown in FIG. 5a to tune particular media types for processing during a real-time communication session. Utilizing a tuning interface such as audio tuning interface 522 may provide maximum control over personalization of media processed by personalization node 255. However, in some instances subscribers to personalization node 255 may desire a quick interactive setup during initiation of a personalized communication session 280.

According to one embodiment, during initiation of a personalized communication session 280 via personalization node 255, subscribers may select a categorical tuning process, the results of which may be saved for later use. A categorical tuning process is described below with respect to audio media. However, categorical tuning may be applied to other media types such as video.

Figure 6A:
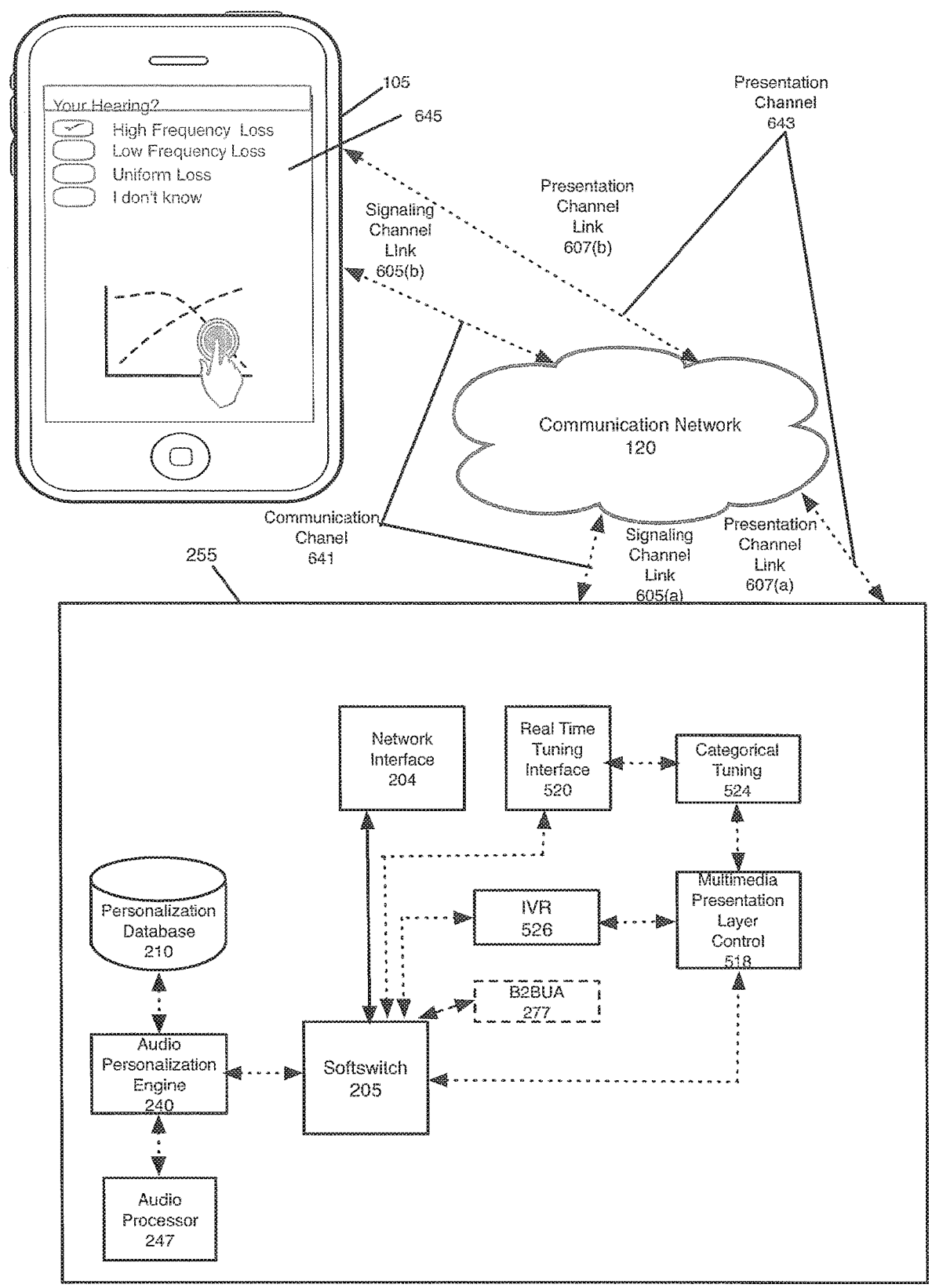
FIG. 6a depicts particular functional elements on a personalization node for providing a categorical tuning process according to one embodiment.

FIG. 6a depicts particular functional elements on a personalization node 255 for providing a categorical tuning process according to one embodiment. In particular, categorical tuning block 524 provides logic and control for initiating and maintaining an interactive tuning process during initiation of a personalized communication session. As previously discussed with respect to FIG. 5a, during initialization of a personalized communication session 280, signaling information may be received at personalization node 255 indicating that a personalized communication session 280 has been requested. For the purposes of this discussion, it is assumed that a user (not shown in FIG. 6a) utilizes communication device 105 to initiate a personalized communication session such that communication channel 641 comprising signaling channel links 605(a)-605(b) is established between personalization node 255 and communication device 105 via communication network 120. It is further assumed that communication network is a packet based network capable of data transmission. An operation of a categorical tuning block 524 may also operate in heterogeneous networking environments but it is not described here. Upon initiation of a communication by a user (not shown in FIG. 6a) utilizing communication device 105, signaling information may be received at personalization node 255 over signaling channel links 605(a)-605(b).

Either automatically or upon a pre-configured trigger softswitch 205 may respond to the initialization request by opening a presentation channel 643 comprising presentation channel links 607(a)-607(b) with communication device 105. As previously mentioned, communication network 120 shown in FIG. 6a is assumed to be a packet data network such as the public Internet. Thus, presentation channel links 607(a)-607(b) may be established using any known network protocols or technologies such as a TCP/IP socket connection and utilizing any type of transport protocols. It is understood that presentation channel links 607(a)-607(b) may be involve a connection (virtual or otherwise) or connectionless and upon establishing such links, a data session may be established over presentation channel links 607(a)-607(b) that is separate from any signaling and media data arriving over signaling channel links 605(a)-605(b).

Furthermore, communication device 105 may run a supplemental or auxiliary application aside from any communication application running on such device responsible for the handling of signaling and media for communication sessions. Alternatively, a single application may run on communication device 105 that is capable of both handling signaling and media for a communication session as well as any data associated with a presentation channel comprising presentation channel links 607(a)-607(b). In particular, according to the embodiment shown in FIG. 6a, communication device 105 runs an integrated communication and presentation application 645 that may receive media and signaling associated with a personalized communication session 280 but in addition may receive and process media and signaling associated with a presentation session in an integrated manner.

In the reverse direction, user interaction with integrated communication and presentation application 645 may generate interaction messages, which are transmitted over presentation channel 643 to personalization node 255. Interaction messages may utilize any type of format such as JSON, etc. Interaction messages received at personalization node 255 are received by multimedia presentation layer control 518 and passed to categorical tuning block 524 where they may be utilized to update a state machine.

Figure 6B:
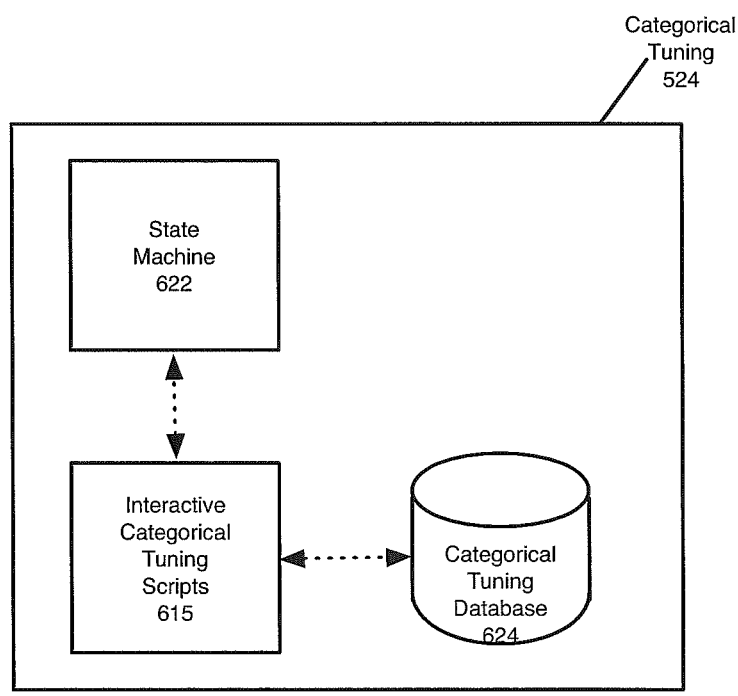
FIG. 6b depicts an exemplary structure of a categorical tuning block according to one embodiment.

Referring again to FIG. 6a, multimedia presentation layer control block 518 interacts with categorical tuning block 524 to generate presentation information for transmission over presentation channel 641 (via communication network 120) for display on communication device 105 using FIG. 6b depicts an exemplary structure of a categorical tuning block according to one embodiment. Categorical tuning block 524 may comprise state machine 622, interactive categorical tuning scripts block 615 and categorical tuning database 624. Categorical tuning database 624 may store pre-configured DSP parameters mapped to various hearing categories such as "high frequency loss", "low frequency loss", etc. Interactive categorical tuning scripts block 615 may store pre-defined scripts and associated logic for conducting a tuning session with a subscriber to personalization node 255. Scripts may be stored in, for example, XML format and represent a number of queries to ask users regarding tuning preferences. State machine 622 represents and updates state as subscribers traverse various scripts provided by interactive categorical tuning scripts.

Based upon a user's interaction with categorical tuning block 524, state machine 622 updates its internal state and provides information regarding a current state to multimedia presentation layer control block 518. Multimedia presentation layer control block 518 may utilize received state information to generate presentation information for transmission over presentation channel to communication device 105 for display via application 645.

Figure 6C:
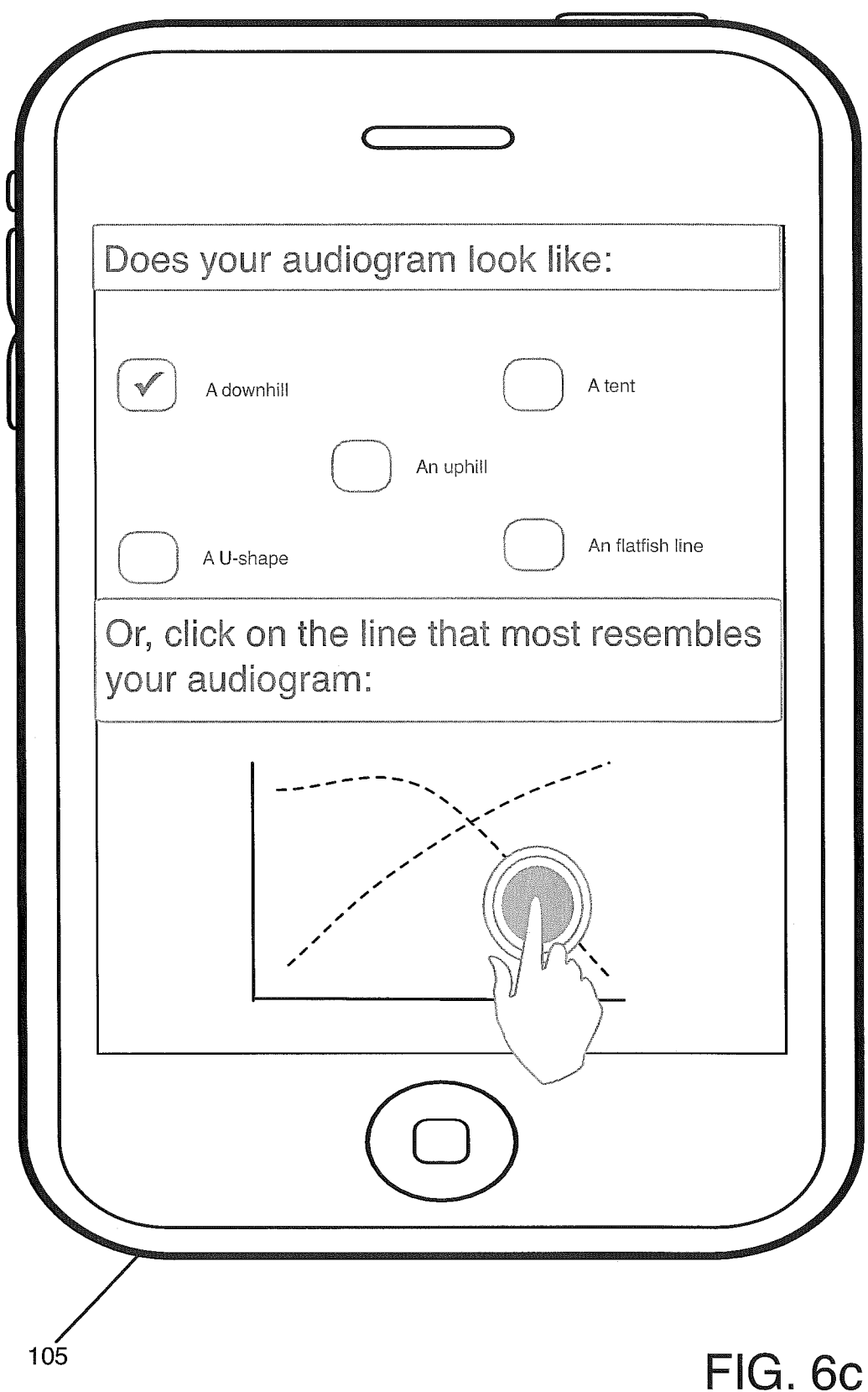
FIG. 6c depicts an exemplary screen generated by an integrated communication and presentation application running on a communication device during a categorical tuning session according to one embodiment.

FIG. 6c depicts an exemplary screen generate by an integrated communication and presentation application running on a communication device during a categorical tuning session according to one embodiment.

Signal Processing

Media processors 251(1)-251(N) and audio processor 247 provide processing of respective media streams for subscribers to personalization node 255 in accordance with a personalization configuration process described above with respect to FIG. 5a-d. Upon configuration of personalization node 255, media transport may occur. As described above any number of media transport protocols (e.g., RTP) may be utilized depending upon the network configuration in which personalization node 255 operates.

Figure 7A:
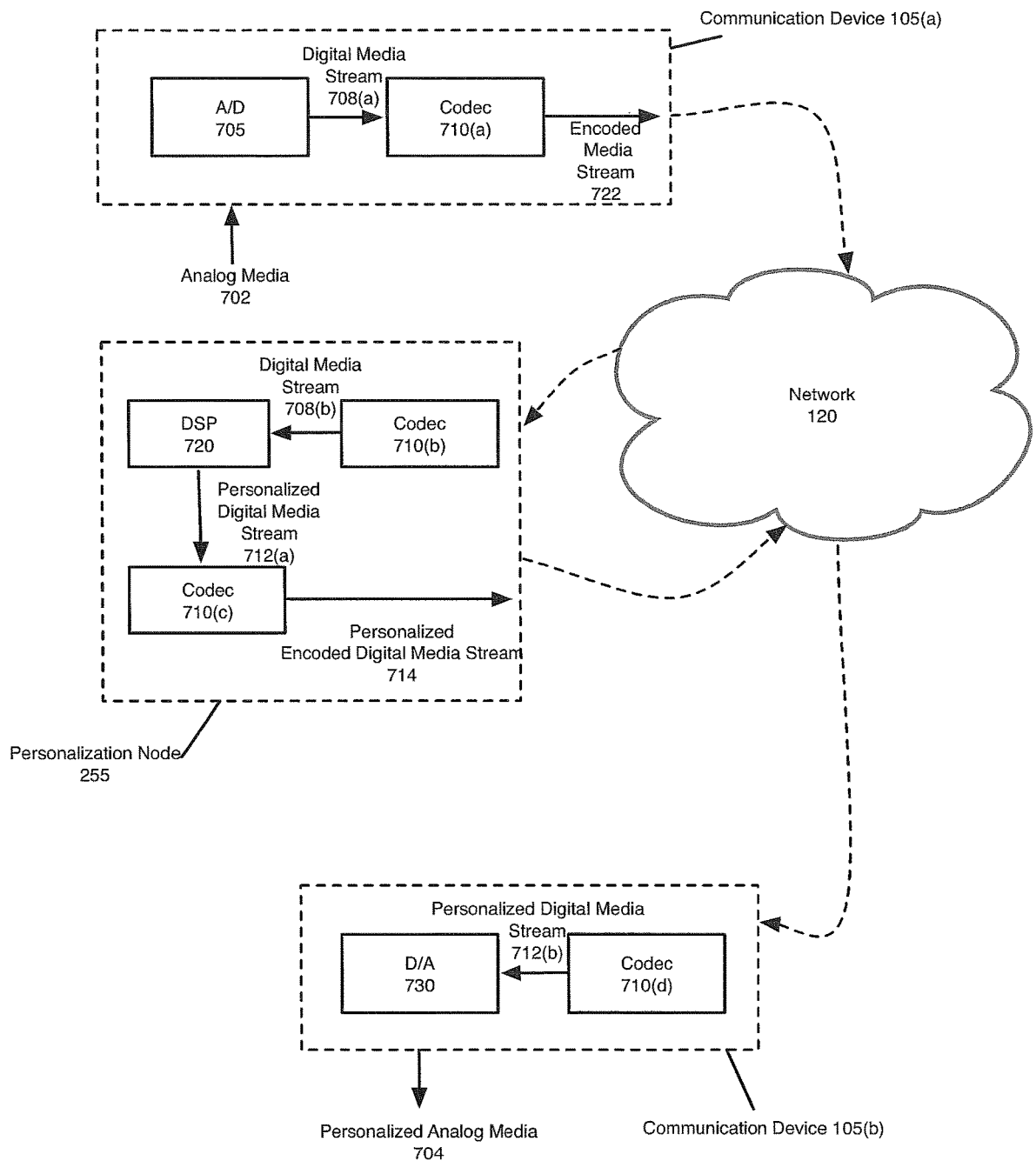
FIG. 7a illustrates exemplary media processing steps for a personalized communication session according to one embodiment.

FIG. 7a illustrates exemplary media processing steps for a personalized communication session 280 according to one embodiment. It is assumed for purposes of this example that personalization node 255 has already been configured according to the process described above with respect to FIGS. 5a-5d during an initialization of a personalized communication session. Further, for purposes of this example, media transport is described as unidirectional. However, it is to be understood that media transport is symmetric in the reverse direction.

Referring again to FIG. 7a, analog media 702 is captured on communication device 105(a). Analog media 702 may be captured utilizing an appropriate capture device (e.g., a microphone for audio, camera for video, or still images, etc.). Communication device 105(a) then performs a number of processing steps. In particular, analog media 702 is processed by analog to digital converter (A/D) 705 to generate digital media stream 708(a). Codec 710(a) processes digital media stream 708(a) to generate encoded media stream 722. Encoded media stream 722 is transmitted over network 120 where it is received at personalization node 255.

Codec 710(b) decodes encoded media stream 722 to generate digital media stream 708(b). DSP 720 then processes digital media stream 708(b) to generate personalized digital media stream 712(a). It is assumed that DSP 720 has been configured via a corresponding personalization engine as described above with respect to FIGS. 5a-5d. Codec 710(c) then processes personalized digital media stream 712(a) to generate personalized encoded digital media stream 714.

Personalized encoded digital media stream is transmitted over network 120 where it is received at communication device 105(b). Codec 710(d) processes personalized encoded digital media stream 714 to generate personalized digital media stream 712(b). Digital to analog converter (D/A) 730 processes personalized digital media stream 712(b) to generate personalized analog media 704.

Audio Signal Processing

Figure 7B:
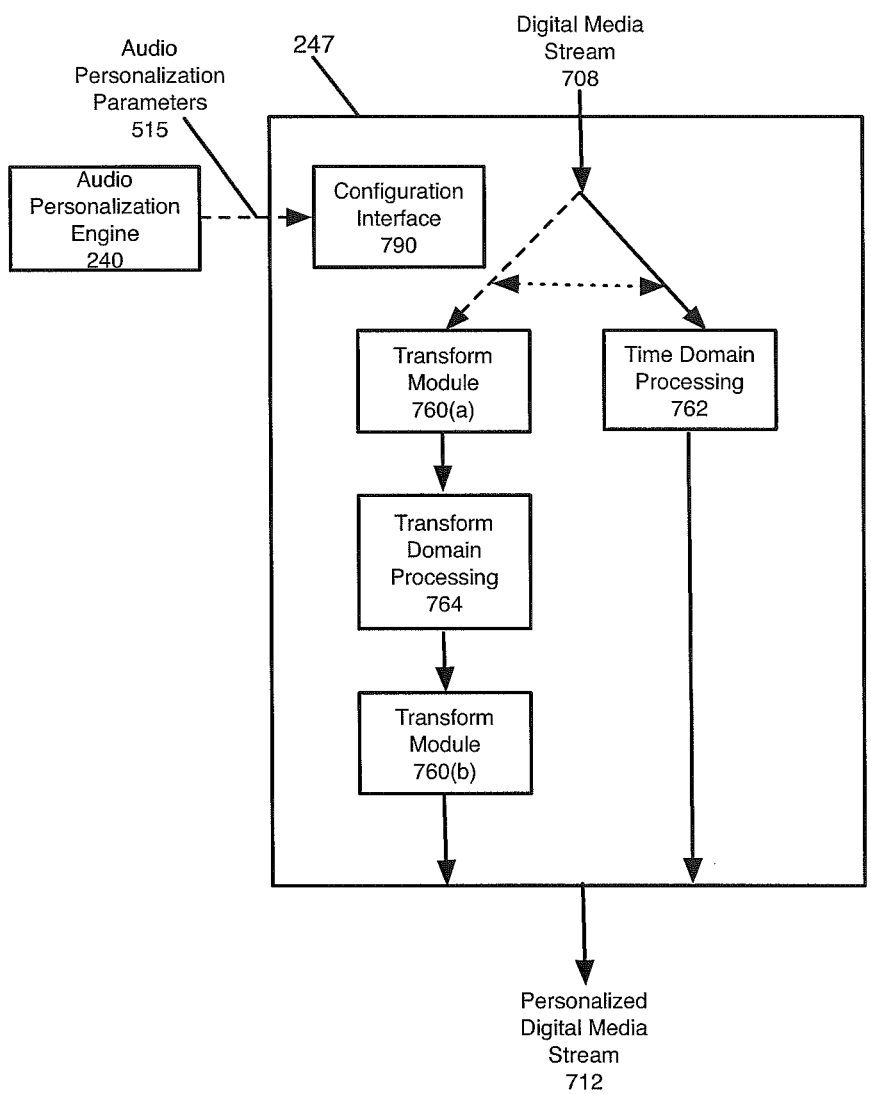
FIG. 7b is a block diagram of an exemplary audio processor allowing selectable time domain or transform domain processing according to one embodiment.

FIG. 7b is a block diagram of an exemplary audio processor allowing selectable time domain or transform domain processing according to one embodiment. Audio processor 247 includes configuration interface 790 that may allow configuration of DSP parameters as well as a topological layout for audio processor by, for example, audio personalization parameters 515 received from audio personalization engine 240. Audio processor 247 receives digital media stream 708 and performs digital signal processing upon digital media stream 708 according to configuration, for example, established by audio personalization engine 240 (not shown in FIG. 7b) to generate personalized digital media stream 712.

Audio processor 247 may include time domain processing block 762, transform modules 760(a)-760(b) and transform domain processing block 764. As shown in FIG. 7b, digital signal processing may be performed in the time domain by time domain processing block 762 or in the transform domain by transform domain processing block 764. Processing by time domain processing block 762 or transform domain processing block 764 may be selectable via a configuration parameter as shown in FIG. 7b. Transform module 760(a) performs any type of transformation on digital media stream 708 from the time domain to some other basis. For example, transform module 760(a) may transform digital media signal 708 using a FFT ("Fast Fourier Transform"), DFT ("Discrete Fourier Transform"), DWT ("Discrete Wavelet Transform") or any other type of transformation to a suitable domain for processing. Transform module 760(b) transforms a digital signal in the transform domain back to the time domain. Transform module 760(b) may be, for example, an IFFT ("Inverse Fast Fourier Transform"), IDFT ("Inverse Discrete Fourier Transform"), IDWT ("Inverse Discrete Wavelet Transform"), etc.

Figure 7C:
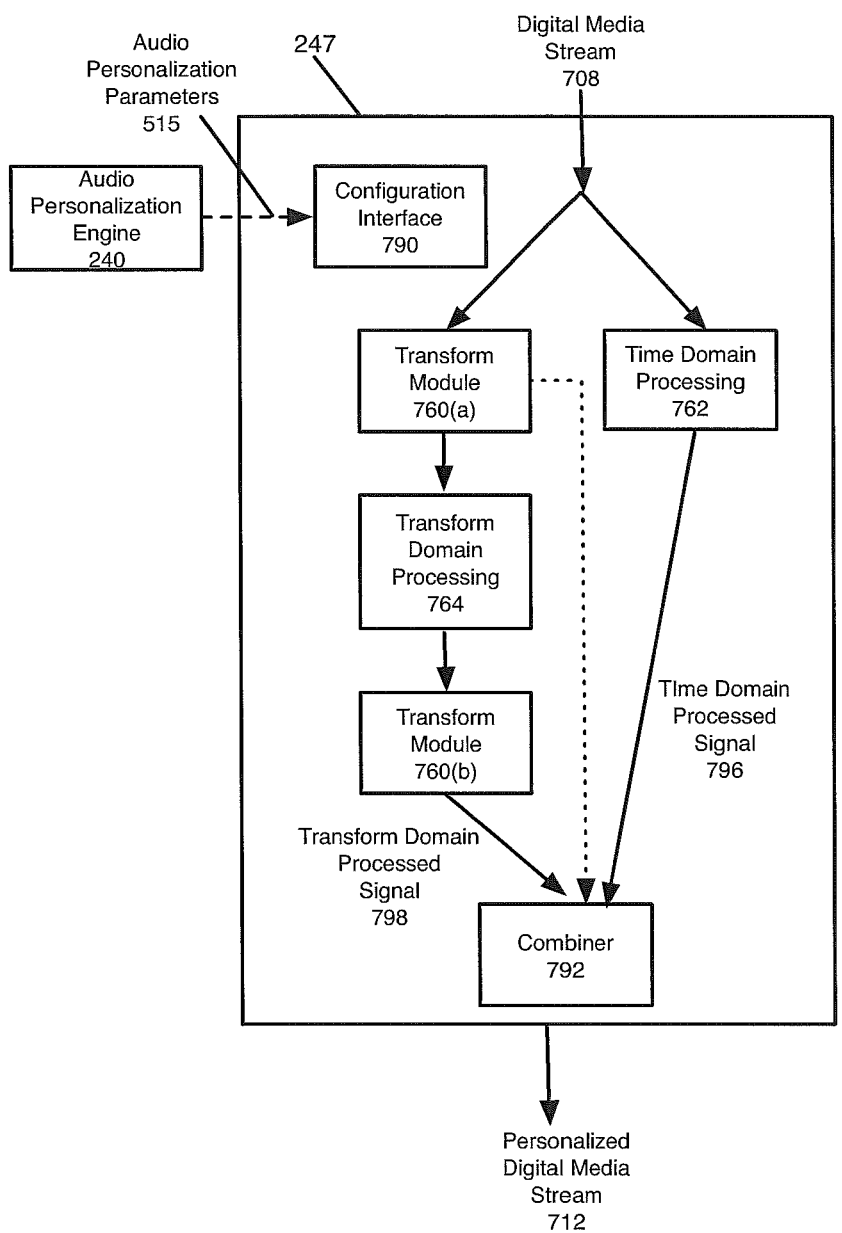
FIG. 7c is a block diagram of an exemplary audio processor that provides combined time domain and transform domain processing according to one embodiment.

FIG. 7c is a block diagram of an exemplary audio processor that provides combined time domain and transform domain processing according to one embodiment. FIG. 7c includes functional blocks similar to FIG. 7b including transform modules 760(a)-760(b), transform domain processing block 764, time domain processing block 762 and configuration interface 790. However, as shown in FIG. 7c, processing of digital media stream is performed in both the time domain and transform domain. Respective time domain processed signal 796 and transform domain processed signal 798 are then combined via combiner 792. Combiner 792 may perform any transformation or additional digital signal processing on both time domain processed signal 796 and/or transform domain processed signal 798 including mixing, etc. Alternatively, transform domain information received from transform module 760(a) may be used to drive or configure additional signal processing performed by combiner 792.

Figure 7D:
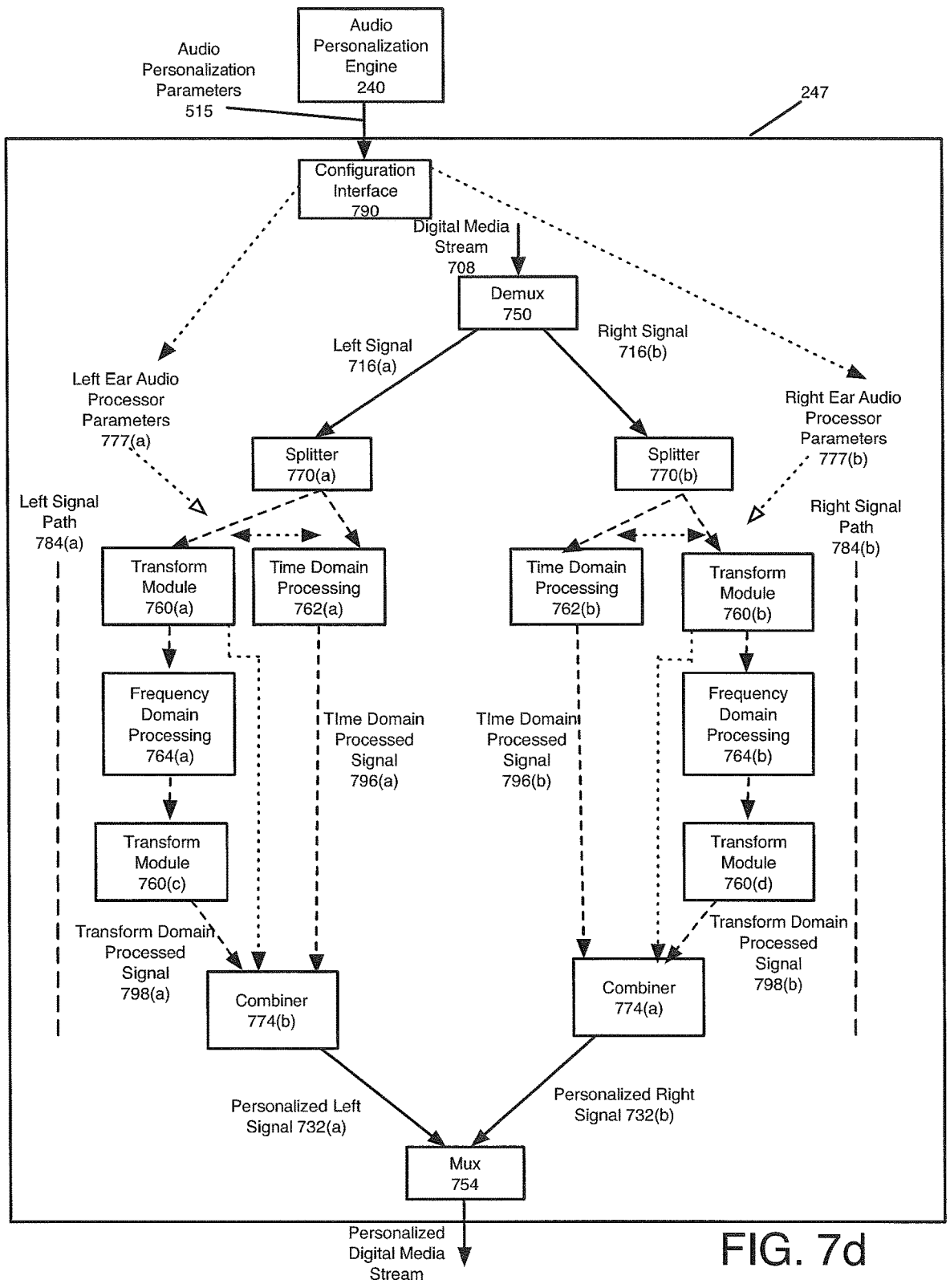
FIG. 7d is a block diagram of an audio processor for performing binaural processing on a stereo signal according to one embodiment.

FIG. 7d is a block diagram of an audio processor for performing binaural processing on a stereo signal according to one embodiment. Typically the frequency response of the left ear and right ear may differ widely. Thus, it is advantageous to account for the differences in left and right ear hearing response separately. It is assumed for purposes of the exemplary embodiment shown in FIG. 7d that received digital media stream 708 is a stereo media stream. An exemplary structure of an audio processor for processing a received mono digital media stream is described below with reference to FIG. 7e. Transmission of a stereo media stream may be achievable in a telephony communication session in the case of a VoIP network or the public Internet using the SIP or other protocol. For example, the underlying transport protocol for such a communication session may be RTP, which would support the transmission of a stereo media stream.

Audio processor may include configuration interface 790, demultiplexer 750, splitters 770(a)-770(b), transform modules 760(a)-760(d), frequency domain processing blocks 764(a)-764(b), time domain processing blocks 762(a)-762(b), combiners 774(a)-774(b) and multiplexer 754. Personalization database 210 (not shown in FIG. 7d) may store personalization information related to binaural processing including left and right ear personalization preferences. Binaural personalization preferences may be transformed into left ear audio processor parameters 777(a) and right ear audio processor parameters 777(b) using analogous methods to those described with respect to FIGS. 5a-h. Thus, audio personalization parameters 515 may further comprise left ear audio personalization parameters 777(a) and right ear audio personalization parameters 777(b).

As shown in FIG. 7d, audio processor 247 may be configured via audio personalization parameters 515 received from audio personalization engine 240. Left ear audio processor parameters 777(a) may be used to configure left signal path 784(a) including time domain processing block 762(a) and/or frequency domain processing block 764(a). Right ear processor parameters 777(b) may be used to configure right signal path 784(b) including time domain processing block 762(b) and frequency domain processing block 764(b).

As described with respect to FIGS. 7a-7b, left signal path 784(a) and right signal path 784(b) may utilize any combination of time domain processing via time domain processing blocks 762(a)-762(b) and transform domain processing via transform domain processing blocks 764(a)-764(b). That is, left signal path 784(a) and right signal path 784(b) may perform processing exclusively in the time domain or the transform domain. Or they may individually use some combination of time domain processing and transform domain processing. Furthermore, left signal path 784(a) and right signal path 784(b) may individually use different combinations of time domain and transform domain processing. For example, left signal path 784(a) might use a combination of time domain and transform domain processing while right signal path 784(b) might use only time domain processing. In general, it is understood that the processing performed by left signal path 784(a) and right signal path 784(b) will differ due to the asymmetrical hearing characteristics of the left and right ears of a given user.

Digital media stream 708 is received at demultiplexer 750. As previously noted, according to the embodiment shown in FIG. 7d, digital media stream is a stereo digital signal. Demultiplexer 750 separates digital media stream 708 into respective left signal 716(a) and right signal 716(b). According to one embodiment digital media stream 708 is an interleaved digital stream. In this case, demultiplexer 750 may perform an de-interleaving operation. Left signal 716(a) may then be processed via left signal path 784(a). Similarly right signal 716(b) may be processed via right signal path 784(b) to respectively generate personalized left signal 732(a) and personalized right signal 732(b). Personalized left signal 732(a) and personalized right signal 732(b) may then be combined into a stereo signal via multiplexer 754 to generate personalized digital media stream 712. In particular, multiplexer 754 may perform an interleaving operation.

The generation of left signal 716(a) and right signal 716(b) is merely exemplary and in alternative embodiments three or more signal paths may be employed depending upon the application. For example, in the case of a surround-sound application, Dolby 5.1 or Dolby 7.1 surround sound, three or more signal paths may be employed for processing individual channels of the surround-sound signal. In the case of a mono signal, according to one embodiment, demux 312 may function as a simple splitter, which generates two identical copies of the received mono signal.

Figure 7E:
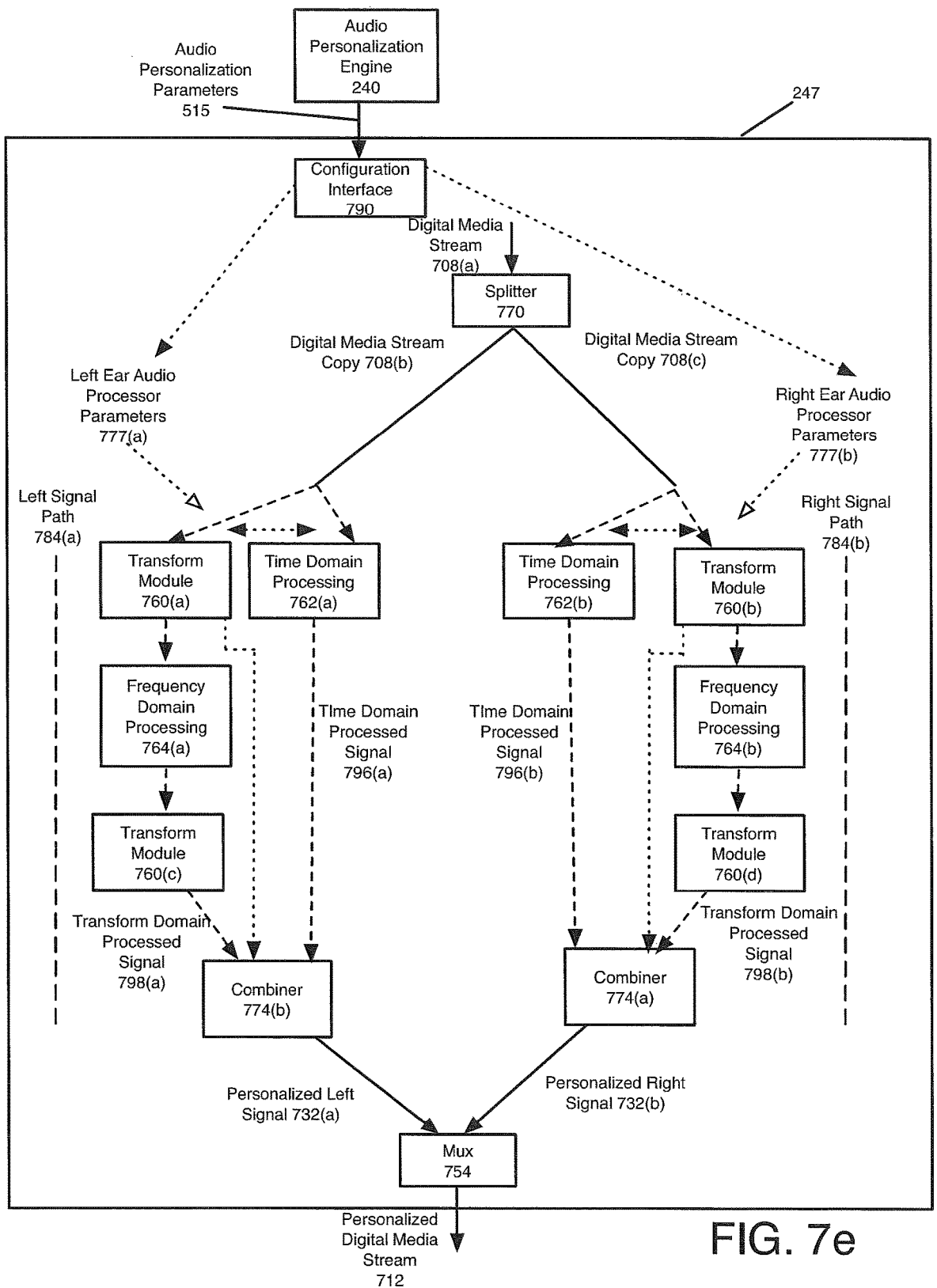
FIG. 7e is a block diagram of an audio processor for performing binaural processing on a mono signal according to one embodiment.

FIG. 7e is a block diagram of an audio processor for performing binaural processing on a mono signal according to one embodiment. For purposes of this example it is assumed that digital media stream 708(a) is a mono signal. The topology depicted in FIG. 7e may be advantageous in situations in which it is not possible to transmit a stereo signal over a communication network, for example when using the PSTN. Or, in general, in order to conserve bandwidth along one communication path associated with personalization node 255, it may be desirable to transmit a mono digital stream.

The processing scheme shown in FIG. 7e is identical to FIG. 7d except that demultiplexer 750 and splitters 770(a)-770(b) are replaced by a single splitter 770. As shown in FIG. 7e, mono digital media stream 708(a) is split by splitter 770 into digital media stream copy 708(b) and digital media stream copy 708(c). Digital media streams 708(a)-708(c) are identical. Digital media stream copy 708(b) and digital media stream copy 708(c) are then respectively processed by left signal path 784(a) and right signal path 784(b) to generate personalized left signal 732(e) and personalized right signal 732(b) respectively.

Personalized left signal 732(a) and personalized right signal 732(b) may then be combined into a stereo signal via multiplexer 754 to generate personalized digital media stream 712. In particular, multiplexer 754 may perform an interleaving operation. Note that the operation of audio processor 247 in the context of FIG. 7e is asymmetric in that input signal digital media stream 708(a) is a mono signal while output signal personalized digital media stream 712 is a stereo signal. Personalized digital media stream signal 712 may then be transmitted over a suitable communication network for transmitting a stereo signal such as a packet data network (e.g., public Internet) using a suitable transport protocol (e.g., RTP).

Figure 8A:
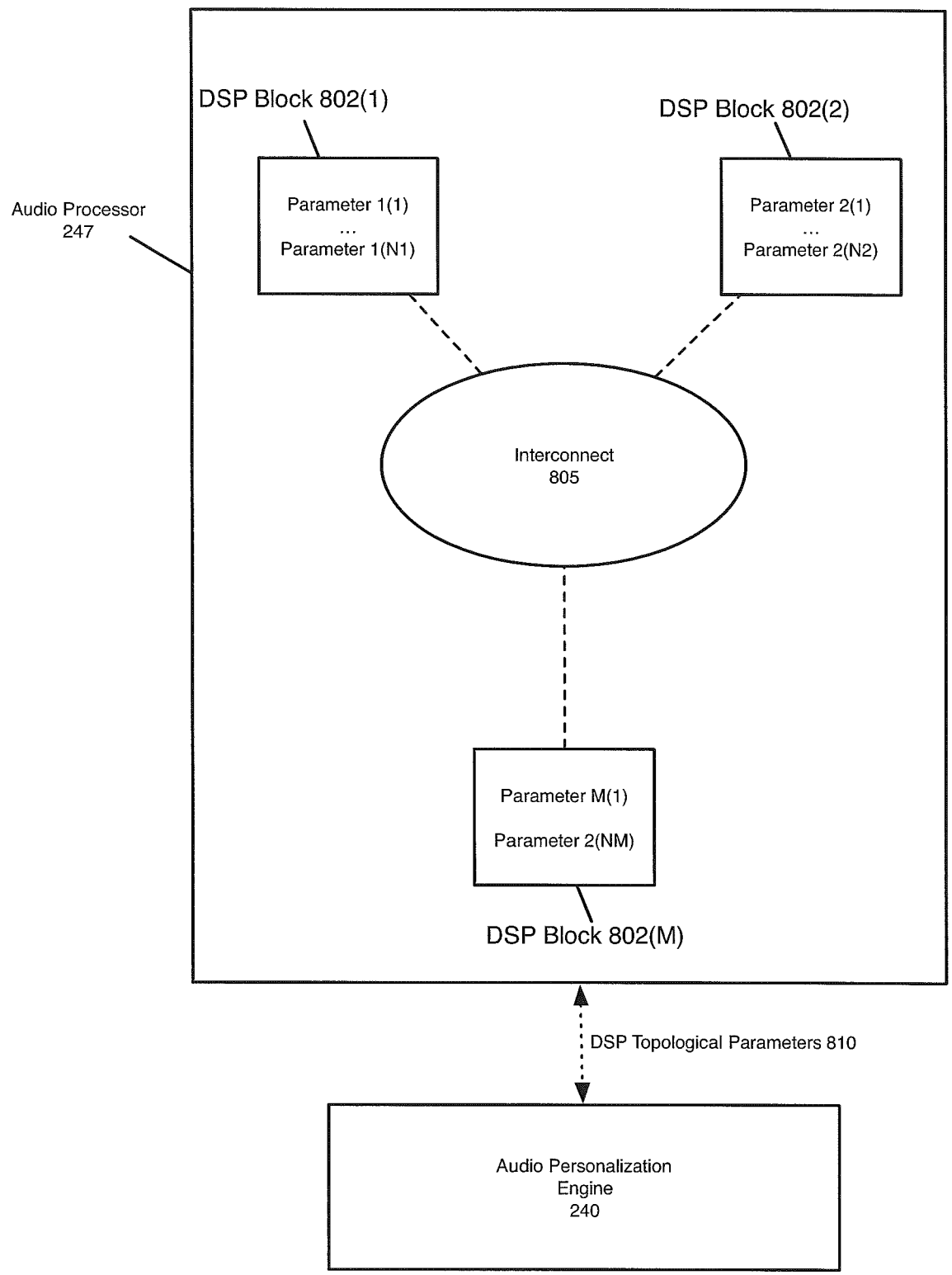
FIG. 8a depicts a configuration of an audio processor via an audio personalization engine and DSP topological parameters according to one embodiment.

FIG. 8a depicts a configuration of an audio processor via an audio personalization engine and DSP topological parameters according to one embodiment. As described above with respect to FIGS. 5a-5c, audio personalization engine 240 may generate audio personalization parameters 515 for configuring audio processor 247. Audio personalization parameters 515 may include particular parameters for configuring individual DSP block in a fixed DSP layout. However, in addition or alternatively, audio personalization parameters may also include DSP topological parameters 810 for configuring a DSP layout itself.

As depicted in FIG. 8a, audio processor 247 may comprise an arbitrary number of DSP blocks 802(1)-802(M) and interconnect 805. DSP blocks 802(1)-802(N) may perform time domain, transform domain or some mixture of time domain and transform domain processing. Interconnect 805 represents a topological arrangement and connection scheme for DSP blocks 802(1)-802(N). DSP topological parameters 810 received from audio personalization engine 240 may be used to configure or reconfigure both interconnect 805 and DSP blocks 802(1)-802(M). Thus during configuration of a personalized communication session 280 by audio personalization engine, the topological arrangement and processing scheme of audio processor 247 may be independently varied along with the parameters controlling the individual processing performed by DSP blocks 802(1)-802(M). In addition, interconnect 805 and DSP blocks 801(1)-801(M) may be varied in real-time to respond to changing conditions in a personalized communication session 280.

For example, if audio personalization engine 240 detects that a specific microphone is being utilized by a participant in a personalized communication session 280, it may select a particular DSP block (e.g., 802(1)) to be utilized by audio processor for the personalized communication session. Alternatively, audio personalization engine may select a combination of transform domain and time domain processing by establishing a particular interconnect 805 arrangement.

Figure 8B:
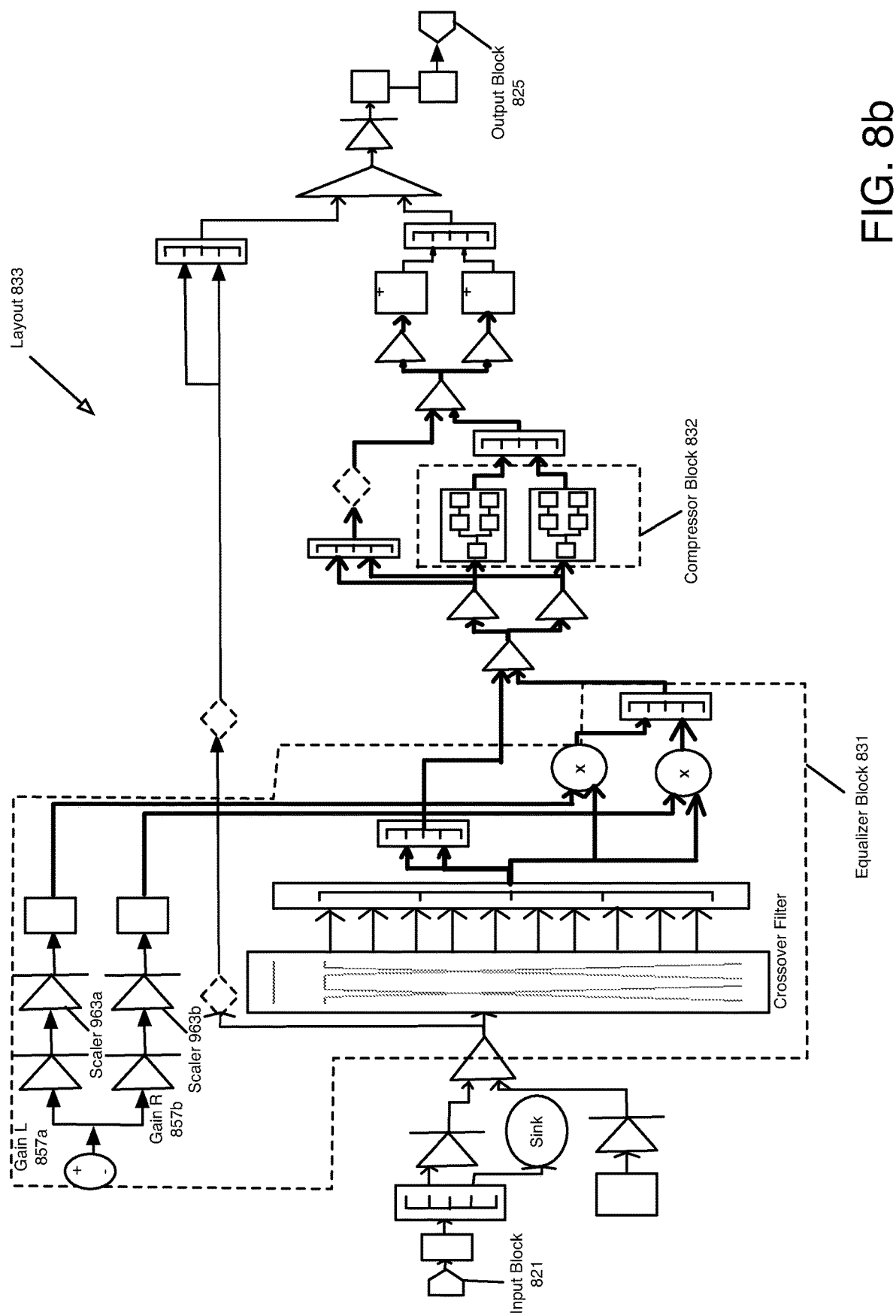
FIG. 8b depicts an exemplary graphical audio processing sequence for use with an embodiment of the invention.

FIG. 8b depicts an exemplary embodiment of a digital signal processing layout that may be configured on an audio processor. According to the exemplary embodiment shown in FIG. 8b, processing is performed in the time domain, although alternative embodiments may include transform domain (e.g., via FFT) processing and/or a mixture of time domain and transform domain processing. Layout 833 shown in FIG. 8b is merely exemplary and any arbitrary DSP topology may be employed.

As shown in FIG. 8b, layout 833 comprises, among other things, input block 821, equalizer block 831, compressor block 832 and output block 825. Equalizer block 831 may utilize a crossover band filter, which in this embodiment, processes each of the left and right ear signals separately utilizing any arbitrary number of frequency bands and processes the volume level of each band separately.

A digital media stream 708 (not shown in FIG. 8b) may be provided to input block 821, processed via layout 833 and transformed into a personalized digital media stream 712 (not shown in FIG. 8b). As shown in FIG. 8b, processing may comprise equalization via equalization block 831 and compression via compression block 832.

For example, if a subscriber to personalization node 255 suffers from a frequency dependent hearing loss, the processing might those frequencies that are the most compromised in the user's hearing response curve/audiogram. The processing may include wide dynamic range compression ("WDRC"). WDRC may implement dynamic gain changes on a time scale on the order of spoken phonemes, which periods tend to be on the order of milliseconds. WDRC typically may provide control over for the "attack" and "release" times of the applied compression in order to more accurately manage or "ride" the swings in volume, which in turn helps improve speech discrimination.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The invention claimed is:

1. A method for providing a personalized communication session between a caller and a callee, the method comprising:
  (a) automatically establishing a first leg between the caller and a network node by routing a call from the caller to the network node;
  (b) at the network node:
    (i) determining session information associated with the call;
    (ii) generating at least one audio personalization parameter for the call based upon the session information by:
      generating at least one query from the session information by transforming the session information into a structured data representation, wherein the structured data representation provides a mapping from a session information value to a database field; and
      submitting the at least one query to a database, wherein the database returns the at least one personalization parameter based upon the query;
    (iii) configuring an audio processor using the at least one audio personalization parameter;
    (iv) establishing a second leg between the network node and the callee; and
    (v) bridging the first leg and the second leg such that an audio signal associated with the call is routed through the audio processor.

* * * * *